(12) United States Patent
Yuki et al.

(10) Patent No.: US 10,180,527 B2
(45) Date of Patent: Jan. 15, 2019

(54) LIGHTING DEVICE AND DISPLAY DEVICE

(71) Applicant: Sharp Kabushiki Kaisha, Sakai, Osaka (JP)

(72) Inventors: Ryuzo Yuki, Sakai (JP); Takeshi Ishida, Sakai (JP); Takao Imaoku, Sakai (JP); Yoshinobu Hirayama, Sakai (JP); Shugo Yagi, Yonago (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 128 days.

(21) Appl. No.: 15/124,722

(22) PCT Filed: Feb. 19, 2015

(86) PCT No.: PCT/JP2015/054547
§ 371 (c)(1),
(2) Date: Sep. 9, 2016

(87) PCT Pub. No.: WO2015/141367
PCT Pub. Date: Sep. 24, 2015

(65) Prior Publication Data
US 2017/0038515 A1 Feb. 9, 2017

(30) Foreign Application Priority Data
Mar. 19, 2014 (JP) .................. 2014-056488

(51) Int. Cl.
*G02B 6/00* (2006.01)
*F21V 8/00* (2006.01)
*G02F 1/1333* (2006.01)

(52) U.S. Cl.
CPC .......... *G02B 6/0036* (2013.01); *G02B 6/00* (2013.01); *G02B 6/0038* (2013.01);
(Continued)

(58) Field of Classification Search
CPC .... G02B 6/0016; G02B 6/0018; G02B 6/002; G02B 6/0021; G02B 6/0036; G02B 6/0038; G02B 6/0045; G02F 1/133615
See application file for complete search history.

(56) References Cited

U.S. PATENT DOCUMENTS 5,584,556 A 12/1996 Yokoyama et al.
5,718,497 A 2/1998 Yokoyama et al.
(Continued)

FOREIGN PATENT DOCUMENTS

JP 06-123885 A 5/1994
JP 08-094844 A 4/1996
(Continued)

OTHER PUBLICATIONS

Official Communication issued in International Patent Application No. PCT/JP2015/054547, dated May 26, 2015.
(Continued)

*Primary Examiner* — Zheng Song
(74) *Attorney, Agent, or Firm* — Keating & Bennett, LLP

(57) ABSTRACT

A backlight unit includes a light emission reflecting portion, first reflecting protrusions, and second reflecting protrusions. The light emission reflecting portion includes unit reflecting portions that include main reflecting surfaces and light reentering surfaces arranged opposite to the main reflecting surfaces, respectively. The first reflecting protrusions include extended main reflecting surfaces that continue to the main reflecting surfaces, respectively, and first auxiliary reflecting surfaces that reflect rays of light traveling toward an opposite plate surface and direct the rays of light toward the main reflecting surfaces and the extended main reflecting surfaces. The second reflecting protrusions include extended light reentering surfaces that continue to the light reentering surfaces, respectively, and second auxiliary reflecting surfaces that reflect rays of light entering (Continued)

through at least one of the light reentering surfaces and the extended light reentering surfaces and direct the rays of light toward the light exiting surface.

14 Claims, 35 Drawing Sheets

(52) U.S. Cl.
CPC .......... *G02B 6/0061* (2013.01); *G02B 6/0085* (2013.01); *G02B 6/0088* (2013.01); *G02F 1/133308* (2013.01); *G02F 2001/133314* (2013.01); *G02F 2001/133317* (2013.01)

(56) References Cited

U.S. PATENT DOCUMENTS

| | | | | |
|---|---|---|---|---|
| 7,936,411 | B2* | 5/2011 | Kim | G02B 6/002 349/56 |
| 2008/0008434 | A1* | 1/2008 | Lee | G02B 6/0036 385/129 |
| 2008/0225555 | A1* | 9/2008 | Ochiai | G02B 6/0036 362/620 |
| 2009/0116263 | A1* | 5/2009 | Chen | G02B 6/0036 362/615 |
| 2012/0275190 | A1* | 11/2012 | Matsumoto | G02B 6/0036 362/609 |
| 2013/0194823 | A1 | 8/2013 | Yagi et al. | |

FOREIGN PATENT DOCUMENTS

| | | |
|---|---|---|
| JP | 3141248 U | 5/2008 |
| JP | 2008-226701 A | 9/2008 |
| JP | 2011-014442 A | 1/2011 |
| JP | 2012-104390 A | 5/2012 |
| WO | 2012/050121 A1 | 4/2012 |

OTHER PUBLICATIONS

English translation of Official Communication issued in corresponding Japanese Patent Application No. 2016-508607, dated Feb. 6, 2018.

* cited by examiner

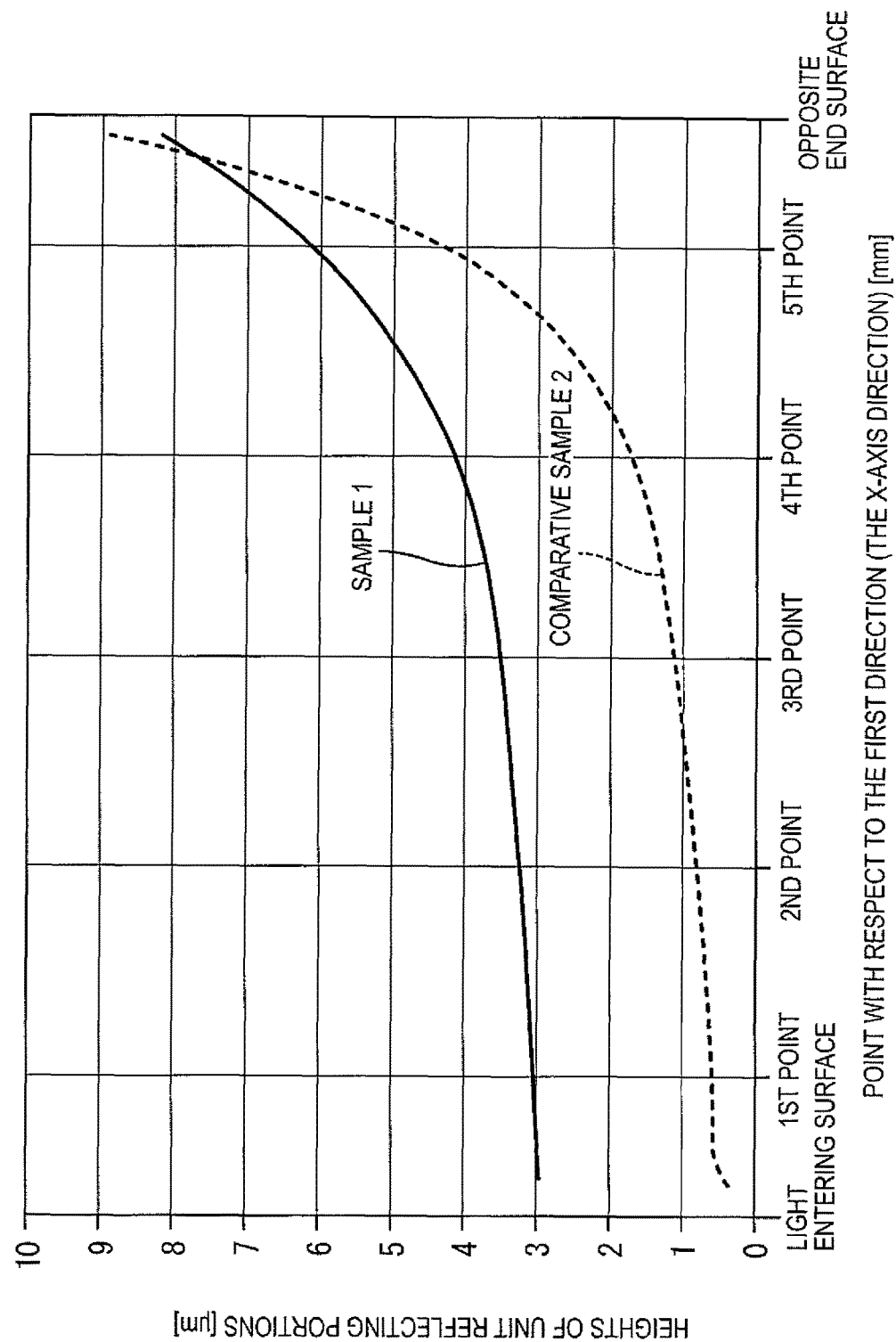

FIG.14

|  | 1ST POINT | | 2ND POINT | | 3RD POINT | | 4TH POINT | | 5TH POINT | |
| --- | --- | --- | --- | --- | --- | --- | --- | --- | --- | --- |
|  | HEIGHT OF UNIT REFLECTING PORTION [μm] | SHAPE REPRODUCI-BILITY | HEIGHT OF UNIT REFLECTING PORTION [μm] | SHAPE REPRODUCI-BILITY | HEIGHT OF UNIT REFLECTING PORTION [μm] | SHAPE REPRODUCI-BILITY | HEIGHT OF UNIT REFLECTING PORTION [μm] | SHAPE REPRODUCI-BILITY | HEIGHT OF UNIT REFLECTING PORTION [μm] | SHAPE REPRODUCI-BILITY |
| COMPARA-TIVE SAMPLE | 0.60 | POOR | 0.81 | POOR | 1.14 | POOR | 1.72 | POOR | 4.34 | GOOD |
| SAMPLE 1 | 3.05 | MODERATELY GOOD | 3.24 | GOOD | 3.53 | GOOD | 4.16 | GOOD | 6.13 | GOOD |

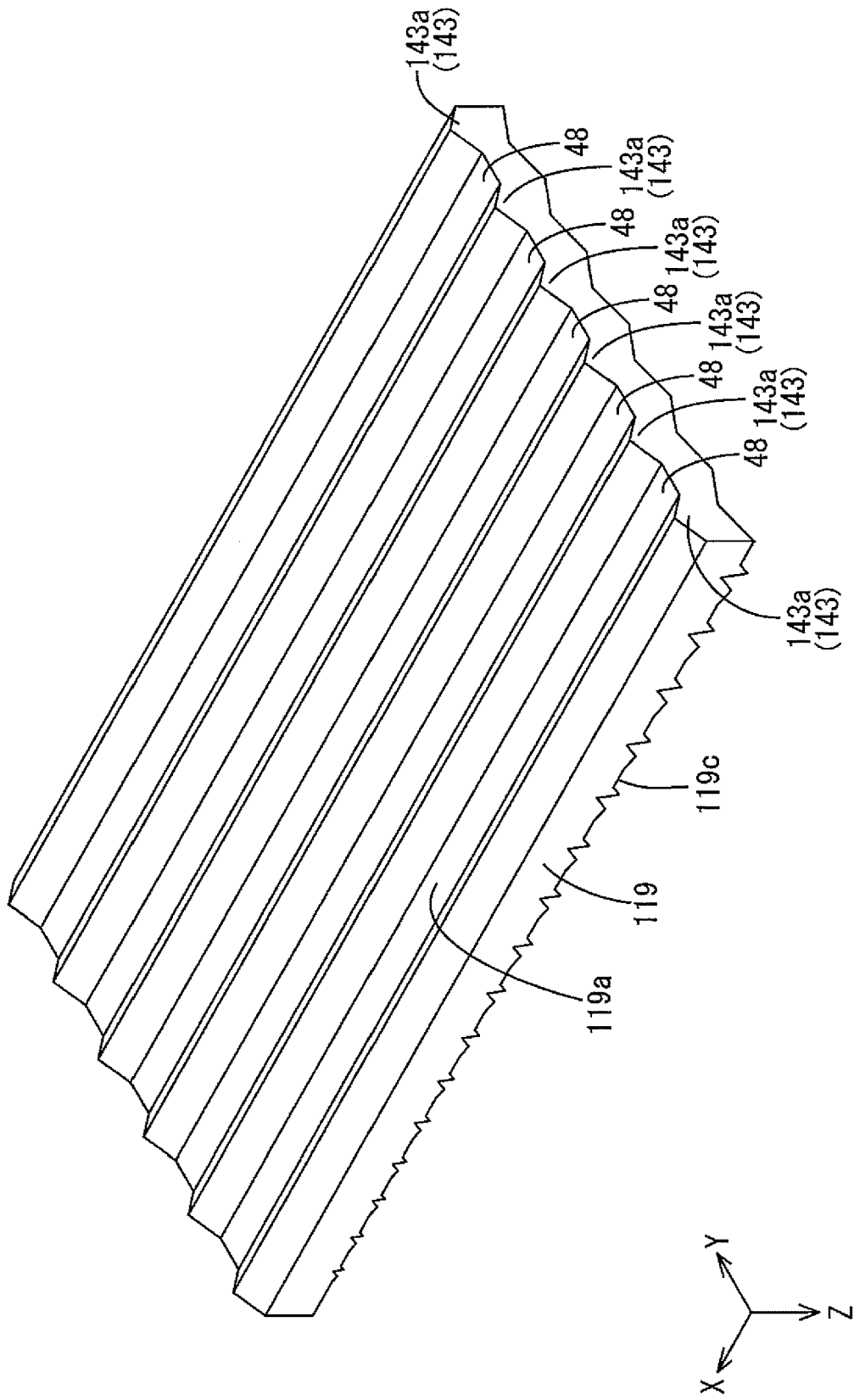

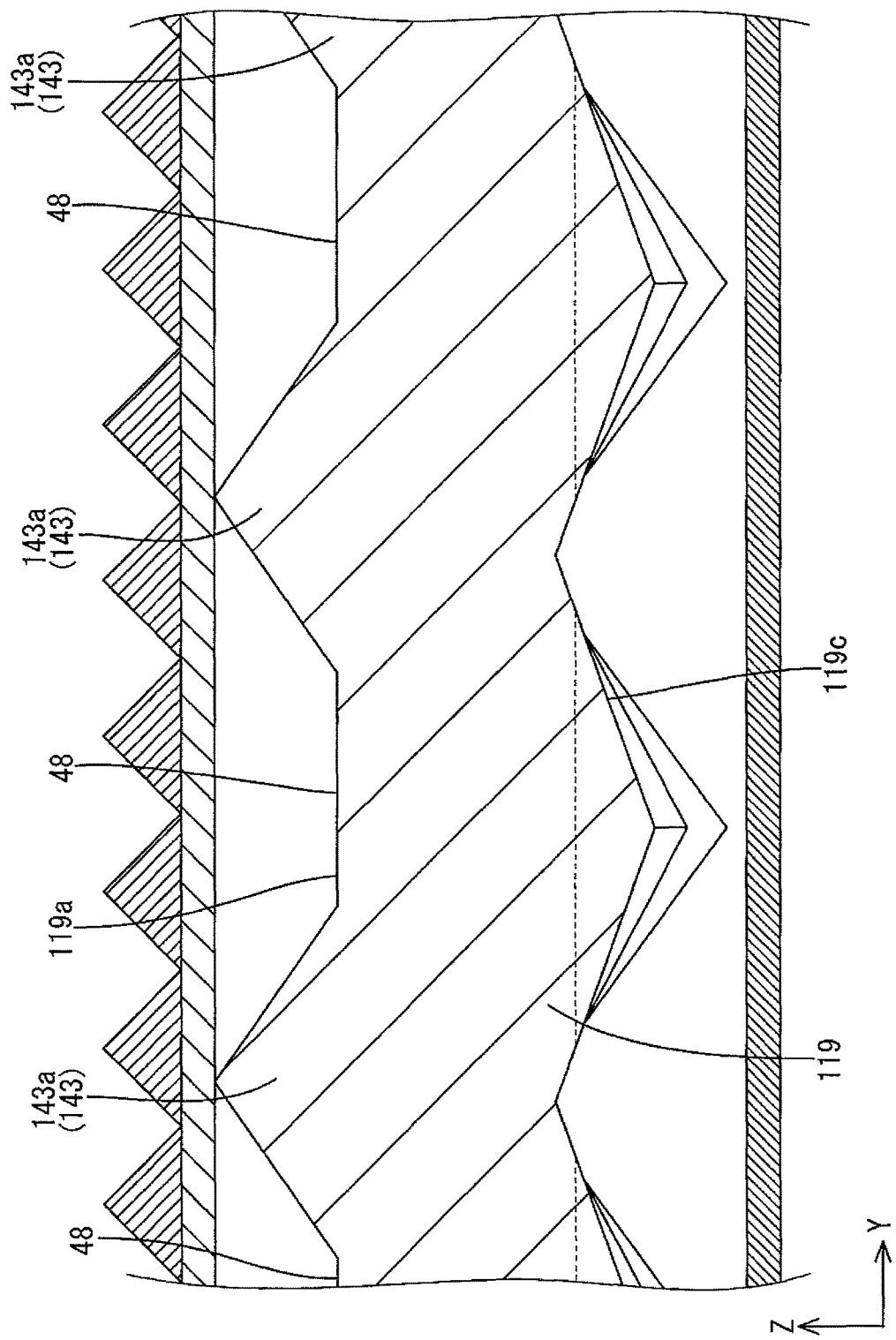

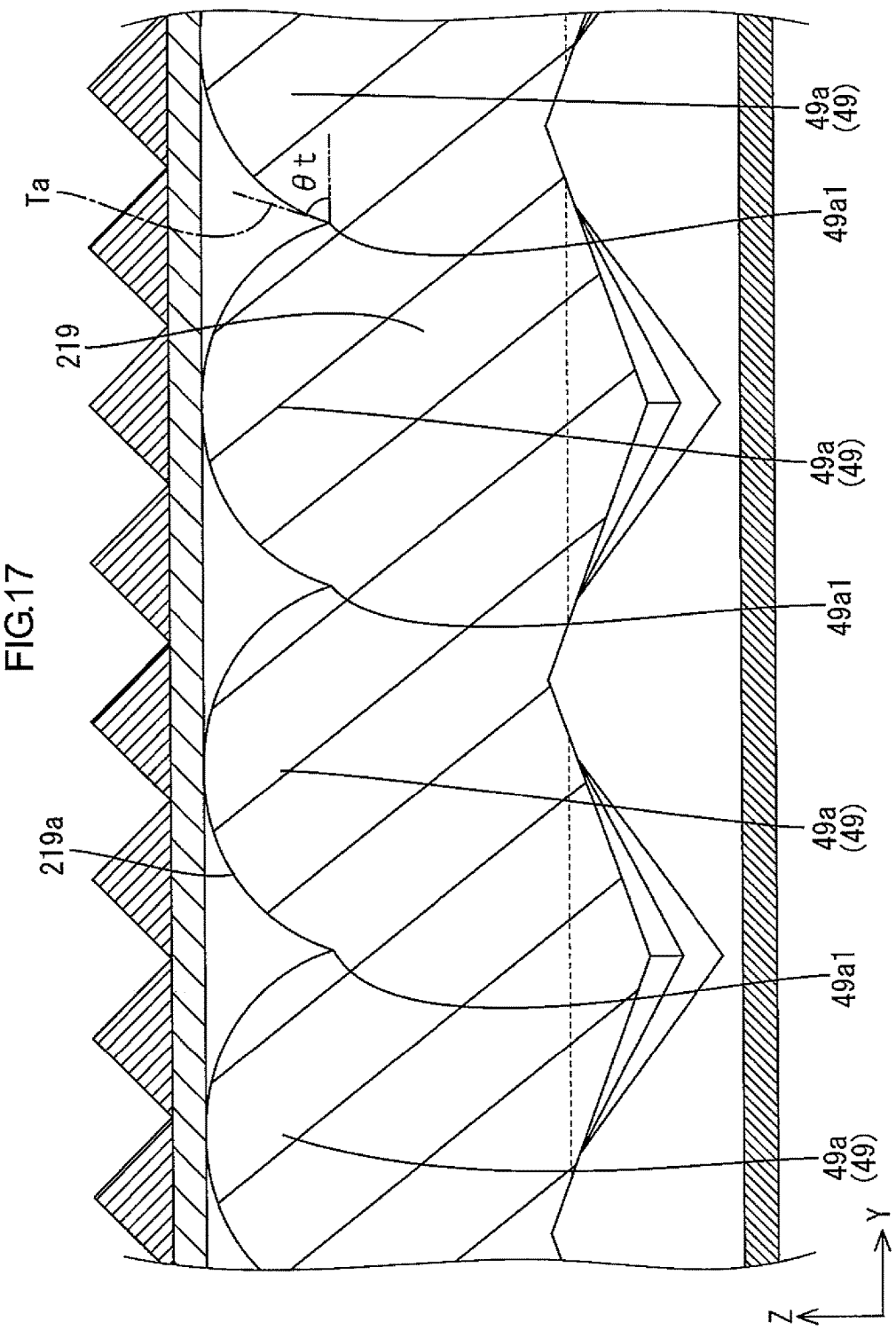

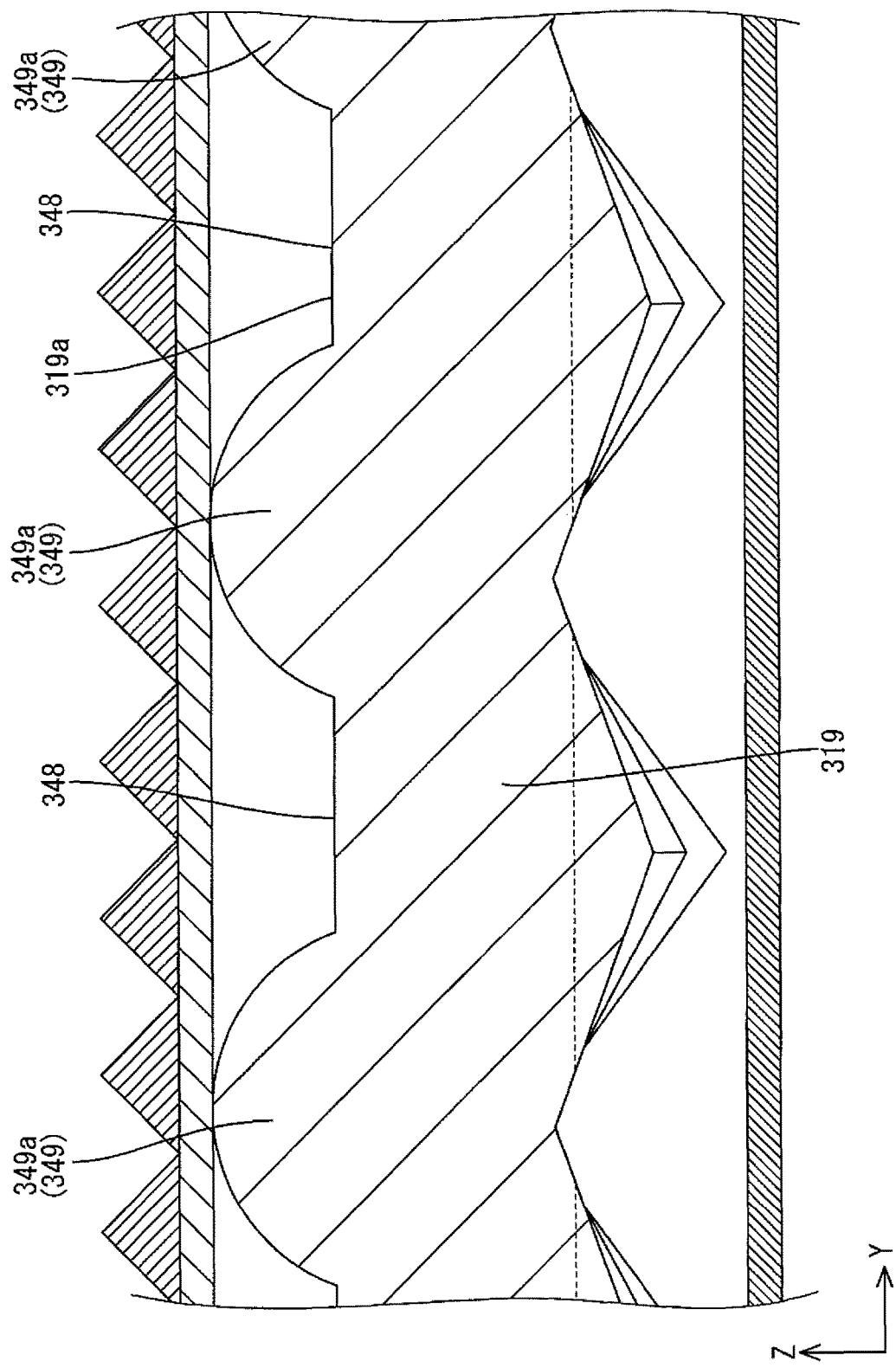

LIGHTING DEVICE AND DISPLAY DEVICE

TECHNICAL FIELD

The present invention relates to a lighting device and a display device.

BACKGROUND ART

In recent years, display components in image display devices including television devices are being shifted from conventional cathode-ray tube displays to thin displays, such as liquid crystal displays and plasma displays. With the thin displays, thicknesses of the image display devices can be decreased. Because liquid crystal panels do not emit light, liquid crystal display devices including liquid crystal panels require backlight devices. The backlight devices are classified broadly into a direct type and an edge-light type based on mechanisms. Each edge-light type backlight device includes a light guide plate and an optical member. The light guide plate is for guiding light from a light source arranged at an end. The optical member is for supplying even planar light converted from the light from the light guide plate with optical effect added thereto to a liquid crystal panel. A backlight device in Patent Document 1 below has been known as an example. Patent Document 1 discloses a configuration in which cylindrical lenses are disposed on a light emitting surface of a light guide plate to have a light collecting function and a prism sheet is disposed on a light exiting surface.

RELATED ART DOCUMENT

Patent Document

Patent Document 1: International Publication No. 2012/050121

Problem to be Solved by the Invention

In Patent Document 1, a light collecting direction of the cylindrical lenses on the light exiting surface of the light guide plate and a light collecting direction of the prism sheet on the light exiting surface are alight with each other to improve light collecting effects. If further improvement is required in brightness regarding the backlight unit, the above configuration may not provide sufficient light collecting effects. More improvement was expected. The present invention was made in view of the above circumstances. An object is to improve brightness.

DISCLOSURE OF THE PRESENT INVENTION

Means for Solving the Problem

A lighting device according to the present invention includes a light source, a light guide plate, a light exiting-side anisotropic light collecting portion, a light exiting surface-side anisotropic light collecting portion, a light emission reflecting portion, an opposite plate surface-side anisotropic light collecting portion, first reflecting protrusions, and second reflecting portions. The light guide plate has a rectangular shape. The light guide plate includes at least one of opposite peripheral end surfaces configured as a light entering surface through which light from the light source enters. The light guide plate includes one of plate surfaces configured as a light exiting surface through which the light exits. The light exiting-side anisotropic light collecting portion is arranged on a light exiting side relative to the light guide plate. The light exiting-side anisotropic light collecting portion includes light exiting-side unit light collecting portions that extend along a first direction and are arranged along a second direction. The first direction is along a pair of end surfaces among peripheral end surfaces of the light guide plate. The end surfaces are opposite to each other and do not include the light entering surface. The second direction is along a pair of the peripheral end surfaces among the peripheral end surfaces of the light guide plate. The pair of the peripheral end surfaces includes the light entering surface. The light exiting surface-side anisotropic light collecting portion is arranged on a light exiting surface-side of the light guide plate. The light exiting surface-side anisotropic light collecting portion includes light exiting surface-side unit light collecting portions that extend along the first direction and are arranged along the second direction. The light emission reflecting portions is arranged on an opposite plate. The light emission reflecting portion include unit reflecting portions formed by recessing portions of the opposite plate surface to extend along the second direction. The unit reflecting portions include main reflecting surfaces on a light source side with respect to the first direction and light reflecting surfaces on an opposite side. The unit reflecting portions are arranged at intervals along the first direction. The opposite plate surface-side anisotropic light collecting portion is arranged on an opposite plate surface-side of the light guide plate. The opposite late surface-side anisotropic light collecting portion include opposite plate surface-side unit light collecting portions that extend along the first direction and are arranged along the second direction. The first reflecting portions are arranged closer to the light source than the unit reflecting portions with respect to the first direction and protrude from the opposite plate surface. The first reflecting protrusions include extended main reflecting surfaces and first auxiliary reflecting surfaces. The extended main reflecting surfaces continue to the main reflecting surfaces, respectively. The first auxiliary reflecting surfaces are arranged closer to the light source than the respective extended main reflecting surfaces with respect to the first direction and configured to reflect light traveling toward the opposite plate surface and to direct the light toward the main reflecting surfaces and the extended main reflecting surfaces. The second reflecting portions arranged on a side opposite from a side on which the first reflecting protrusions are arranged relative to the unit reflecting portions with respect to the first direction on opposite plate surface side of the light guide plate. The second reflecting protrusions include extended light reentering surfaces and second auxiliary reflecting surfaces. The extended light reentering surfaces continue to the light reentering surfaces, respectively. The second auxiliary reflecting surfaces are arranged on a side opposite from a side on which the first reflecting protrusions are arranged relative to the extended light reentering surfaces with respect to the first direction and configured to reflect light entering through at least one of the light reentering surfaces and the extended light reentering surfaces and to direct the light toward the light exiting surface.

According to the configuration, the light emitted by the light source enters the light guide plate through the light entering surface and transmits through the light guide plate. During the transmission, the light is reflected by the light emission reflecting portion on the opposite plate surface of the light guide plate. The light emission reflecting portion includes the unit reflecting portions extending along the second direction and being arranged at intervals along the first direction. The light traveling through the light guide plate in the first direction can be reflected by the main reflecting surfaces of multiple unit reflecting portions and directed toward the light exiting surface. According to the configuration, the light exit through the light exiting surface.

Light collecting effects with respect to the second direction in which the opposite plate surface-side unit light collecting portions of the opposite plate surface-side anisotropic light collecting portions are arranged are selectively added to rays of the light which travel through the light guide plate and have reached the opposite plate surface. The rays of light are reflected by the unit reflecting portions toward the light exiting surface. Light collecting effects with respect to the second direction in which the light exiting surface-side unit light collecting portions of the light exiting surface-side anisotropic light collecting portion are arranged are selectively added to the rays of light which have reached the light exiting surface of the light guide plate. Light colleting effects with respect the second direction in which the light exiting-side unit light collecting portion of the light exiting-side anisotropic light collecting portion are arranged are selectively added to the rays of light which have exited through the light exiting surface. Namely, anisotropic light collecting effects are added to the rays of light exiting through the light exiting surface and traveling toward the light exiting-side unit collecting portions in two steps by the opposite plate surface-side anisotropic light collecting portion and the light exiting surface-side anisotropic light collecting portion. The exiting light includes a large number of rays of light which are not retroreflected by the light exiting-side unit light collecting portions and exit. According to the configuration, light use efficiency can be sufficiently increased and brightness of the exiting light from the lighting device can be increased. Furthermore, the opposite plate surface-side anisotropic light collecting portion is provided on the opposite plate surface of the light guide plate. In comparison to a configuration in which an isotropic light collecting portion is added to a light exiting-side of a light guide plate, the number of parts is reduced and the thickness of the lighting device can be reduced.

The rays of light transmitting through the light guide plate are reflected by the main reflecting surfaces of the unit reflecting portions of the light emission reflecting portion and directed to the light exiting surface. Angles of the rays of light tend to be biased. Therefore, the light exiting through the light exiting surface is more likely to include vector components that point to the side opposite from the light source side with respect to the first direction. This is more likely to cause uneven brightness. On the opposite plate surface side of the light guide plate, the first reflecting protrusions protrude from the opposite plate surface on the light source side relative to the unit reflecting portions with respect to the first direction. The light traveling toward the opposite plate surface through the light guide plate is reflected by the first auxiliary reflecting surfaces of the reflecting protrusions on the light source side relative to the respective extended main reflecting surfaces with respect to the first direction and directed to the main reflecting surfaces and the extended main reflecting surfaces. According to the configuration, the light includes vector components that point to the light source with respect to the first direction. Therefore, the light reflected by at least one of the main reflecting surfaces and the extended main reflecting surfaces and exiting through the light exiting surface is less likely to disproportionally include vector components that point to the side opposite from the light source with respect to the first direction and thus the uneven brightness is reduced.

The light traveling toward the main reflecting surfaces of the unit reflecting portions through the light guide plate may include rays entering the main reflecting surfaces or the extended main reflecting surfaces with incidences smaller than a critical angle and passing through the main reflecting surfaces or the extended main reflecting surfaces. Some rays of light which have passed through the main reflecting surfaces of the extended main reflecting surfaces may enter through the light reentering surfaces of the unit reflecting portions. If the rays of light which have passed through the main reflecting surfaces or the extended main reflecting surfaces pass through the unit reflecting portions and reenter the opposite plate surface, and then exit through the light exiting surface, the exiting light tends to include a larger number of vector components that point to the side opposite from the light source side with respect to the first direction. This may cause uneven brightness. On the opposite plate surface side of the light guide plate, the second reflecting protrusions protrude from the opposite plate surface on the side opposite from the light source side relative to the unit reflecting portions with respect to the first direction. Therefore, the rays of light that have passed through the main reflecting surfaces or the extended main reflecting surfaces are reflected by the second auxiliary reflecting surfaces after entering at least one of the extended light reentering surfaces and the light reentering surfaces of the second reflecting protrusions and directed toward the light exiting surface. According to the configuration, the light includes vector components that point to the light source side with respect to the first direction. The light exiting through the light exiting surface is less likely to disproportionally include vector components that point to the side opposite from the light source side with respect to the first direction. Therefore, an occurrence of uneven brightness is reduced.

Embodiments of the present invention may preferably include the following configurations.

(1) The unit reflecting portions of the light emission reflecting portion may include divided unit reflecting portions arranged at intervals with respect to the second direction. An amount of light reflected by the unit reflecting portions tends to be proportional to surface areas of the unit reflecting portions. To obtain a necessary amount of reflected light, the surface areas of the unit reflecting portions need to be defined according to the necessary amount. If the unit reflecting portions extend for an entire length of the light guide plate in the second direction, dimensions of the unit reflecting portions measuring in direction normal to the plate surface of the light guide plate surface cannot be increased more than a specific dimension to set the surface areas of the unit reflecting portions to the surface areas described above. With the unit reflecting portions including the divided unit reflecting portions arranged at intervals in the second direction, the dimensions of the unit reflecting portions measuring in the direction normal to the plate surface of the light guide plate can be increased to set the surface areas of the unit reflecting portions to the surface areas described above. In light emission reflecting portion is integrally formed with the opposite plate surface of the light guide plate that is produced by molding, the divided unit reflecting portions of the unit reflecting portions are more easily formed in designed shapes. According to the configuration, the optical performances of the light emission reflecting portion can be properly exerted.

If the unit reflecting portions are formed to extend for the entire length of the light guide plate in the second direction, the number of the unit reflecting portions arranged in the first direction may be reduced to adjust the total area of the unit reflecting portions calculated by adding the surface areas of the unit reflecting portions. By doing so, the intervals of the unit reflecting portions arranged in the first direction increase and thus uneven brightness may occur. With the unit reflecting portions including the divided unit reflecting portions arranged at intervals in the second direction, it is not necessary to alter the number and the intervals of the unit reflecting portions arranged in the first direction. Therefore, uneven brightness is less likely to occur in the light exiting from the lighting device.

(2) The unit reflecting portions of the light emission reflecting portion may have holes that extend along the second direction. The holes are formed by cutting out portions of ridges of the opposite plate surface-side unit light collecting portions of the opposite plate surface-side anisotropic light collecting portions. If the unit reflecting portions do not have the holes that extend along the second direction and include side surfaces along the first direction, rays of light may be refracted or reflected by the side surfaces that are along the first direction. This may degrade the light collecting performances of the opposite plate surface-side anisotropic light collecting portion. With light emissions reflecting portion including the unit reflecting portions with the holes that extend along the second direction formed by cutting the portions of the ridges of the opposite plate surface-side unit light collecting portions, the opposite plate surface-side anisotropic light collecting portion properly exerts the light collecting performances. Therefore, the brightness regarding the light exiting from the lighting device improves.

(3) Lines of the first reflecting protrusions and the second reflecting protrusions may be arranged at intervals in the second direction. Arrangements of the first reflecting protrusions and the second reflecting protrusions with respect to the second direction may correspond to an arrangement of the divided unit reflecting portions. According to the configuration, the rays of light reflected by the first auxiliary reflecting surfaces of the first reflecting protrusions are efficiently directed to the main reflecting surfaces of the divided unit reflecting portions and the extended main reflecting surfaces. The rays of light passed through the main reflecting surfaces of the divided unit reflecting portions and the extended main reflecting surfaces are directed to at least one of the extended light reentering surfaces of the second reflecting protrusions and the light reentering surfaces to enter therethrough and efficiently reflected by the second auxiliary reflecting surfaces. According to the configuration, uneven brightness in light exiting through the light exiting surface, which may be caused by the first and the second reflecting protrusions can be properly reduced. Furthermore, the first and the second reflecting protrusions are less likely to negatively affect the light collecting performances of the opposite plate surface-side anisotropic light collecting portion.

(4) The first reflecting protrusions and the second reflecting protrusions may be formed such that outlines thereof viewed from a front with respect to the first direction are along outlines of the opposite plate surface-side unit light collecting portions viewed from the front with respect to the first direction. If the light guide plate is produced by injection molding, a mold used for the injecting molding can be easily formed by cutting. If the light guide plate is produced by molding and shaped by cutting, the cutting can be easily performed. Therefore, productivity improves.

(5) The first reflecting protrusions and the second reflecting protrusions may continuously extend in the second direction and across the divided unit reflecting portions. According to the configuration, a larger number of rays of light traveling toward the opposite plate surface through the light guide plate are reflected by the first auxiliary reflecting surfaces of the first reflecting protrusions and directed to the main reflecting surfaces of the divided unit reflecting portions and the extended main reflecting surfaces. A larger number of the rays of light passed through the main reflecting surfaces of the divided unit reflecting portions and the extended main reflecting surfaces are efficiently directed to at least one of the extended light reentering surfaces of the second reflecting protrusions and the light reentering surfaces to enter and reflected by the second auxiliary reflecting surfaces. Therefore, the brightness can be improved while the uneven brightness in light exiting through the light exiting surface, which may be caused by the first reflecting protrusions and the second reflecting protrusions, is properly reduced (6) The first auxiliary reflecting surfaces of the first reflecting protrusions may have dimensions measuring in the first direction. The dimensions may increase as a distance from the light source in the first direction decreases. The rays of light exiting the light guide plate through an area of the light exiting surface away from the light source in the first direction may travel in a longer path in the light guide plate before exiting. Therefore, the directivity of the light may be reduced. The rays of light exiting the light guide plate through an area of the light exiting surface closer to the light source with respect to the first direction may travel in a shorter path in the light guide plate before exiting. Therefore, the directivity of the light is less likely to be reduced. As described above, the dimensions of the first auxiliary reflecting surfaces of the first reflecting protrusions in the first direction increase as the distance from the light source in the first direction decreases. Therefore, the rays of light in the light guide plate are more likely to be reflected by the first auxiliary reflecting surfaces. Because of the reflection, the light includes a larger number of vector components that point to the side opposite from the light source with respect to the first direction. Therefore, the directivity is properly reduced. According to the configuration, a difference in directivity is less likely to occur between the light exiting the light guide plate through the area away from the light source in the first direction and the light exiting the light guide plate through the area closer to the light source with respect to the first direction. Therefore, the occurrence of the uneven brightness is properly reduced.

(7) The light emission reflecting portion may be formed such that dimensions of the unit reflecting portions measuring in the first direction increase as the distance from the light source in the first direction increases and the intervals of the unit reflecting portions in the first direction are constant. The first reflecting protrusions may be formed such that a dimension measuring in the first direction in equal to an interval between the unit reflecting portions adjacent to each other in the first direction. If the lighting device is used in combination with a display panel, the intervals of the unit reflecting portions in the first direction may be set so as not to interfere with the arrangement of the pixels in the display panel. According to the configuration, images display on the display panel using the light exiting from the light guide plate through the light exiting surface after reflected by the main reflecting surfaces of the unit reflecting portions are less likely to have moire fringes, which are interference fringes. However, the amount of light in the light guide plate tends to decrease as the distance from the light source in the first direction increases. As described above, the dimensions of the light reflecting portions measuring in the first direction increase as the distance from the light source in the first direction increases. According to the configuration, a larger number of rays of light are reflected by the main reflecting surfaces of the unit reflecting portions to exit through the light exiting surface even in the area away from the light source in the first direction. Therefore, a difference in the amount of exiting light is less likely to be created. Furthermore, as described above, the unit reflecting portions are arranged at the constant intervals in the first direction and the first reflecting protrusions are formed between the respective unit reflecting portions that are adjacent to each other for the entire length in the first direction. The dimensions of the unit reflecting portions in the first direction decrease as the distance from the light source in the first direction decreases. Therefore, the first auxiliary reflecting surfaces of the first reflecting protrusions are formed such that the dimensions in the first direction increase as the distance from the light source decreases. With the first auxiliary reflecting surfaces arranged between the respective unit reflecting portions that are adjacent to each other in the first direction, variations of the first auxiliary reflecting surfaces in dimension measuring in the first direction are easily matched with variations of the unit reflecting portions in dimension measuring in the first direction. According to the configuration, brightness can be improved while uneven brightness that may occur in light exiting through the light exiting surface is properly reduced.

(8) The second reflecting protrusions may be formed such that distal ends of the second reflecting protrusions are located farther from the opposite plate surface than distal ends of the first reflecting protrusions. According to the configuration, the rays of light passed through the main reflecting surfaces of the extended main reflecting surfaces can be efficiently passed through the light reentering surfaces of the second reflecting protrusions and reflected by the second auxiliary reflecting surfaces. Uneven brightness in light exiting through the light exiting surface which may be caused by the first reflecting protrusions and the second reflecting protrusions is properly reduced.

(9) The light emission reflecting portions may be formed such that dimensions of the unit reflecting portions measuring in a direction normal to a plate surface of the light guide plate increase as the distance from the light source in the first direction increases. The first reflecting protrusions and the second reflecting protrusions may be arranged at intervals along the first directions, respectively. Arrangements of first reflecting protrusions and the second reflecting protrusions may correspond to an arrangement of the unit reflecting portions. The first reflecting protrusions and the second reflecting protrusions may be formed such that dimensions of projection of the first reflecting protrusions and the second reflecting protrusions from the opposite plate surface increase as the distance from the light source increases. According to the configuration, the rays of light traveling toward the opposite plate surface through the light guide plate are reflected by the first auxiliary reflecting surfaces of the first reflecting protrusions arranged along the first direction and properly directed to the main reflecting surfaces of the unit reflecting portions and the extended main reflecting surfaces arranged along the first direction. The rays of light passed through the main reflecting surfaces of the unit reflecting portions or the extended main reflecting surfaces arranged along the first direction properly enter through the extended light reentering surfaces of the second reflecting protrusions and the light reentering surfaces arranged along the first direction and reflected by the second auxiliary reflecting surfaces. According to the configuration, the brightness can be improved while uneven brightness in light exiting through the light exiting surface which may be caused by the first reflecting protrusions and the second reflecting protrusions arranged along the first direction is properly reduced.

(10) At least one of each first reflecting protrusion and each second reflecting protrusion may include a flat surface formed at an end of projection from the opposite plate surface. With the flat surface, deformations such as collapses are less likely to occur at the distal end of the at least one of each first reflecting protrusion and each second reflecting protrusion. Therefore, optical performances of the at least one of each first reflecting protrusion and each second reflecting protrusion are stably exerted.

(11) The first reflecting protrusions may be formed such that a dimension of each first reflecting protrusion measuring in the first direction is equal to an interval between corresponding two of the unit reflecting portions that are adjacent to each other in the first direction. The first reflecting protrusions may be arranged between the corresponding unit reflecting portions that are adjacent to one another in the first direction for the entire length in the first direction. According to the configuration, the rays of light traveling toward the opposite plate surface through the light guide plate are efficiently reflected by the first auxiliary reflecting surfaces of the first reflecting protrusions and directed to the main reflecting surfaces and the extended main reflecting surfaces.

(12) The lighting device may include a reflecting member including a reflecting surface opposed to the opposite plate surface of the light guide plate and configured to reflect light from the opposite plate surface with the reflecting surface. According to the configuration, rays of light leaking from the light guide plate through the opposite plat surface are reflected by the reflecting surface of the reflecting member such that the reflected rays of light efficiently enter through the opposite plate surface. Even if a gap is present between the opposite plate surface of the light guide plate and the reflecting member, the rays of light passed through the main reflecting surface and the extended main reflecting surface efficiently enter through the extended light reentering surfaces of the second reflecting protrusions that protrude from the opposite plate surface toward the reflecting member. The rays of light are reflected by the second auxiliary reflecting surfaces and directed toward the light exiting surface. Therefore, the uneven brightness is properly reduced.

(13) At least one of a group of the first reflecting protrusions and a group of the second reflecting protrusions may include a grope of the first auxiliary reflecting surface and a group of the second auxiliary reflecting surface, at least one of which include sloped surfaces having angles of slope different from one another. According to the configuration in which at least one of the group of the first auxiliary reflecting surfaces and the group of the second auxiliary reflecting surfaces include the sloped surfaces, the rays of light are more likely to travel in different directions. Therefore, the occurrence of the uneven brightness can be properly reduced.

(14) At least one of a group of the first reflecting protrusions and a group of the second reflecting protrusions may include a group of the first auxiliary reflecting surfaces and a group of the second auxiliary reflecting surfaces, at least one of which include curved surfaces. According to the configuration in which at least one of the group of the first auxiliary reflecting surfaces and the group of the second auxiliary reflecting surfaces include the curved surfaces, the rays of light are more likely to travel in different directions. Therefore, the occurrence of the uneven brightness can be properly reduced.

Next, to solve the problem described earlier, a display device according to the present invention includes the lighting device described above and a display panel for displaying images using light from the lighting device.

According to the display device, brightness of light exiting from the lighting device toward the front is high and uneven brightness is less likely to occur. Therefore, images can be displayed with high quality.

The display panel may be a liquid crystal panel including liquid crystals sealed between substrates. Such a display device can be used in various applications including liquid crystal displays of smartphones and tablet computers.

Advantageous Effect of the Invention

According to the present invention, the brightness can be improved.

BRIEF DESCRIPTION OF THE DRAWINGS

FIG. 13 is a graph illustrating heights of unit reflecting portions of a light emission reflecting portion of each of the light guide plates in each of comparative sample 2 and sample 1 in comparative experiment 2.

FIG. 14 is a table illustrating heights of the unit reflecting portions measuring at first to fifth points, respectively, in each of the light guide plates in each of comparative sample 2 and sample 1 in comparative experiment 2.

FIG. 15 is a perspective view of a light guide plate according to a second embodiment of the present invention.

FIG. 16 is a cross-sectional view of a backlight unit along a short-side direction (the second direction, the Y-axis direction).

FIG. 17 is a cross-sectional view of a backlight unit along a short-side direction (the second direction, the Y-axis direction) according to a third embodiment of the present invention.

FIG. 18 is a cross-sectional view of a backlight unit along a short-side direction (the second direction, the Y-axis direction) according to a fourth embodiment of the present invention.

MODE FOR CARRYING OUT THE INVENTION

First Embodiment

Figure 1:
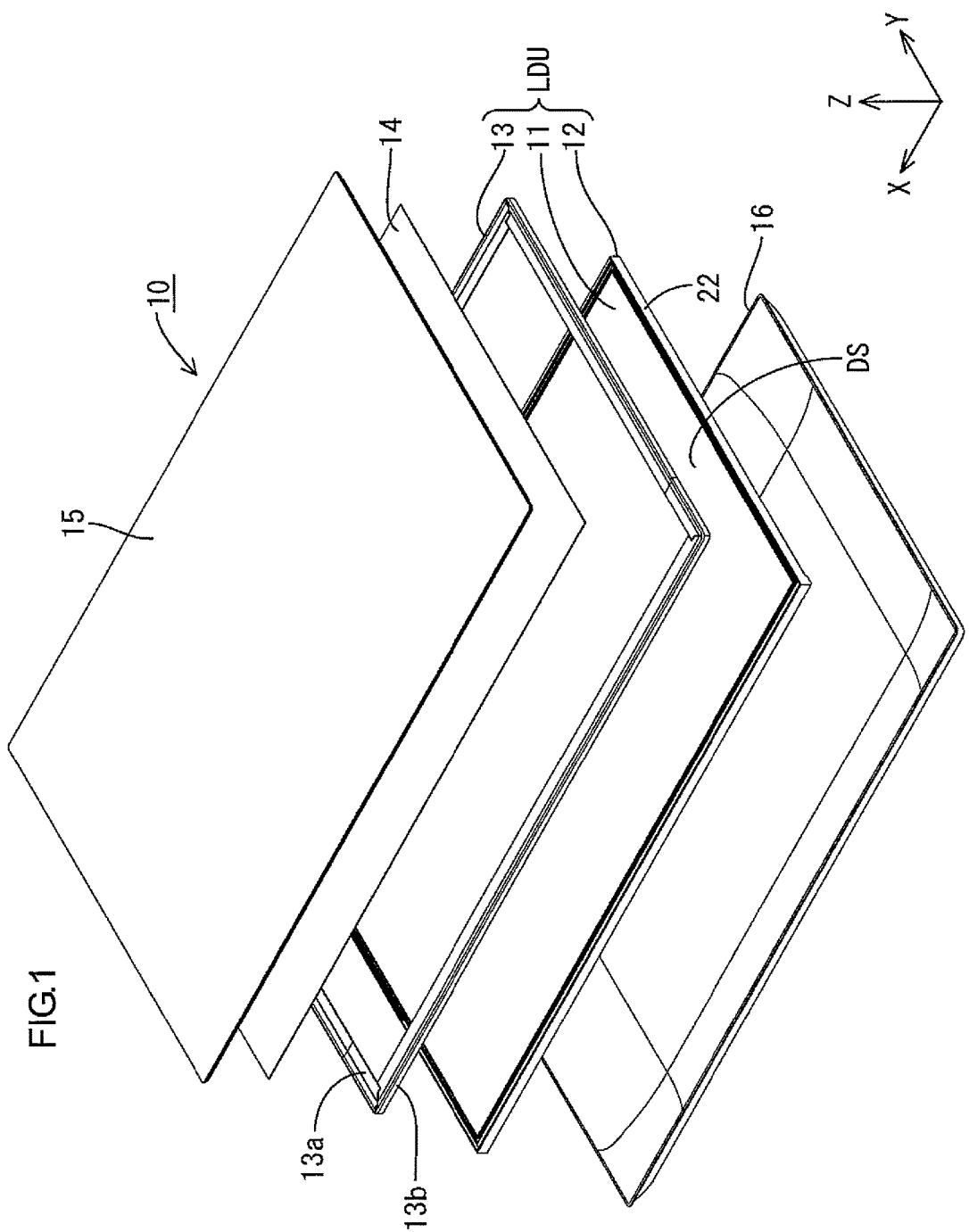
FIG. 1 is an exploded perspective view illustrating schematic configuration of a liquid crystal display device according to a first embodiment of the present invention.

A first embodiment will be described with reference to FIGS. 1 to 14. In this section, a liquid crystal display device 10 will be described. X-axes, Y-axes, and Z-axes may be present in the drawings. The axes in each drawing correspond to the respective axes in other drawings. The Y-axis direction corresponds to a vertical direction in FIGS. 3 to 5. An upper side in FIGS. 3 to 5 corresponds to a front side of the liquid crystal display device 10. A lower side in FIGS. 3 to 5 corresponds to a rear side of the liquid crystal display device 10.

As illustrated in FIG. 1, the liquid crystal display device 10 has a rectangular overall shape in a plan view. The liquid crystal display device 10 includes a liquid crystal display unit LDU, which is a main component, with other components including a touch panel 14, a cover panel (a protective panel, a cover glass) 15, and a case 16 attached to the liquid crystal display unit LDU. The liquid crystal display unit LDU includes a liquid crystal panel (a display panel) 11, a backlight unit (a lighting unit) 12, and a frame (a housing member) 13. The liquid crystal panel 11 includes a display surface DS on the front side for displaying images. The backlight unit 12 is disposed behind the liquid crystal panel 11 and configured to emit light toward the liquid crystal panel 11. The frame 13 presses the liquid crystal panel 11 from the front side, that is, a side far from the backlight unit 12 (a display surface DS side). The touch panel 14 and the cover panel 15 are held in the frame 13 of the liquid crystal display unit LDU from the front side and outer peripheral portions (including outer peripheral edges) thereof are received by the frame 13 from the rear side. The touch panel 14 is disposed more to the front than the liquid crystal panel 11 with a predetermined gap therebetween and a plate surface thereon on the rear side (inner side) is an opposed surface opposed to the display surface DS. The cover panel 15 is disposed to overlap the touch panel 14 on the front side and a plate surface thereof on the rear side (inner side) is an opposed surface opposed to the plate surface of the touch panel 14 on the front side. An anti-reflection film AR is disposed between the touch panel 14 and the cover panel 15 (see FIG. 5). The case 16 is attached to the frame 13 to cover the liquid crystal display unit LDU from the rear side. A portion of the frame 13 (an annular portion 13b, which will be described later), the cover panel 15, and the case 16 among the components of the liquid crystal display device 10 form an exterior of the liquid crystal display device 10. The liquid crystal display device 10 according to this embodiment is for portable electronic devices such as smartphones having screen sizes of about 5 inches.

Figure 3:
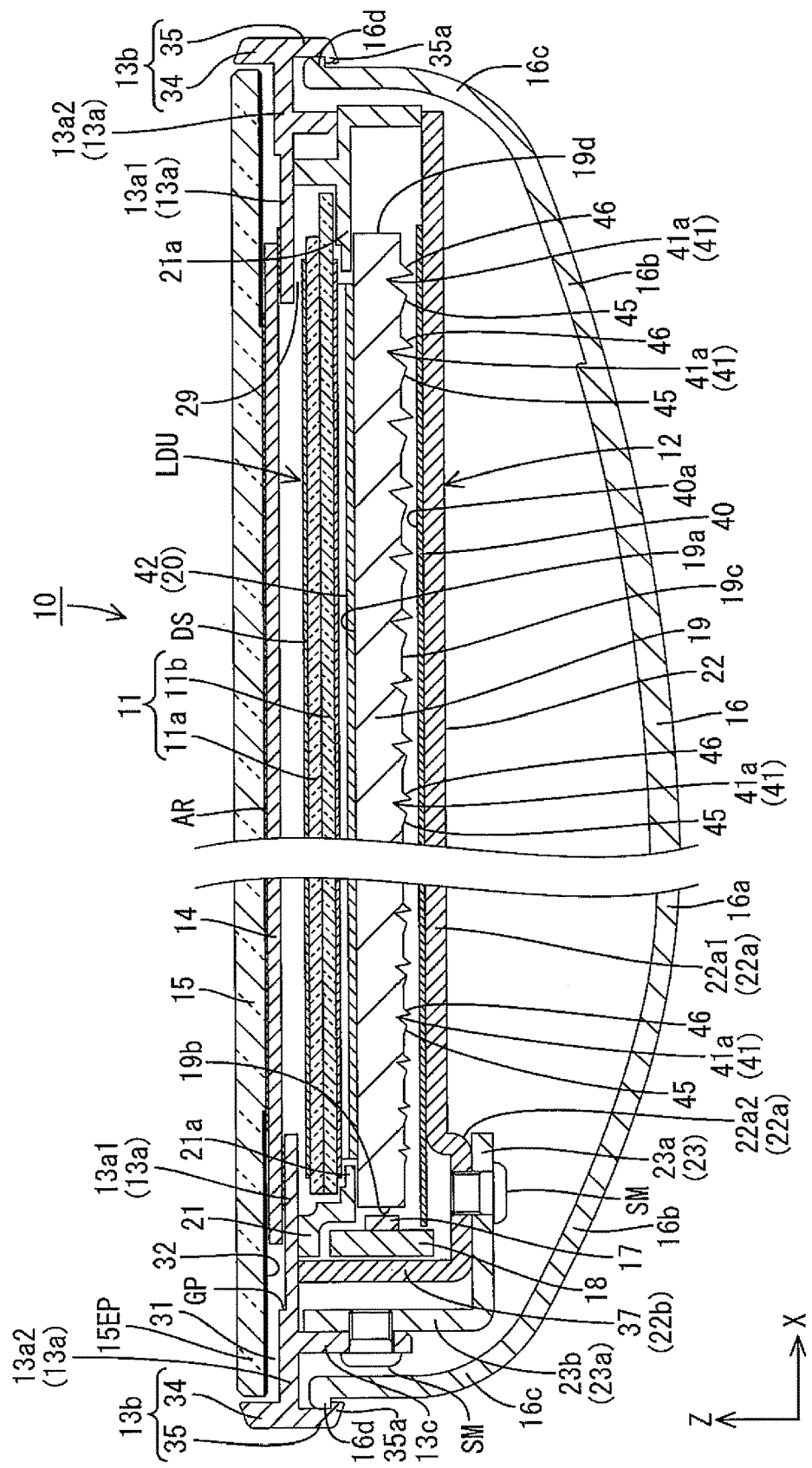
FIG. 3 is a cross-sectional view illustrating a cross-sectional configuration of the liquid crystal display device along a long-side direction (the first direction, the X-axis direction).
Figure 4:
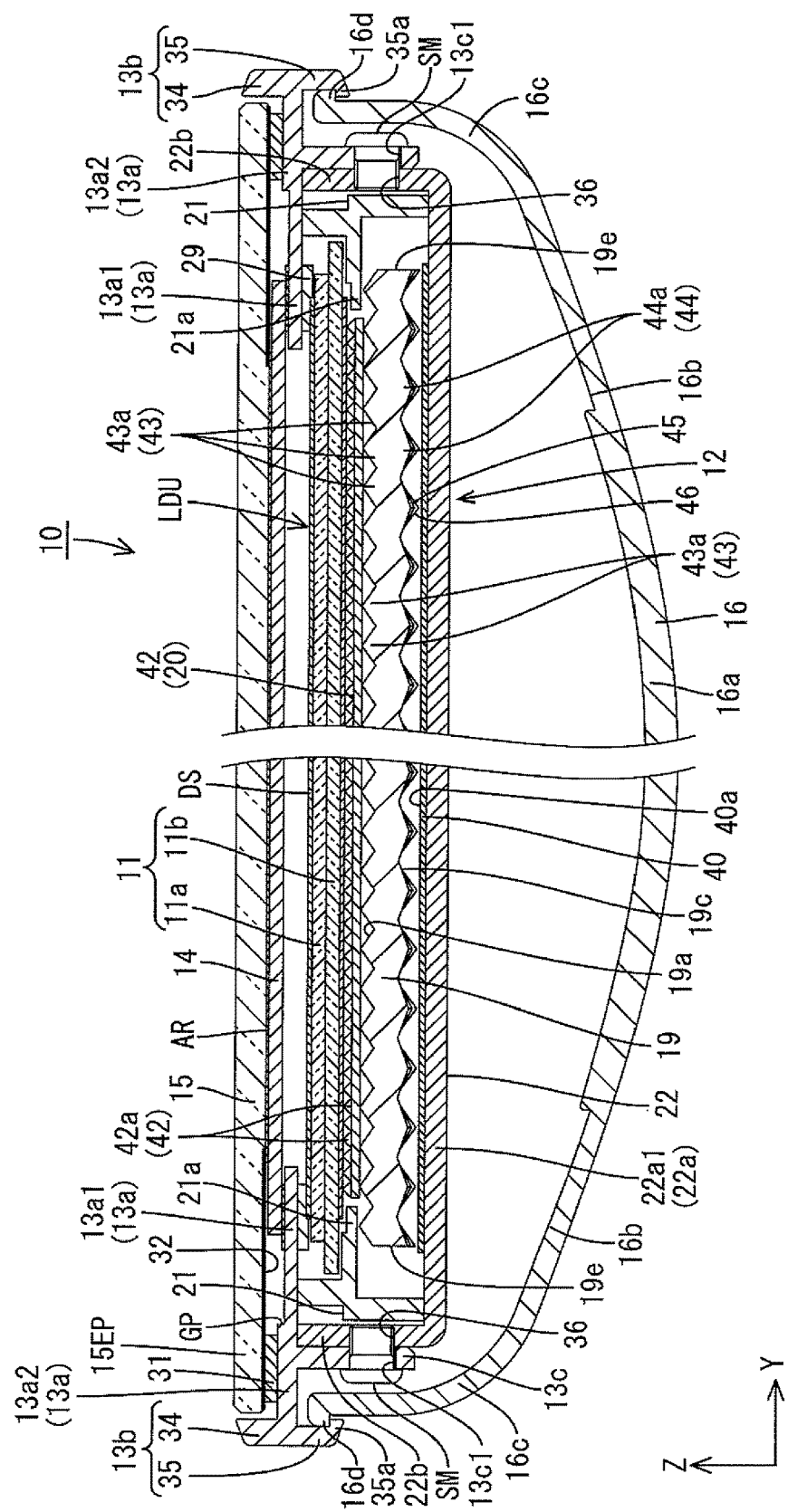
FIG. 4 is a cross-sectional view illustrating a cross-sectional configuration of the liquid crystal display device along a short-side direction (the second direction, the Y-axis direction).

The liquid crystal panel 11 of the liquid crystal display unit LDU will be described in detail. As illustrated in FIGS. 3 and 4, the liquid crystal panel 11 includes a pair of glass substrates 11a and 11b and a liquid crystal layer (not illustrated). The substrates 11a and 11b have rectangular shapes in a plan view. The substrates 11a and 11b are substantially transparent and have high light transmissivities. The liquid crystal layer is between the substrates 11a and 11b. The liquid crystal layer includes liquid crystal molecules that are substances having optical characteristics that change according to application of an electric field. The substrates 11a and 11b are bonded with a sealing member, which is not illustrated, with a gap equal to a thickness of the liquid crystal layer. The liquid crystal panel 11 includes a display area (a middle portion surrounded by a plate surface light blocking layer 32, which will be described later) and a non-display area (an outer area that overlaps the plate surface light blocking layer 32, which will be described later) having a frame shape and surrounding the display area. Images are not displayed in the non-display area. The long-side direction, the short-side direction, and the thickness direction of the liquid crystal panel 11 correspond to the X-axis direction, the Y-axis direction, and the Z-axis direction, respectively.

One of the substrates 11a and 11b on the front side is a CF substrate 11a and the other on the rear side (a backside) is an array substrate 11b. On an inner side of the array substrate 11b (on the liquid crystal layer side, a side opposite the CF substrate 11a), a number of thin film transistors (TFTs), which are switching components, and a number of pixel electrodes are arranged. Gate lines and source lines are arranged in a grid to surround the TFTs and the pixel electrodes. Predetermined image signals are supplied from a control circuit, which is not illustrated, to each line. The pixel electrodes arranged in rectangular areas surrounded by the gate lines and the source lines are transparent electrodes made of indium tin oxide (ITO) or zinc oxide (ZnO).

On the CF substrate 11a, a number of the color filters are arranged at points corresponding to pixels. The color filters include three colors of R, G and B arranged in repeating manner. The light blocking layer (a black matrix) is formed among the color filters for reducing color mixture. On surfaces of the color filters and the light blocking layer, a counter electrode is disposed to be opposed to the pixel electrodes on the array substrate 11b. The CF substrate 11a is slightly larger than the array substrate 11b. On the inner surfaces of the substrates 11a and 11b, alignment films are formed, respectively, for alignment of the liquid crystal molecules in the liquid crystal layer. Polarizing plates 11c and 11d are attached to outer surfaces of the substrates 11a and 11b, respectively (FIG. 5).

Figure 2:
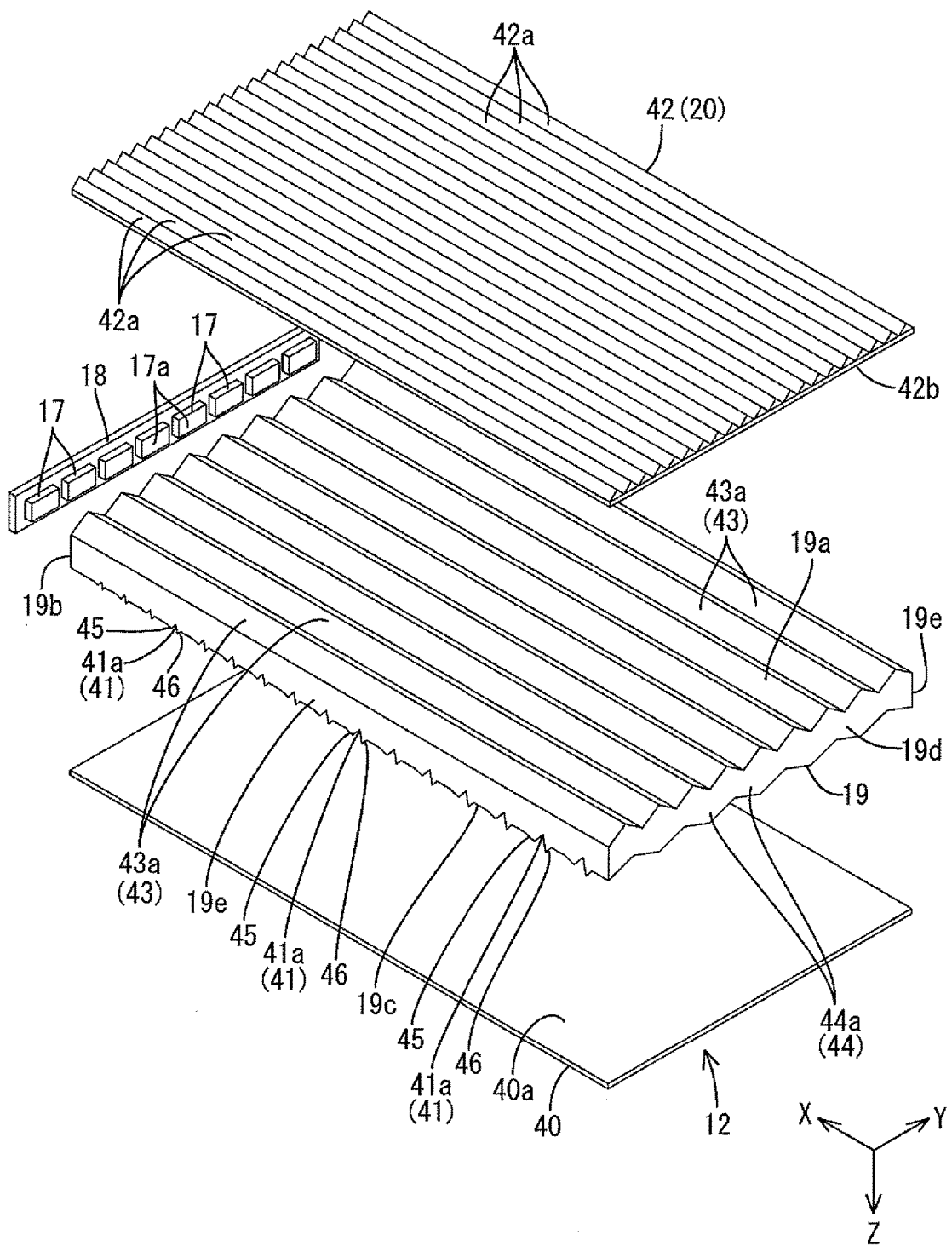
FIG. 2 is an exploded perspective view illustrating schematic configuration of a backlight unit included in the liquid crystal display device.

Next, the backlight unit 12 of the liquid crystal display unit LDU will be described in detail. As illustrated in FIG. 1, the backlight unit 12 has a rectangular block-like overall shape in a plan view similar to the liquid crystal panel. As illustrated in FIGS. 2 to 4, the backlight unit 12 includes light emitting diodes (LEDs) 17, an LED board (a light source board) 18, a light guide plate 19, a reflecting sheet (a reflecting member) 40, an optical sheet (a light exiting-side anisotropic light collecting portion, an optical member) 20, a light blocking frame 21, a chassis 22, and a heat dissipating member 23. The LEDs 17 are light sources. The LEDs 17 are mounted on the LED board 18. The light guide plate 19 is configured to guide light from the LEDs 17. The reflecting sheet 40 is configured to reflect light from the light guide plate 19. The optical sheet 20 is laid on the light guide plate 19. The light blocking frame 21 presses the light guide plate 19 from the front side. The chassis 22 holds the LED board 18, the light guide plate 19, the optical sheet 20, and the light blocking frame 21 therein. The light dissipating member 23 is mounted on an outer surface of the chassis 22. In this backlight unit 12, the LEDs 17 (the LED board 18) is disposed closer to one of ends of a short dimension of the backlight unit 12 among portions of the periphery of the backlight unit 12, that is, the backlight unit 12 is an edge-light type (a side-light type) which uses a one-side light input method.

Figure 5:
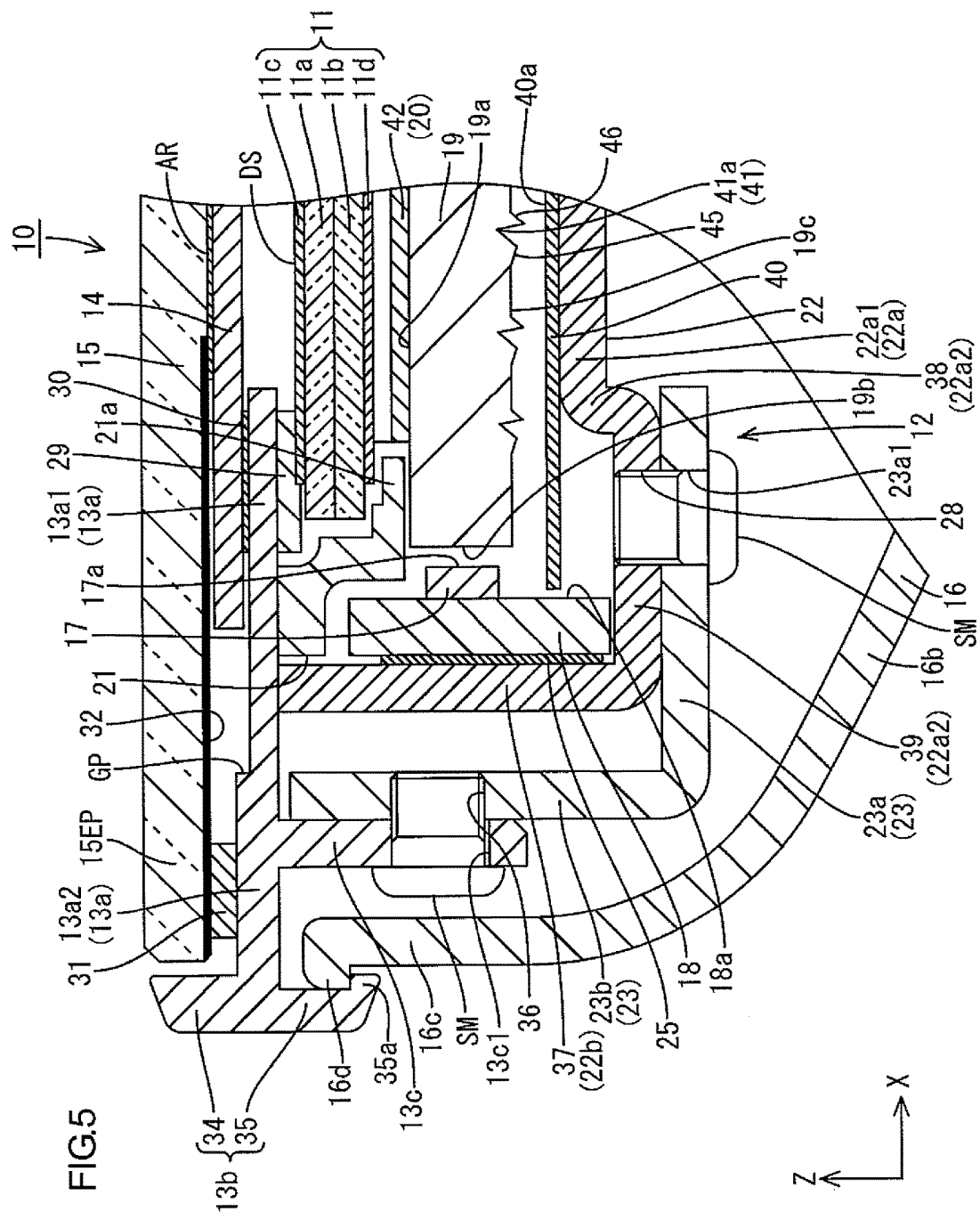
FIG. 5 is a magnified cross-sectional view of an LED and therearound illustrated in FIG. 3.

As illustrated in FIGS. 2, 3 and 5, each LED 17 includes an LED chip mounted on a substrate that is fixed to the LED board 18 and sealed with a resin. The LED chip mounted on the substrate has one kind of main light emitting wavelength. Specifically, the LED chip emits light in single-color of blue. The resin that seals the LED chip contains phosphors dispersed therein. The phosphors emit light in specific color when excited by blue light emitted by the LED chip. The LED 17 emits substantially white light. The phosphors may be a combination of any of yellow phosphors that emit yellow light, green phosphors that emit green light, and red phosphors that emit red light, or any one of those. The LED 17 includes a light emitting surface 17a opposite from a mounting surface that is mounted to the LED board 18, that is, the LED 17 is a top surface emitting type.

As illustrated in FIGS. 2, 3 and 5, the LED board 18 has a longitudinal plate shape that extends along the Y-axis direction (a short-side direction of the light guide plate 19 and the chassis 22). The LED board 18 is held in the chassis 22 with plate surfaces thereof parallel to the Y-axis direction and the Z-axis direction, that is, with the plate surfaces perpendicular to plate surfaces of the liquid crystal panel 11 and the light guide plate 19. Namely, a long-side direction and a short-side direction of the plate surfaces of the LED board 18 are aligned with the Y-axis direction and the Z-axis direction, respectively. Furthermore, a thickness direction of the LED board 18 perpendicular to the plate surfaces is aligned with the X-axis direction. The plate surface of the LED board facing inward (a mounting surface 18a) is opposed to one of short end surfaces of the light guide plate 19 (a light entering surface 19b, a light source opposed end surface) with a predetermined distance apart in the X-axis direction. A direction in which the LED 17 and the LED board 18 is arranged relative to the light guide plate 19 is substantially equal to the X-axis direction. The LED board 18 has a length about equal to or larger than the short-side length of the light guide plate 19. The LED board 18 is mounted to one of short ends of the chassis 22, which will be described later.

As illustrated in FIG. 5, the plate surface of the LED board 18 on the inner side, that is, facing the light guide plate 19 (a surface opposed to the light guide plate 19) is the mounting surface 18a on which the LEDs 17 having the above configuration are surface mounted. The LEDs 17 on the mounting surface 18a of the LED board 18 are (linearly) arranged in a line along a length direction of the LED board 18 (the Y-axis direction) at predetermined intervals. Namely, the LEDs 17 are arranged at intervals along the short-side direction of the backlight unite 12 at one of the short sides. The intervals of the LEDs 17 (arrangement pitches) are about equal to one another. On the mounting surface 18a of the LED board 18, a wiring pattern (not illustrated) made of metal film (copper foil) is formed for connecting the LEDs 17 to one another in series. The wiring pattern extends along the Y-axis direction and across the LEDs 17. Terminals are formed at ends of the wiring pattern and connected to an external LED driver circuit for supplying driving power to the LEDs 17. A base material of the LED board 18 is made of metal, similar to the chassis 22. The wiring pattern (not illustrated) is formed on a surface of the base material via an insulating layer. An insulating material such as ceramic may be used for the base material of the LED board 18.

Figure 6:
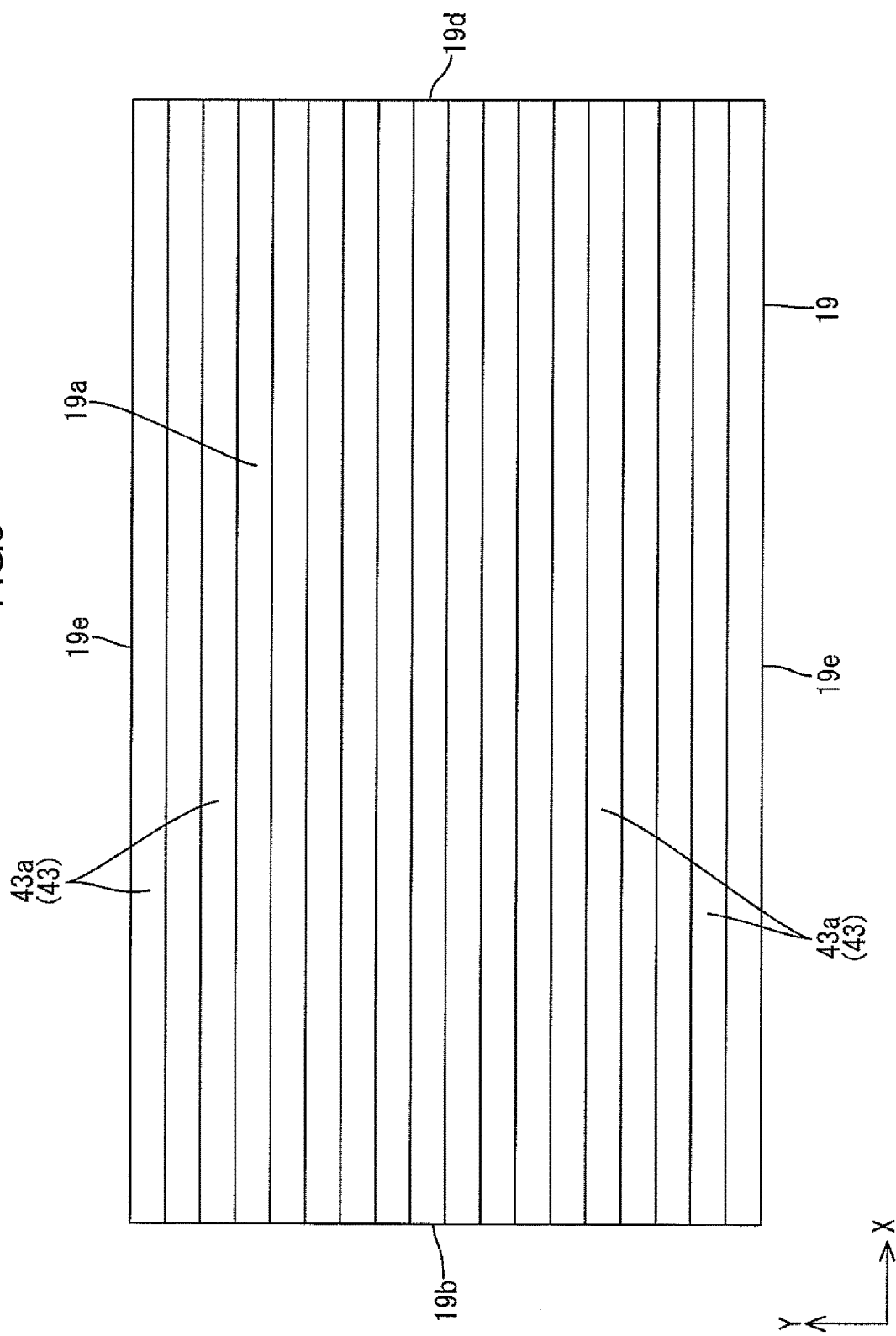
FIG. 6 is a top view of a light guide plate.

The light guide plate 19 is made of synthetic resin (e.g., polycarbonate (PC) having high durability) which has a refractive index sufficiently higher than that of the air and is substantially transparent and thus has high light transmissivity. As illustrated in FIGS. 2 and 6, the light guide plate 19 has a substantially rectangular flat plate shape in a plan view, similar to the liquid crystal panel 11. Plate surfaces of the light guide plate 19 are parallel to the plate surface (the display surface DS) of the liquid crystal panel 11. Along-side direction and a short-side direction of the plate surfaces of the light guide plate 19 are aligned with the X-axis direction and the Y-axis direction, respectively. A thickness direction of the light guide plate 19 perpendicular to the plate surfaces thereof is aligned with the Z-axis direction. As illustrated in FIGS. 3 and 4, the light guide plate 19 is disposed below the liquid crystal panel 11 and the optical sheet 20 inside the chassis 22. One of the short end surfaces of the end surfaces of the light guide plate 19 is opposed to the LED board 18 and the LEDs 17 arranged at the short end of the chassis 22. Therefore, a direction in which the LEDs 17 (the LED board 18) are arranged relative to the light guide plate 19 is aligned with the X-axis direction and a direction in which the optical sheet 20 (the liquid crystal panel 11) is arranged relative to the light guide plate 19 (or in which the optical sheet 20 overlaps the light guide plate 19) is aligned with the Z-axis direction. These two directions are perpendicular to each other. The light guide plate 19 has a function to receive light from the LEDs 17 to the light guide plate 19 along the X-axis direction (the direction the LEDs 17 are arranged relative to the light guide plate 19) through the short end surface, to transmit the light therethrough toward the optical sheet 20 (the front side, the light exiting side), and to output the light through the plate surface.

As illustrated in FIGS. 3 and 4, the plate surface of the flat plate shaped light guide plate 19 facing the front side (the light exiting side) (the surface opposed to the liquid crystal panel 11 and the optical sheet 20) is a light exiting surface 19a through which light inside the light guide plate 19 exits toward the optical sheet 20 and the liquid crystal panel 11. As illustrated in FIG. 5, one of the short end surfaces (the left end surface in FIG. 3) having an elongated shape along the Y-axis direction (the direction in which the LEDs 17 are arranged, the long-side direction of the LED board 18) of the end surfaces adjacent to the plate surface of the light guide plate 19 is opposed to the LEDs 17 (the LED board 18) with a predetermined gap. The short end surface is a light entering surface 19b through which the light emitted by the LEDs 17 enters, that is, an LED opposed end surface (a light source opposed end surface) which is opposed to the LEDs 17. The light entering surface 19b is a surface parallel to the Y-axis direction and the Z-axis direction and substantially perpendicular to the light exiting surface 19a. A direction in which the LEDs 17 are arranged relative to the light entering surface 19b (the light guide plate 19) is aligned with the X-axis direction and parallel to the light exiting surface 19a. The other one of the short end surfaces of the end surfaces of the light guide plate 19 away from the light entering surface 19b (the end surface opposite to the light entering surface 19b) is referred to as an opposite end surface 19d. Long end surfaces (opposite to each other and not including the light entering surface 19b) adjacent to the light entering surface 19b and the opposite end surface 19d are referred to as side end surfaces 19e. The side end surfaces 19e are parallel to the X-axis direction (the direction in which the LEDs 17 are arranged relative to the light guide plate 19) and the Z-axis direction. As illustrated in FIGS. 3 and 4, three end surfaces of the end surfaces of the light guide plate 19 except for the light entering surface 19b are LED non-opposed end surfaces (light source non-opposed end surfaces) which are not opposed to the LEDs 17. Rays of light from the LEDs 17 enters the light guide plate 19 through the light entering surface 19b, which is the end surface of the light guide plate 19. The rays of light may be totally reflected by the reflecting sheet 40, which will be described later, the light exiting surface 19a, the opposite plate surface 19c, and the other end surfaces (the opposite end surface 19d and the side end surfaces 19e). As a result, the rays of light are efficiently transmitted through the light guide plate 19. If the light guide plate 19 is made of polycarbonate, the refractive index is about 1.585 and thus a critical angle may be about 39 degrees. A direction along a pair of the end surfaces of the light guide plate 19 opposed to each other and excluding the light entering surface 19b (the long end surfaces, the side end surfaces 19e) (the X-axis direction) may be referred to as a "first direction." A direction along a pair of the end surfaces opposed to each other and including the light entering surface 19b (the short end surfaces, the light entering surface 19b and the opposite end surface 19d) (the Y-axis direction) may be referred to as a "second direction." A direction normal to the plate surface of the light guide plate 19 (a direction perpendicular to the first direction and the second direction, the thickness direction of the light guide plate 19) may be referred to as a "third direction."

As illustrated in FIGS. 3 and 4, the plate surface of the plate surfaces of the light guide plate 19 facing the rear side (a side opposite from the light exiting side) (a surface opposed to the reflecting sheet 40 and a bottom plate 22a of the chassis 22), that is, the plate surface opposite from the light exiting surface 19a is referred to as an opposite plate surface 19c. The reflecting sheet 40 is attached to the opposite plate surface 19c to cover an about entire area of the opposite plate surface 19c for reflecting the light from the light guide plate 19 toward the front side, that is, toward the light exiting surface 19a side. The reflecting sheet 40 is arranged between the bottom plate 22a of the chassis 22 and the light guide plate 19. The reflecting sheet 40 is opposed to the opposite plate surface 19c of the light guide plate 19 and includes a reflecting surface 40a for reflecting light to efficiently transmit the light reflected by the reflecting surface 40a through the light guide plate 19. As illustrated in FIG. 5, an end of the reflecting sheet 40 on the light entering surface 19b side is outer than the light entering surface 19b, that is, extends toward the LEDs 17. By reflecting light from the LEDs 17 by the extending portion, efficiency of light entering through the light entering surface 19b improves. A predetermined gap is provided between the reflecting sheet 40 and the opposite plate surface 19c of the light guide plate 19.

Figure 10:
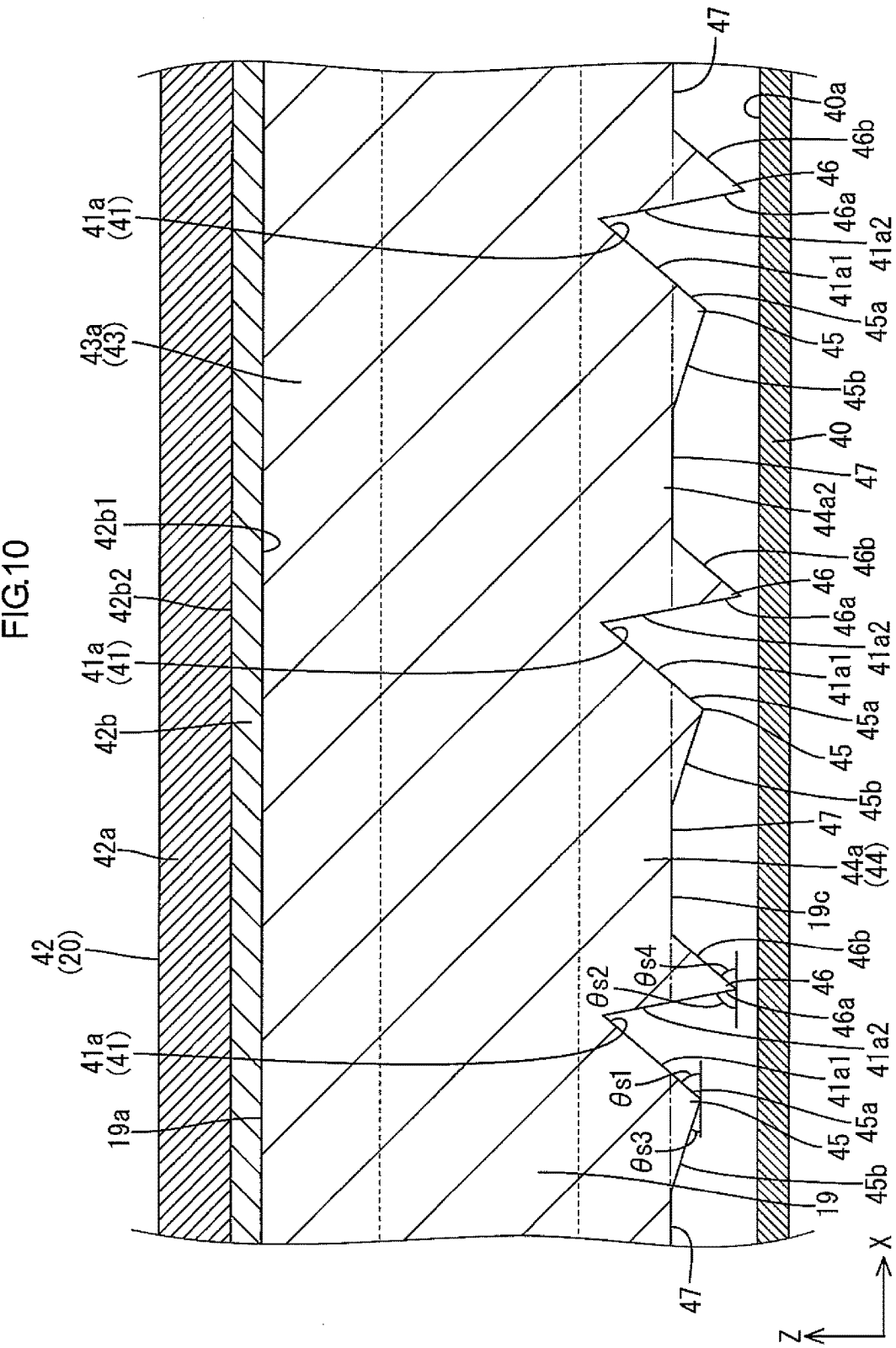
FIG. 10 is a cross-sectional view along line A-A in FIG. 9.
Figure 11:
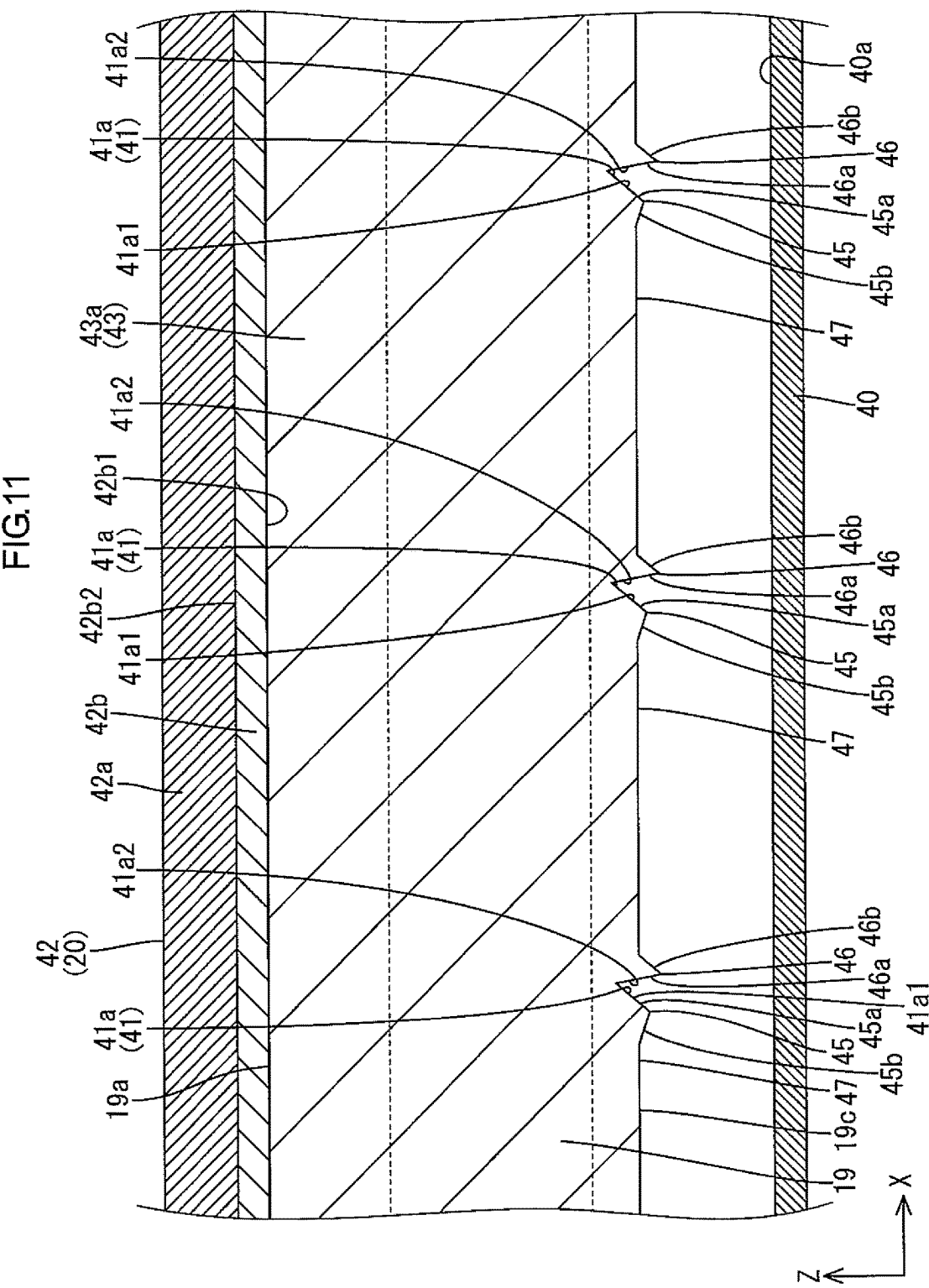
FIG. 11 is a cross-sectional view along line B-B in FIG. 9.

As illustrated in FIGS. 3 and 5, the opposite plate surface 19c of the light guide plate 19 includes a light emission reflecting portion 41 for reflecting rays of light traveling through the light guide plate 19 and for increasing the number of rays exiting through the light exiting surface 19a. The light emission reflecting portion 41 extends along the second direction of the opposite plate surface of the light guide plate 19 (the Y-axis direction) and includes unit reflecting portions (unit light emission reflecting portions) 41a. Each unit reflecting portion 41a has a substantially triangular cross section. The unit reflecting portions 41a are arranged at intervals along the first direction (the X-axis direction) (intermittent arrangement). Each unit reflecting portion 41a includes a main reflecting surface 41a1 and a light reentering surface 41a2. The main reflecting surface 41a1 is located on the LED 17 side (the light entering surface 19b side). The light reentering surface 41a2 is located a side opposite from the LED 17 side (on the opposite end surface 19d side). The main reflecting surface 41a1 is a sloped surface that inclines along the first direction to the side opposite to the LED 17 side (the opposite end surface 19d side) to get closer to the light exiting surface 19a. The light reentering surface 41a2 is a sloped surface that declines along the first direction to the side opposite to the LED 17 side to get farther from the light exiting surface 19a. It is preferable to set an angle θs1 of the main reflecting surface 41a1 relative to the light exiting surface 19a or the opposite plate surface 19c in a range from 40° to 50°. In FIGS. 10 and 11, the angle θs1 is about 45°. It is preferable to set an angle θs2 of the light reentering surface 41a2 relative to the light exiting surface 19a or the opposite plate surface 19c in a range from 70° to 90°. In FIGS. 10 and 11, the angle θs2 is about 80°. Namely, the angle θs1 of the main reflecting surface 41a1 is smaller than the angle θs2 of the light reentering surface 41a2. Each unit reflecting portion 41a is configured to reflect light by the main reflecting surface 41a1 on the light entering surface 19b with respect to the first direction to produce light with an incidence to the light exiting surface 19a is smaller than the critical angle to increase the number of rays of light exiting through the light exiting surface 19a. The light reentering surface 41a2 of each unit reflecting portion 41a is configured to reenter rays of light exiting through the main reflecting surface 41a1 with an incidence to the main reflecting surface 41a1 smaller than the critical angle to the light guide plate 19. The unit reflecting portions 41a arranged along the first direction gradually increase in height (dimension in the third direction) as a distance from the light entering surface 19b (the LEDs 17). Furthermore, the areas (surface areas) of the main reflecting surfaces 41a1 and the light reentering surfaces 41a2 gradually increase as the distance from the light entering surface 19b (the LEDs 17) in the first direction increases. According to the configuration, the light exiting through the light exiting surface 19a is controlled to have even distribution within the light exiting surface 19a. The unit reflecting portions 41a are arranged at intervals with respect to the first direction (arrangement pitches) which gradually increase as a distance from the LEDs 17 increases.

As illustrated in FIGS. 2 to 4, the optical sheet 20 has a rectangular shape in a plan view similar to the liquid crystal panel 11 and the chassis 22. The optical sheet 20 is laid over the light exiting surface 19a of the light guide plate 19 on the front side (the light exiting side). Namely, the optical sheet 20 is arranged between the liquid crystal panel 11 and the light guide plate 19 to add optical effects to light from the light guide plate 19 while the light is transmitting therethrough and to output the light toward the liquid crystal panel 11. The optical sheet 20 will be described in detail later.

As illustrated in FIGS. 3 and 4, the light blocking frame 21 is formed in a substantially frame shape along an outer peripheral portion (an outer edge portion) of the light guide plate 19. The light blocking frame 21 presses the outer peripheral portion of the light guide plate 19 for about entire area. The light blocking frame 21 is made of synthetic resin and includes a black surface having light blocking effect. The light blocking frame 21 includes an inner edges 21a arranged in an area defined by the outer peripheral portion of the light guide plate 19, LEDs 17, and outer peripheral portions (outer edge portions) of the liquid crystal panel 11 and the optical sheet 20 for an entire periphery. The light blocking frame 21 optically isolates the outer peripheral portion of the light guide plate 19, LEDs 17, and outer peripheral portions of the liquid crystal panel 11 and the optical sheet 20. According to the configuration, rays of light emitted by the LEDs 17 but not entering the light guide plate 19 through the light entering surface 19b or leaking through the opposite end surface 19d or the side end surfaces 19e are blocked and thus do not directly enter the peripheral portions (especially end surfaces) of the liquid crystal panel 11 and the optical sheet 20. Three side portions of the light blocking frame 21 which do not overlap the LEDs 17 and the LED board 18 in a plan view (a pair of long side portions and a short side portion opposite from the LED board 18 side) include portions projecting from the bottom plate 22a of the chassis 22 and portions supporting the frame 13 from the rear side. A short side portion that overlaps the LED 17 and the LED board 18 in a plan view covers the end portion of the light guide plate 19 and the LED board 18 (the LEDs 17) form the front side. The short side portion bridges between the long side portions. The light blocking frame 21 is fixed to the chassis 22, which will be described next, with fixing members such as screws.

The chassis 22 is made from a metal sheet having high thermal conductivity such as an aluminum sheet and an electrolytic zinc-coated steel sheet (SECC). As illustrated in FIGS. 3 and 4, the chassis 22 includes the bottom plate 22a and side plates 22b. The bottom plate 22a has a rectangular shape in a plan view similar to the liquid crystal panel 11. The side plates 22b project from outer edges of the bottom plate 22a (a pair of long edges and a pair of short edges), respectively, toward the front. The long-side direction and the short-side direction of the chassis 22 (the bottom plate 22a) are aligned with the X-axis direction and the Y-axis direction, respectively. A large portion of the bottom plate 22a is a light guide plate supporting portion 22a1 for supporting the light guide plate 19 from the rear side (the side opposite from the light exiting surface 19a). An end portion of the bottom plate 22a on the LED board 18 side is a board holding portion 22a2 that project toward the rear in a step form. As illustrated in FIG. 5, the board holding portion 22a2 has a substantially L-shaped cross section. The board holding portion 22a2 includes a riser portion 38 and a holding bottom portion 39. The riser portion 38 that project from the edge of the light guide plate supporting portion 22a1 toward the rear. The holding bottom portion 39 projects from a distal end of the riser portion 38 toward a side opposite from the light guide plate supporting portion 22a1. A turning point from the end of the light guide plate supporting portion 22a1 to the riser portion 38 is located closer to the side opposite from the LED 17 side than the light entering surface 19b of the light guide plate 19 (closer to the center of the light guide plate supporting portion 22a1. Distal ends of the holding bottom portion 39 are curved such that the long side plates 22b project toward the front. The LED board 18 is mounted to the short side plate 22b continuing from the board holding portion 22a2. The side plate 22b forms a board mounting portion 37. The board mounting portion 37 includes an opposed surface that is opposed to the light entering surface 19b of the light guide plate 19. The LED board 18 is mounted to the opposed surface. A plate surface of the LED board 18 opposite from the mounting surface 18a on which the LEDs 17 are mounted is bonded to an inner plate surface of the board mounting portion 37 with a board bonding member 25 such as a double sided adhesive tape. A small gap is provided between the bonded LED board 18 and an inner plate surface of the holding bottom portion 39 of the board holding portion 22a2. A liquid crystal panel driver circuit board (not illustrated) for controlling the driving of the liquid crystal panel 11, an LED driver circuit board (not illustrated) for supplying driving power to the LEDs 17, and a touch panel driver circuit board (not illustrated) for controlling the driving of the touch panel 14 are mounted on a backside plate surface of the bottom plate 22a of the chassis 22.

The heat dissipating member 23 is made from a metal sheet having high thermal conductivity such as an aluminum sheet. As illustrated in FIG. 3, the heat dissipating member 23 extends along one of the short-side portion of the chassis 22, specifically, the board holding portion 22a2 that holds the LED board 18. As illustrated in FIG. 5, the heat dissipating member 23 has a substantially L shape cross section and includes a first heat dissipating portion 23a and a second heat dissipating portion 23b. The first heat dissipating portion 23a is parallel to an outer surface of the board holding portion 22a2 and in contact with the outer surface. The second heat dissipating portion 23b continues to the board holding portion 22a2 and is parallel to an outer surface of the side plate 22b (the board mounting portion 37). The first heat dissipating portion 23a has an elongated plate shape that extends along the Y-axis direction. A plate surface of the first heat dissipating portion 23a parallel to the X-axis direction and the Y-axis direction and facing the front is in contact with an outer surface of the holding bottom portion 39 of the board holding portion 22a2 for an about entire length. The first heat dissipating portion 23a is fixed to the holding bottom portion 39 with screws SM. The first heat dissipating portion 23a includes screw insertion holes 23a1. The holding bottom portion 39 includes screw holes 28 for the screws SM to screw. According to the configuration, heat produced by the LEDs 17 is transmitted to the first heat dissipating portion 23a via the LED board 18, the board mounting portion 37, and the board holding portion 22a2. The screws SM are screwed to the first heat dissipating portion 23a at intervals along an extending direction of the first heat dissipating portion 23a. The second heat dissipating portion 23b has an elongated plate shape that extends along the Y-axis direction. A plate surface of the second heat dissipating portion 23b parallel to the Y-axis direction and the Z-axis direction and facing the inner side is opposed to an outer plate surface of the board mounting portion 37 with a predetermined gap therebetween.

Next, the frame 13 of the liquid crystal display unit LDU will be described. The frame 13 is made of metal having high thermal conductivity such as aluminum. As illustrated in FIG. 1, the frame 13 has a rectangular frame-like (a picture frame-like) overall shape in a plan view along the peripheral portions (outer edge portions) of the liquid crystal panel 11, the touch panel 14, and the cover panel 15. A method of producing the frame 13 may include metal stamping. As illustrated in FIGS. 3 and 4, the frame 13 presses the outer peripheral portion of the liquid crystal panel 11 from the front side. The frame 13 and the chassis 22 of the backlight unit 12 hold the liquid crystal panel 11, the optical sheet 20, and the light guide plate 19, which are laminated, therebetween. The frame 13 receives the outer peripheral portions of the touch panel 14 and the cover panel 15 from the rear side. The frame 13 is arranged between the liquid crystal panel 11 and the touch panel 14. According to the configuration, a predetermined gap is provided between the liquid crystal panel 11 and the touch panel 14. If an external force is applied to the cover panel 15 and the touch panel 14 curves toward the liquid crystal panel 11 along the cover panel 15, the curved touch panel 14 is less likely to affect the liquid crystal panel 11.

As illustrated in FIGS. 3 and 4, the frame 13 includes a frame portion (a frame base, a picture frame-like portion) 13a, an annular portion (a tubular portion) 13b, and mounting plate portions 13c. The frame portion 13a has a shape along the outer peripheral portions of the liquid crystal panel 11, the touch panel 14, and the cover panel 15. The annular portion 13b surrounds the touch panel 14, the cover panel 15, and the case 16 from the outer peripheral side. The mounting plate portions 13c protrude from the frame portion 13a toward the rear and are mounted to the chassis 22 and the heat dissipating member 23. The frame portion 13a includes a plate surface parallel to the plate surfaces of the liquid crystal panel 11, the touch panel 14, and the cover panel 15 formed in a substantially plate shape and is formed in a rectangular plate shape in a plan view. The frame portion 13a includes an inner peripheral portion 13a1 and an outer peripheral portion 13a2 having a thickness lager than the inner peripheral portion 13a1 and thus a gap GP is present at a boundary between the inner peripheral portion 13a1 and the outer peripheral portion 13a2. The inner peripheral portion 13a1 is arranged between the outer peripheral portion of the liquid crystal panel 11 and the outer peripheral portion of the touch panel 14. The outer peripheral portion 13a2 receives the outer peripheral portion of the cover panel 15. Because the front plate surfaces of the frame portion 13a are covered with the cover panel 15 for about entire areas, the front plate surface is less likely to be exposed to the outside. According to the configuration, even if temperatures of the LEDs increase due to heat, a user of the liquid crystal display device 10 is less likely to directly touch an exposed portion of the frame 13, that is, this configuration provides a high level of safety. As illustrated in FIG. 5, cushioning members 29 are fixed to the back plate surfaces of the inner peripheral portion 13a1 of the frame portion 13a. The cushioning members 29 function as cushions for the outer peripheral portion of the liquid crystal panel 11 and for pressing the outer peripheral portion of the liquid crystal panel 11 from the front. First fixing members 30 are fixed to the back plate surfaces of the inner peripheral portion 13a1. The first fixing members 30 function as cushions and fixtures for the outer peripheral portion of the touch panel 14. The cushioning members 29 and the first fixing members 30 are arranged to overlap each other in a plan view within the inner peripheral portion 13a1. Second fixing members 31 are fixed to the front plate surfaces of the outer peripheral portion 13a2 of the frame portion 13a. The second fixing members 31 function as cushions and fixtures for the outer peripheral portion of the cover panel 15. The cushioning members 29 and the fixing members 30 and 31 extend along side portions of the frame 13a excluding four corners. The fixing members 30 and 31 are double-sided adhesive tapes that include base members having cushioning properties.

As illustrated in FIGS. 3 and 4, the annular portion 13b has a short rectangular tubular overall shape in a plan view. The annular portion 13b includes a first annular portion 34 and a second annular portion 35. The first annular portion 34 projects from an outer peripheral edge of the outer peripheral portion 13a2 of the frame portion 13a toward the front. The second annular portion 35 projects from an outer peripheral edge of the outer peripheral portion 13a2 of the frame portion 13a toward the rear. Namely, the outer peripheral edge of the frame portion 13a is connected to an inner surface of the annular portion 13b having a short rectangular tubular shape at about the middle with respect to an axial direction thereof (the Z-axis direction) for an entire periphery. The first annular portion 34 is disposed to surround the outer peripheral surfaces of the touch panel 14 and the cover panel 15 on the front side relative to the frame portion 13a for entire peripheries. An inner peripheral surface of the first annular portion 34 is opposed to the outer peripheral surfaces of the touch panel 14 and the cover panel 15. An outer peripheral surface of the first annular portion 34 is exposed to the outside of the liquid crystal display device 10 and forms an exterior of side portions of the liquid crystal display device 10. The second annular portion 35 surrounds an end of the case 16 on the front side (a mounting portion 16c) disposed on the rear side relative to the frame portion 13a from the outer peripheral side. An inner peripheral surface of the second annular portion 35 is opposed to the mounting portion 16c of the case 16, which will be descried later. An outer peripheral surface of the second annular portion 35 is exposed to the outside of the liquid crystal display device 10 and forms an exterior of side portions of the liquid crystal display device 10. Frame-side locking lugs 35a are formed at distal ends of the second annular portion 35. While the case 16 is hooked to the frame-side locking lug 35a, the case 16 remains mounted.

As illustrated in FIGS. 3 and 4, each mounting plate portion 13c has a plate shape that projects from the outer peripheral portion 13a2 of the frame portion 13a toward the rear and extends along the sides of the frame portion 13a. Plate surfaces of each mounting plate portion 13c are substantially perpendicular to the plate surfaces of the frame portion 13a. The mounting plate portions 13c are provided for the side portions of the frame portion 13a, respectively. The mounting plate portion 13c for the short side portion of the frame portion 13a on the LED board 18 side includes a plate surface facing the inner side. The mounting plate portion 13c is mounted such that the plate surface is in contact with the outer plate surface of the second heat dissipating portion 23b of the heat dissipating member 23. The mounting plate portion 13c is mounted to the second heat dissipating portion 23b with screws SM. The mounting plate portion 13c includes screw insertion holes 13c1 in which the screws SM are inserted. The second heat dissipating portion 23b includes screw holes 36 in which the screws SM are screwed. According to the configuration, heat from the LEDs 17 transmitted to the first heat dissipating portion 23a then to the second heat dissipating portion 23b is transmitted to an entire portion of the frame 13. This configuration efficiently releases the heat. The mounting plate portions 13c are indirectly fixed to the chassis 22 via the heat dissipating member 23. The mounting plate portions for the short-side portion of the frame portion 13a on the side opposite from the LED board 18 and the long-side portions of the frame portion 13a are fixed with screws SM such that the plate surfaces thereof facing the inner side are in contact with the outer surfaces of the respective side plates 22b of the chassis 22. The mounting plate portions 13c includes screw insertion holes 13c1 in which the screws SM are inserted. The side plates 22b includes screw holes 36 in which the screws SM are screwed. The screws SM are screwed to the mounting plate portions 13c at intervals along the extending directions of the respective mounting plate portions 13c.

Next, the touch panel 14 attached to the frame 13 described above will be described. As illustrated in FIGS. 1, 3 and 4, the touch panel 14 is a position input device for a user to input information on positions within a display surface DS of the liquid crystal panel 11. The touch panel 14 includes a predetermined touch pattern (not illustrated) formed on a substantially transparent glass substrate that has a rectangular shape and high light transmissivity. Specifically, the touch panel 14 includes the glass substrate that has the rectangular shape in a plan view similar to the liquid crystal panel 11. Transparent electrode portions for the touch panel, which are included in the touch panel pattern, are formed on a plate surface of the glass substrate facing the front. The touch panel pattern is for a so-called projected-capacitive touch screen. A large number of the transparent electrode portions for the touch panel are arranged in a grid within the plate surface of the substrate. At one of short ends of the touch panel 14, terminal portions (not illustrated) are formed. The terminal portions are connected to ends of traces drawn out of the transparent electrode portions for the touch panel included in the touch panel pattern. A flexible circuit board, which is not illustrated, is connected to the terminal portions for supplying potentials from a touch panel driver circuit board to the transparent electrode portions for the touch panel included in the touch panel pattern. As illustrated in FIG. 5, an inner plate surface of an outer peripheral portion of the touch panel 14 is opposed to the inner peripheral portion 13a1 of the frame portion 13a of the frame 13 and fixed with the first fixing member 30, which is described earlier.

Next, the cover panel 15 fixed to the frame 13, which is described earlier, will be described. As illustrated in FIGS. 1, 3 and 4, the cover panel 15 is arranged to cover the touch panel 14 for an entire area from the front side. With the cover panel 15, the touch panel 14 and the liquid crystal panel 11 are protected. The cover panel 15 covers the frame portion 13a of the frame 13 for an entire area from the front side and forms an exterior of a front portion of the liquid crystal display device 10. The cover panel 15 includes a substantially transparent glass substrate having a rectangular shape in a plan view and a plate shape. The glass substrate has high light transmissivity. A toughened glass is preferable for the glass substrate. A chemically toughened glass is preferable for the toughened glass for the cover panel 15. The chemically toughened glass includes a chemically toughened layer on a surface by chemically toughening processing the surface of a glass substrate having a plate shape. The chemically toughening processing refers to a process in which alkali metal ions included in glass material are substituted by alkali metal ions having larger ion diameters through ion exchange to enhance the glass substrate having a plate shape. The chemically toughened layer produced through the above process is a compressive stress layer (an ion exchange layer) in which a compressive stress remains. Therefore, the cover panel 15 has high mechanical strength and high impact resistance and thus the touch panel 14 and the liquid crystal panel 11 behind the cover panel 15 are properly protected from damage or scratch.

As illustrated in FIGS. 3 and 4, the cover panel 15 has a rectangular shape in a plan view similar to the liquid crystal panel 11 and the touch panel 14 but slightly larger than the liquid crystal panel 11 and the touch panel 14 in a plan view. The cover panel 15 includes an extending portion 15EP that extends from the outer peripheral edges of the liquid crystal panel 11 and the touch panel 14 as in a form of an overhang. The extending portion 15EP has a substantially rectangular frame shape (a substantially picture frame shape) which surrounds the liquid crystal panel 11 and the touch panel 14. As illustrated in FIG. 5, an inner plate surface of the extending portion 15EP is opposed to the outer peripheral portion 13a2 of the frame portion 13a of the frame and fixed with the second fixing member 31, which is described earlier. A central portion of the cover panel 15 opposed to the touch panel 14 is laid over the touch panel 14 on the front side via the anti-reflection film AR.

As illustrated in FIGS. 3 and 4, a plate surface light blocking layer (a light blocking layer, a plate surface light blocking portion) 32 is formed on an inner plate surface (on the rear side) (a plate surface facing the touch panel 14) of an outer peripheral portion of the cover panel 15 including the extending portion 15EP described above for blocking light. The plate surface light blocking layer 32 is made of light blocking material such as black paint. The light blocking material is applied on the inner surface of the cover panel 15 to form the plate surface light blocking layer 32 integrally with the plate surface. To form the plate surface light blocking layer 32, printing including screen printing and ink-jet printing may be used. The plate surface light blocking layer 32 is formed in an area of the cover panel 15 overlapping the outer peripheral portions of the touch panel 14 and the liquid crystal panel 11 inner than the extending portion 15EP in a plan view in addition to the entire area of the extending portion 15EP. Namely, the plate surface light blocking layer 32 is formed to surround the display area of the liquid crystal panel 11. Therefore, the plate surface light blocking layer 32 blocks light outside the display area and thus display quality regarding images displayed in the display area improves.

Next, the case 16 attached to the frame 13 will be described. The case 16 is made of synthetic resin or metal. As illustrated in FIGS. 1, 3 and 4, the case 16 has a bowl-like shape that opens toward the front and covers the components including the frame portion 13a and the mounting plate portion 13c of the frame 13, the chassis 22, and the heat dissipating member 23. The case 16 forms an interior of a back portion of the liquid crystal display device 10. The case 16 includes a bottom portion 16a, curved portions 16b, and the mounting portions 16c. The bottom portion 16a is substantially flat. The curved portions 16b project from outer boundaries of the bottom portion 16a toward the front and has curved cross sections. The mounting portions 16c project substantially straight up from outer boundaries of the curved portions 16b toward the front. The mounting portions 16c include case-side locking lugs 16d having hook shape cross sections. With the case-side locking lugs 16d hooked to the frame-side locking lugs 35a of the frame 13, the case 16 remains mounted to the frame 13.

The backlight unit 12 according to this embodiment has a configuration for collecting rays of exiting light with respect to the second direction (the Y-axis direction). A reason for that and the configuration will be described. As illustrated in FIGS. 3 and 5, rays of light transmitting through the light guide plate 19 may be reflected by the main reflecting surface 41a1 of the light reflecting portion 41 and angled. Incidences of the rays of light to the light exiting surface 19a are equal to or smaller than the critical angle. Therefore, the rays of light exit through the light exiting surface 19a. The rays of light traveling in the first direction (the X-axis direction) are angled by the unit reflecting portions 41a toward the front, that is, to travel along a direction normal to the light exiting surface 19a from the light exiting surface 19a toward the front to collect the rays of light roughly in a certain direction. The light reflecting portion 41 collects the rays of light traveling in the first direction but is less likely to collect the rays of light traveling in the second direction. Therefore, the rays of light exiting through the light exiting surface 19a may cause anisotropy in brightness. This embodiment has the following configuration for collecting the rays of light traveling in the second direction. As illustrated in FIG. 2, the optical sheet 20 includes a single prism sheet (alight exiting-side anisotropic light collecting portion) 42 having a light collecting anisotropy for selectively collecting the rays of light traveling in the second direction. The opposite plate surface 19c of the light guide plate 19 includes an opposite plate surface-side prism portion (an opposite plate surface-side anisotropic light collecting portion) 44 having light collecting anisotropy for selectively collecting the rays of light traveling in the second direction. Next, the prism sheet 42, the light exiting surface-side prism portion 43, and the opposite plate surface-side prism portion 44 will be described in detail.

Figure 9:
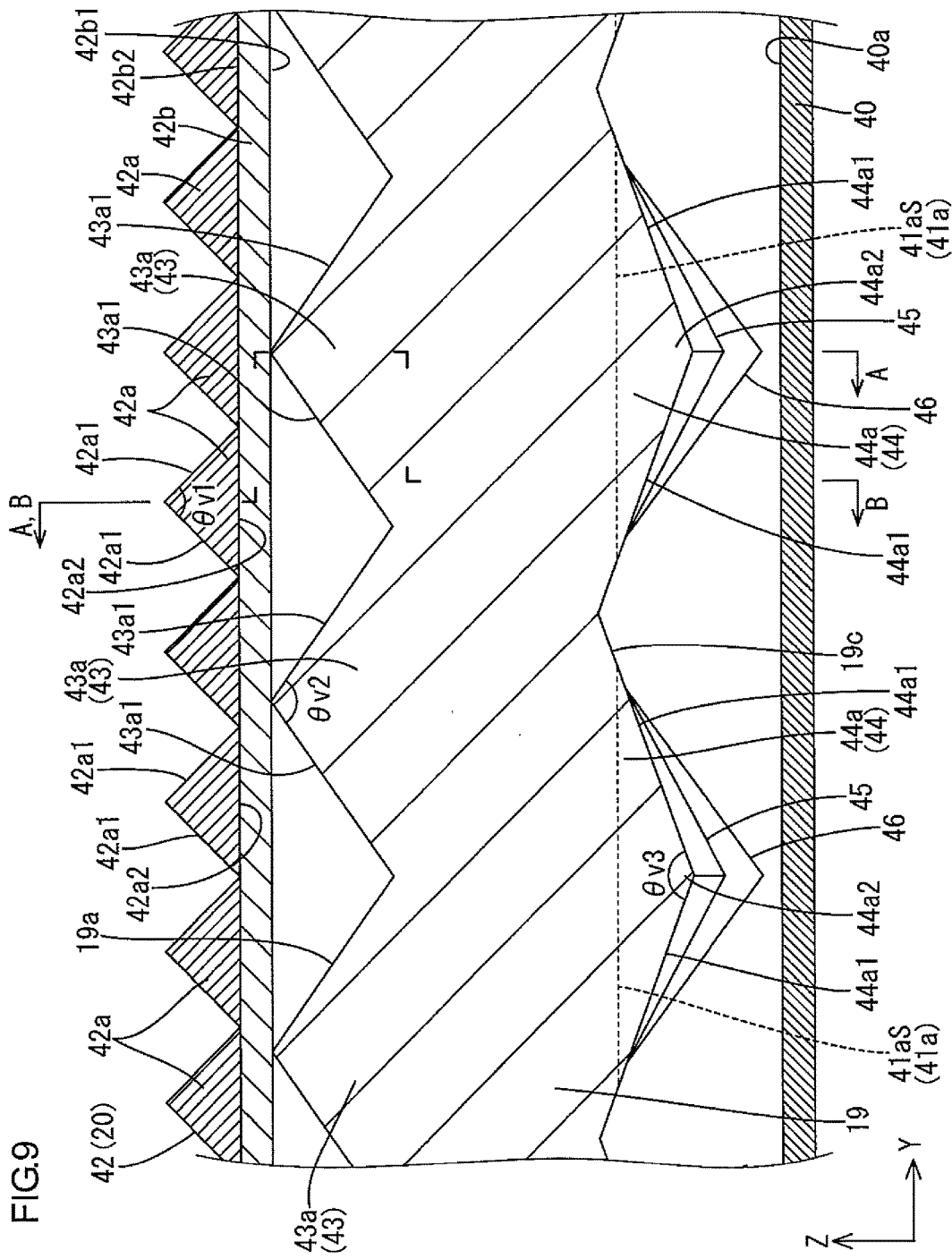
FIG. 9 is a cross-sectional view of a backlight unit in the liquid crystal display device along the short-side direction (the second direction, the Y-axis direction).

As illustrated in FIGS. 2 and 9, the prism sheet 42 includes a sheet base 42b and light exiting-side unit prisms (light exiting-side unit light collecting portions) 42a. The sheet base 42b has a sheet shape. The light exiting-side unit prisms 42a are formed on a light exiting-side plate surface 42b2 of the sheet base 42b opposite from a light entering-side plate surface 42b1 through which the rays of light from the light guide plate 19 enter (i.e., on a light exiting side). The light exiting-side unit prisms 42a have light collecting anisotropy. The sheet base 42b is made of substantially transparent synthetic resin, for example, thermoplastic resin such as PET. The sheet base 42b has a refractive index of about 1.667. The light exiting-side unit prisms 42a are integrally formed on the light exiting-side plate surface 42b2 that is a plate surface of the sheet base 42b on the front side (the light exiting side). The light exiting-side unit prisms 42a are made of substantially transparent ultraviolet curable resin, which is one kind of photo curable resins. In a production of the first prism sheet 42, a mold is filled with the ultraviolet curable resin that has not been cured and the sheet base 42b is placed over openings of the mold. The ultraviolet curable resin that has not been cured contacts the light exiting-side plate surface 42b2. Under this condition, ultraviolet rays are applied to the ultraviolet curable resin to cure the ultraviolet curable resin to form the light exiting-side unit prisms 42a integrally with the sheet base 42b. The ultraviolet curable resin used for the light exiting-side unit prisms 42a is an acrylic resin such as PMMA having a refractive index of about 1.59. The light exiting-side unit prisms 42a protrude from the light exiting-side plate surface 42b2 of the sheet base 42b along the third direction (the Z-axis direction) toward the front (the light exiting side). Each of the light exiting-side unit prisms 42a has a substantially triangle cross section cut along the second direction (the Y-axis direction) and extends linearly along the first direction (the X-axis direction). A number of the light exiting-side unit prisms 42a are arranged along the second direction on the light exiting-side plate surface 42b2. Each light exiting-side unit prism 42a is constant in width (dimension in the second direction) for an entire length. Each light exiting-side unit prism 42a has a substantially isosceles triangle cross section. Each light exiting-side unit prism 42a includes a pair of sloped surfaces 42a1 with a vertex angle θv1 that is about a right angle (90 degrees). A number of the light exiting-side unit prisms 42a arranged along the second direction have about the same vertex angle θv1. Widths of bottom surfaces 42a2 and heights of the light exiting-side unit prisms 42a are about the same. Intervals between the adjacent light exiting-side unit prisms 42a are about the same, that is, the light exiting-side unit prisms 42a are arranged at equal intervals.

As illustrated in FIG. 9, rays of light from the light guide plate 19 side enter the prism sheet 42 having such a configuration through the light entering-side plate surface 42b1 of the sheet base 42b via an air layer between the light exiting surface 19a of the light guide plate 19 and the sheet base 42b of the prism sheet 42. Therefore, when the rays of light transmitted through the sheet base 42b and exited through the light exiting-side plate surface 42b2 of the sheet base 42b enter the light exiting-side unit prisms 42a, the rays of light are refracted off interfaces according to incidences. When the rays of light transmitted through the light exiting-side unit prisms 42a reach the sloped surfaces 42a1 of the light exiting-side unit prism 42a, if the incidences are larger than the critical angle, the rays of light are totally reflected and returned to the sheet bases 42b (retroreflection). If the incidences are not larger than the critical angle, the rays of light are reflected off the interfaces and exit. The rays of light exiting through the sloped surfaces 42a1 of the light exiting-side unit prisms 42a traveling in the second direction are regulated to travel in a direction straight toward the front or close to such a direction. Namely, the rays of light travelling in the second direction are selectively collected.

Next, the light exiting surface-side prism portion 43 arranged on the light exiting surface 19a side of the light guide plate 19 will be described. The light exiting surface-side prism portion 43 is formed integrally with the light guide plate 19. To form the light exiting surface-side prism portion 43 integrally with the light guide plate 19, the light guide plate 19 may be produced by injection molding with a mold having a forming surface on which a transcription pattern for transcription of the light exiting surface-side prism portion 43 is formed. As illustrated in FIGS. 2, 6 and 9, the light exiting surface-side prism portion 43 includes a number of light exiting surface-side unit prisms (light exiting surface-side unit light collecting portions) 43a that extend along the first direction (the X-axis direction). The light exiting surface-side unit prisms 43a are arranged on the light exiting surface 19a along the second direction (the Y-axis direction). The light exiting surface-side unit prisms 43a protrude from the light exiting surface 19a toward the front (the light exiting side) along the third direction (the Z-axis direction). Each of the light exiting surface-side unit prisms 43a has a substantially triangular cross section cut along the second direction. The light exiting surface-side unit prisms 43a linearly extend along the first direction. Each light exiting surface-side unit prisms 43a is constant in width (dimension in the second direction) for an entire length with respect to the first direction. Each light exiting surface-side unit prism 43a has a substantially isosceles triangle cross section. Each light exiting surface-side unit prism 43a includes a pair of sloped surfaces 43a1 with a vertex angle θv2 that is about an obtuse angle (larger than 90 degrees), preferably in a range from 100° to 150°, more preferably about 110°. Namely, the vertex angle θv2 of each light exiting surface-side unit prism 43a is larger than the vertex angle θv1 of each light exiting-side unit prism 42a. A number of the light exiting surface-side unit prisms 43a arranged along the second direction have about the same vertex angle θv2. Widths of bottom surfaces and heights of the light exiting surface-side unit prisms 43a are about the same. Intervals between the adjacent light exiting surface-side unit prisms 43a are about the same, that is, the light exiting surface-side unit prisms 43a are arranged at equal intervals.

As illustrated in FIG. 9, the light exiting surface-side prism portion 43 having such a configuration adds anisotropic light collecting effects on the rays of light reaching the light exiting surface 19a after transmitted through the light guide plate 19 as follows. If the rays of light reaching the light exiting surface 19a enter the light exiting surface-side unit prisms 43a through the sloped surfaces 43a1 with incidences equal to or smaller than the critical angle, the rays of light are refracted off the sloped surfaces 43a1 and exit, that is, the rays of light traveling in the second direction are selectively collected. If the rays of light reaching the light exiting surface 19a enter the light exiting surface-side unit prisms 43a through the sloped surfaces 43a1 with incidences larger than the critical angle, the rays of light are totally reflected by the sloped surfaces 43a1 and returned to the opposite plate surface 19c side (retroreflection). According to the configuration, the rays of light exiting through the light exiting surface 19a are regulated to travel in a direction straight toward the front or close to such a direction. Namely, the rays of light travelling in the second direction are selectively collected.

Figure 7:
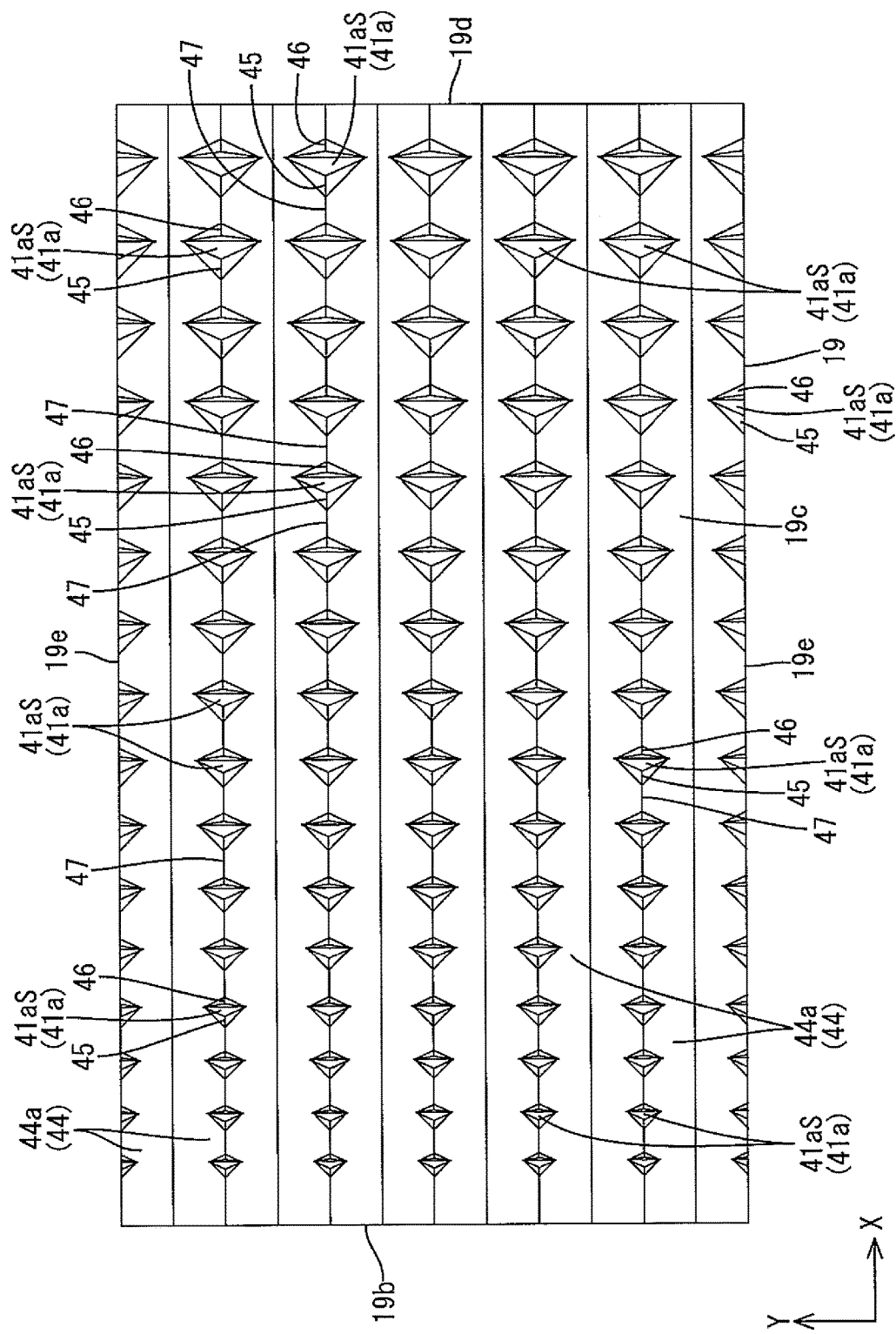
FIG. 7 is a bottom view of the light guide plate.

Next, the opposite plate surface-side prism portion 44 arranged on the opposite plate surface 19c side of the light guide plate 19. The opposite plate surface-side prism portion 44 is formed integrally with the light guide plate 19. To form the opposite plate surface-side prism portion 44 integrally with the light guide plate 19, the light guide plate 19 may be produced by injection molding with a mold having a forming surface on which a transcription pattern for transcription of the opposite plate surface-side prism portion 44 is formed. As illustrated in FIGS. 2, 7 and 9, the opposite plate surface-side prism portion 44 includes a number of opposite plate surface-side unit prisms (opposite plate surface-side unit light collecting portions) 44a that extend along the first direction (the X-axis direction). The opposite plate surface-side unit prisms 44a are arranged on the opposite plate surface 19c along the second direction (the Y-axis direction). The opposite plate surface-side prisms 44a protrude from the opposite plate surface 19c toward the rear (the opposite side from the light exiting side) along the third direction (the Z-axis direction). Each of the opposite plate surface-side prisms 44a has a substantially triangular cross section cut along the second direction. The opposite plate surface-side prisms 44a linearly extend along the first direction. Each opposite plate surface-side prisms 44a is constant in width (dimension in the second direction) for an entire length with respect to the first direction. Each of the opposite plate surface-side prisms 44a (except for those arranged at ends with respect to the second direction) has a substantially isosceles triangle cross section. Each opposite plate surface-side prism 44a includes a pair of sloped surfaces 44a1 with a vertex angle θv3 that is about an obtuse angle (larger than 90 degrees), preferably in a range from 100° to 150°, more preferably about 140°. Namely, the vertex angle θv3 of each opposite plate surface-side prism 44a is larger than the vertex angle θv1 of each light exiting-side unit prism 42a. Furthermore, the vertex angle θv3 of each opposite plate surface-side prism 44a is larger than the vertex angle θv2 of each light exiting surface-side unit prism 43a. A number of the opposite plate surface-side prisms 44a arranged along the second direction have vertex angles about the same as the vertex angle θv3. Widths of bottom surfaces and heights of the opposite plate surface-side prisms 44a are about the same. Intervals between the adjacent opposite plate surface-side prisms 44a are about the same, that is, the opposite plate surface-side prisms 44a are arranged at equal intervals. As illustrated in FIG. 2, each of two opposite plate surface-side unit prisms 44a arranged at the ends of the opposite plate surface 19c of the light guide plate 19 with respect to the second direction has a right triangle cross section. Each of the opposite plate surface-side unit prism 44a arranged at the ends includes a single sloped surface 44a1 with a vertex angle about a half of the vertex angle θv3 of each opposite plate surface-side unit prism 44a arranged on the inner side described above. Namely, each of the opposite plate surface-side unit prism 44a arranged at the ends with respect to the second direction has a shape such that the opposite plate surface-side unit prism 44a arranged on the inner side is divided into half from the vertex along the first direction and the third direction.

As illustrated in FIG. 9, the opposite plate surface-side unit prisms 44a having such a configuration add anisotropic light collecting effects on the rays of light reaching the light exiting surface 19a after transmitted through the light guide plate 19 as follows. If the rays of light reaching the light exiting surface 19a enter the opposite plate surface-side prisms 44a through the sloped surfaces 44a1 with incidences equal to or smaller than the critical angle, the rays of light are totally refracted off the sloped surfaces 44a1 and the rays of light traveling in the second direction are refracted toward the front. As illustrated in FIG. 10, the rays of light traveling in the second direction refracted by the opposite plate surface-side unit prisms 44a toward the front are reflected by the light emission reflecting portions 41 and angled toward the light exiting surface 19a. If the rays of light reaching the light exiting surface 19a enter the opposite plate surface-side prisms 44a through the sloped surfaces 44a1 with incidences larger than the critical angle, the rays of light are refracted off the sloped surfaces 44a1 and guided toward the reflecting sheet 40 as illustrated in FIG. 9. The rays of light guided toward the reflecting sheet 40 are reflected by the reflecting surface 40a of the reflecting sheet 40 and reenter the opposite plate surface-side unit prisms through the sloped surfaces 44a1 when reached the opposite plate surface 19c. Then, the rays of light reflected by the light emission reflecting portions 41 toward the light exiting surface 19a are retroreflected by the light exiting surface-side prism portion 43 at the light exiting surface 19a. Then, the rays of light travel toward the opposite plate surface 19c on which the opposite plate surface-side unit prisms 44a are formed. According to the configuration, the rays of light reaching the opposite plate surface 19c and traveling in the second direction are regulated to travel in a direction straight toward the front or close to such a direction. Namely, the rays of light travelling in the second direction are selectively collected and angled toward the light exiting surface 19a.

As illustrated in FIGS. 9 and 10, the light collecting effects are selectively added to the rays of light emitted by the LEDs 17 traveling in the second direction by the opposite plate surface-side prism portion 44 while traveling through the light guide plate 19 after entering the light guide plate 19. The rays of light are reflected by the light emission reflecting portions 41 and angled toward the light exiting surface 19a. The rays of light that reach the light exiting surface 19a exit therethrough after the light collecting effects are selectively added by the light exiting surface-side prism portion 43 with respect to the second direction. The light collecting effects are further added to the rays of light exiting through the light exiting surface 19a by the light exiting-side unit prisms 42a with respect to the second direction while transmitting through the prism sheet 42.

Therefore, the light exiting through the light exiting surface 19a and traveling toward the prism sheet 42 includes more rays of light that are not retroreflected by the light exiting-side unit prisms 42a and exit. This configuration can sufficiently increase light use efficiency and brightness of light exiting from the backlight unit 12. Furthermore, the opposite plate surface-side prism portion 44 is formed on the opposite plate surface 19c of the light guide plate 19. In comparison to a configuration in which an anisotropic light collecting portions is added to the light guide plate 19 on the light exiting side, the number of components can be reduced and the thickness of the backlight unit 12 can be reduced. Still furthermore, the rays of light transmitting through the light guide plate 19 are more likely to be reflected multiple times between the light exiting surface-side prism portion 43 and the opposite plate surface-side prism portion 44. Therefore, the rays of light are properly diffused with respect to the first direction. According to the configuration, the areas of the light exiting surface 19a closer to the LEDs 17 are less likely to have bright spots and dark spots. The rays of light exiting through the light exiting surface 19a are less likely to produce uneven brightness.

As illustrated in FIG. 9 and as described earlier, the angle $\theta v1$ of each light exiting-side unit prism 42a the prism sheet 42 is smaller than the vertex angle $\theta v2$ of the light exiting surface-side unit prism 43a and the vertex angle $\theta v3$ of the opposite surface-side unit prism 44a. Therefore, the light exiting-side unit prisms 42a retroreflect more rays of light than the light exiting surface-side prisms 43a and the opposite plate surface-side prisms 44. Furthermore, the light exiting-side unit prisms 42a regulate angles of the exiting rays of light within a smaller range of exiting angle in comparison to the light exiting surface-side prisms 43a and the opposite plate surface-side prisms 44. Namely, the light exiting-side unit prisms 42a have the strongest light collecting effects. Anisotropic light collecting effects are added to the rays of light supplied to the prism sheet 42 by the light exiting surface-side prism portion 43 at the light exiting surface 19a after added by the opposite plate surface-side prism portion 44 at the opposite plate surface 19c of the light guide plate 19. Therefore, a percentage of the retroreflection by the light exiting-side unit prisms 42a of the prism sheet 42 is smaller and thus the rays of light efficiently exit from the light exiting-side unit prims. According to the configuration, high light use efficiency is achieved. This configuration is preferable for improving the brightness of the light exiting from the backlight unit 12.

The rays of light transmitting through the light guide plate 19 are reflected and angled toward the light exiting surface 19a by the main reflecting surfaces 41a1 of the unit reflectors 41a included in the light exiting reflecting portion 41. The angles tend to be variable with respect to the first direction. Namely, the light exiting through the light exiting surface 19a tends to have a large amount of vector components pointing to aside opposite from the LED 17 side, that is, toward the opposite end surface 19d side. The light transmitting through the light guide plate 19 includes the rays having incidences to the main reflecting surfaces 41a1 of the unit reflecting portions 41a smaller than the critical angle and passing through the main reflecting surfaces 41a1. Some of the rays enter the unit reflecting portions through the light reentering surfaces 41a2. If the rays of light that have passed through the main reflecting surface 41a1 are reflected by the reflecting sheet 40 after passing through the unit reflecting portion 41a and reenter through the opposite plate surface 19c and then exit through the light exiting surface 19a, the exiting light tends to include vector components pointing the side opposite from the LEDs 17 with respect to the first direction. This may case uneven brightness. As illustrated in FIG. 10, first reflecting protrusions 45 and second reflecting protrusions 46 are formed on the opposite plate surface 19c of the light guide plate 19 according to this embodiment. For each unit reflecting portion 41a, the first reflecting protrusion 45 on a side closer to the LEDs 17 and the second reflecting protrusion 46 on a side farther from the LEDs 17 protrude from the opposite plate surface 19c (the opposite plate surface-side unit prism 44a). By reflecting the rays of light transmitting through the light guide plate 19 by the first reflecting protrusions 45 and the second reflecting protrusions 46, the rays of light reach the light exiting surface 19a. Therefore, the light exiting through light exiting surface 19a includes vector components pointing to the LED 17 side with respect to the first direction. Namely, the tendency to include the vector components pointing to the side opposite from the LED 17 side with respect to the first direction can be reduced and the uneven brightness with respect to the first direction is less likely to occur. Next, the first reflecting protrusions 45 and the second reflecting protrusion 46 will be described in detail.

Figure 8:
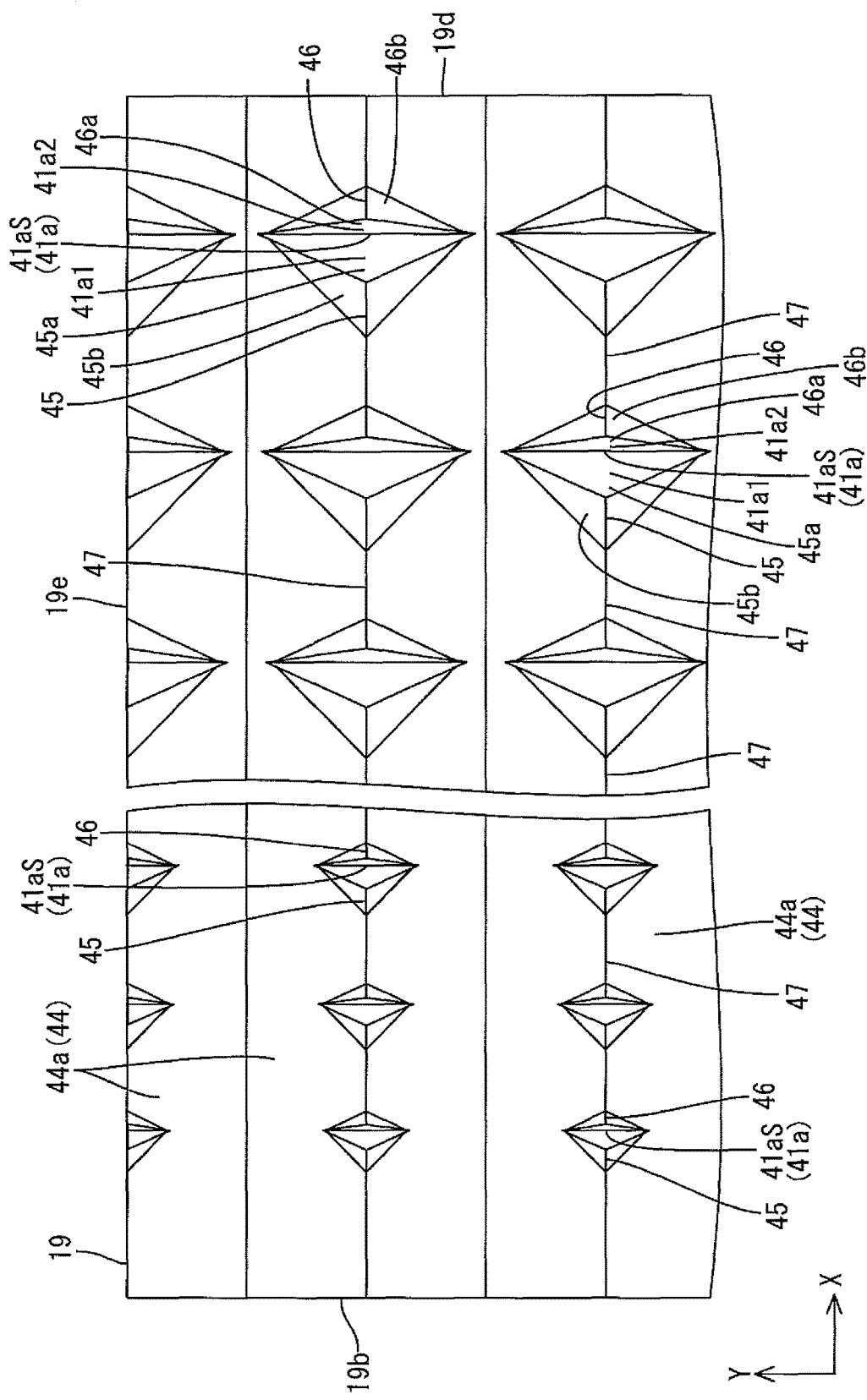
FIG. 8 is a magnified bottom view of the light guide plate including a end portion near a light entering surface and an end portion ear an opposite end surface.

As illustrated in FIG. 10, the first reflecting protrusions 45 are integrally formed with the light guide plate 19. To form the first reflecting protrusions 45 integrally with the light guide plate 19, the light guide plate 19 may be formed by injection molding using a mold having a forming surface with a transcription pattern for transferring the pattern of the first reflecting protrusions 45. As illustrated in FIGS. 7 and 8, the first reflecting protrusions 45 are arranged at intervals with respect to the first direction. The arrangement of the first reflecting protrusions 45 with respect to the first direction is matched with the arrangement of the unit reflecting portions 41a of the light reflecting portions 41 with respect to the first direction. Namely, the number of the first reflecting protrusions 45 is equal to the number of the unit reflecting portions 41a and the first reflecting protrusions 45 are arranged to correspond to the unit reflecting portions 41a, respectively. As illustrated in FIG. 10, each of the first reflecting protrusions 45 has a triangular cross section along the first direction. As illustrated FIG. 9, each of the first reflecting protrusions 45 has a triangular shape along the second direction, that is, in a front view in the first direction. An overall shape of each first reflecting protrusion 45 has a pyramid with a peaked distal end. Each reflecting protrusion 45 has an outline along an outline of the corresponding opposite plate surface-side unit prism 44a in a front view when viewed in the first direction. As illustrated in FIGS. 9 to 11, each first reflecting protrusion 45 has a height measuring in a direction in which the first reflecting protrusion 45 protrudes from the opposite plate surface 19c (opposite plate surface-side unit prism 44a). The height of each first reflecting protrusion 45 such that a height of the first reflecting protrusion 45 measuring in a direction in which the first reflecting protrusion 45 protrudes gradually decreases from the highest peak toward ends with respect to the second direction. The ends of the first reflecting protrusion 45 with respect to the second direction are located inner than ends of the opposite plate surface-side unit prism 44a and the unit reflecting portion 41a with respect to the second direction. As illustrated in FIG. 10, the first reflecting protrusions 45 arranged along the first direction are formed such that heights of the first reflecting protrusions 45 measuring in directions in which the first reflecting protrusions 45 protrude from the opposite plate surface 19c become larger as a distance from the LEDs 17 in the first direction increases. Specifically, the height of the first reflecting protrusions 45 arranged the closest to the LEDs 17 (the left edge in FIG. 7) is the smallest and the height of first reflecting protrusions 45 that are the farthest from the LEDs 17 (the right edge in FIG. 7) is the largest. The height of each first reflecting protrusion 45 arranged along the first direction varies similarly to the height of each unit reflecting portion 41a arranged along the first direction. A variation rate of the height is about equal to a variation rate of the height of the unit reflecting portion 41a. A dimension of each first reflecting protrusion 45 measuring in the first direction is smaller than the interval between two unit reflecting portions 41a that are adjacent to each other in the first direction. Portions of the opposite plate surface 19c of the light guide plate 19 closer to the LEDs 17 than the corresponding first reflecting protrusions 45 with respect to the first direction are flat surfaces 47 that are flat along the first direction and the second direction. The flat surfaces 47 are arranged between the respective first reflecting protrusions 45 and the respective second reflecting protrusions 46 with respect to the first direction. The lengths of the first reflecting protrusions 45 arranged along the first direction (dimensions in the first direction) become larger as a distance from the LEDs 17 in the first direction increases.

As illustrated in FIG. 10, each first reflecting protrusion 45 includes an extending main reflecting surface 45a and a first auxiliary reflecting surface 45b. The extending main reflecting surface 45a continues to the main reflecting surface 41a1 of the corresponding unit reflecting portion 41a. The first auxiliary reflecting surface 45b is located closer to the LEDs 17 than the extending main reflecting surface 45a with respect to the first direction. The extending main reflecting surface 45a is a sloped surface that inclines toward the light exiting surface 19a as a distance from the LEDs 17 increases (a distance toward the opposite end surface 19d decreases). An end of the extending main reflecting surface 45a opposite from the distal end continues to the main reflecting surface 41a1. An angle θs1 of inclination of the extending main reflecting surface 45a relative to the light exiting surface 19a or the opposite plate surface 19c is preferably in a range from 40° to 50°. In FIGS. 10 and 11, the angle θs1 is about 45°. Namely, the angle θs1 of the extending main reflecting surface 45a is quale to the angle θs1 of the main reflecting surface 41a1. Therefore, no step is formed between the extending main reflecting surface 45a and the main reflecting surface 41a1. The extending main reflecting surface 45a and the main reflecting surface 41a1 forma continuous sloped surface. The first auxiliary reflecting surfaces 45b are located closer to the LEDs 17 than the peaks (vertex) of the corresponding first reflecting protrusions 45 with respect to the first direction, that is, opposite from the corresponding unit reflecting portions 41a. The first auxiliary reflecting surfaces 45b are sloped surfaces that decline to leave away from the light exiting surface 19a as a distance from the LEDs 17 increases. An angle θs3 of inclination of each first auxiliary reflecting surface 45b relative to the light exiting surface 19a or the opposite plate surface 19c is preferably in a range from 1° to 30°m. In FIGS. 10 and 11, the angle θs3 is about 15°. Namely, the angle θs3 of the first auxiliary reflecting surface 45a is smaller than the angle θs1 of the main reflecting surface 41a1. The angles θs1 of the extended main reflecting surfaces 45a of the first reflecting protrusions 45 arranged along the first direction are constant and the angles θs3 of the first auxiliary reflecting surfaces 45b of the first reflecting protrusions 45 arranged along the first direction are constant. Therefore, to form a forming surface of a mold used for injection molding of the light guide plate 19 by cutting, the same tool can be used for cutting the portions to form the first reflecting protrusions 45. This can reduce a cost for producing the mold.

According to the first reflecting protrusions 45 described above, the following function and the effect are achieved. The rays of light emitted by the LEDs 17 traveling toward the opposite plate surface 19c during transmitting through the light guide plate 19 after entering the light guide plate 19 are totally reflected by the first auxiliary reflecting surfaces 45b. As a result, the rays of light are angled according to the angle θs3 of the first auxiliary reflecting surfaces 45b (adding vector components, which will be described next) and travel toward the opposite side from the LED 17 side with respect to the first direction, that is, toward the main reflecting surface 41a1 and the extending main reflecting surface 45a. The vector components that point to the LED 17 side with respect to the first direction are added to the reflected light by the first auxiliary reflecting surfaces 45b. The reflected light to which the vector components are added described above may be reflected by one of the main reflecting surface 41a1 and the extending main reflecting surface 45a or both. As a result, the reflected light travels toward the light exiting surface 19a. If the incidences of the rays of light to the light exiting surface 19a are equal to or smaller than the critical angle, the rays of light exit through the light exiting surface 19a. Due to the optical effects of the first reflecting protrusions 45 described earlier, the vector components that point to the side opposite from the LED 17 side with respect to the first direction in the light exiting through the light exiting surface 19a decrease and the vector components that point to the LED 17 side with respect to the first direction increase. Because the exiting light is less likely to include the vector components that point to the opposite side from the LED 17 side, the exiting light is less likely to have uneven brightness with respect to the first direction.

As illustrated in FIG. 10, the second reflecting protrusions 46 are formed integrally with the light guide plate 19. To form the second reflecting protrusions 46 integrally with the light guide plate 19, the light guide plate 19 may be produced by injection molding with a mold having a forming surface on which a transcription pattern for transcription of the second reflecting protrusions 46 is formed. As illustrated in FIGS. 7 and 8, the second reflecting protrusions 46 are arranged at intervals in the first direction. The arrangement of the second reflecting protrusions 46 is matched with the arrangement of the arrangement of the unit reflecting portions 41a of the light emission reflecting portions 41 in the first direction. Namely, the number of the second reflecting protrusions 46 is equal to the unit reflecting portions 41a and the second reflecting protrusions 46 are arranged to correspond to the unit reflecting portions 41a. As illustrated in FIG. 10, each of the second reflecting protrusions 46 has a substantially triangular cross section along the first direction. As illustrated in FIG. 9, each of the second reflecting protrusions 46 has a substantially triangular cross section along the second direction, that is, a shape viewed in the first direction is substantially triangular. An overall shape of each second reflecting protrusion 46 is a substantially quadrilateral pyramid with a peaked distal end. Each second reflecting protrusion is formed such that an outline viewed in the first direction is along an outline of the opposite plate surface-side unit prism 44a viewed in the first direction. As illustrated in FIGS. 9 to 11, each second reflecting protrusion 46 is orientated such that a height of the second reflecting protrusion 46 measuring from the opposite plate surface 19c (the opposite surface-side unit prisms 44a) in a direction in which the second reflecting protrusion 46 protrudes gradually decreases from the tip, the height of which is the largest, as a distance from the tip increases toward either end in the second direction. The ends of the second reflecting protrusion 46 with respect to the second direction are located at positions inner than the ends of the opposite plate surface-side unit prism 44a and the unit reflecting portion 41a with respect to the second direction. The ends of the second reflecting protrusion 46 with respect to the second direction are located at the same positions as the respective ends of the first reflecting protrusion 45 with respect to the second direction. The second reflecting protrusions 46 arranged along the first direction are formed such that the height from the opposite plate surface 19c gradually increase as the distance from the LED 17 in the first direction increases. Specifically, the height of the second reflecting protrusions 46 arranged the closest to the LEDs 17 (the leftmost in FIG. 7) is the smallest and the height of the second reflecting protrusions 46 arranged the farthest from the LEDs 17 (the rightmost in FIG. 7) is the largest. The heights of the second reflecting protrusions 46 arranged along the first direction vary in the manner similar to the heights of the unit reflecting portions 41a arranged along the first direction, and a variation rate thereof is about equal to the variation rate regarding the heights of the unit reflecting portions 41a. When the first reflecting protrusion 45 and the second reflecting protrusion 46 of each unit reflecting portion 41a arranged at the front and the rear in the first direction are compared, the height of the second reflecting protrusion 46 from the opposite plate surface 19c is larger than the height of the first reflecting protrusion 45 from the opposite plate surface 19c. Namely, the peak of the second reflecting protrusion 46 is located farther from the opposite plate surface 19c (the light exiting surface 19a) in comparison to the adjacent first reflecting protrusion 45 arranged on the LED 17 side with the unit reflecting portion 41a therebetween. According to the configuration, the light exiting through the main reflecting surface 41a1 or the light exiting through the extending main reflecting surface 45a is efficiently passed through the extended light reentering surface 46a of the second reflecting protrusion 46 and reflected by a second auxiliary reflecting surface 46b. The dimension of the second reflecting protrusion 46 in the first direction is smaller than the interval between the unit reflecting portions 41a adjacent to each other in the first direction. A portion of the opposite plate surface 19c of the light guide plate 19 on a side opposite to the LED 17 side with respect to the second reflecting protrusion 46 is a flat surface 47 that is flat along the first direction and the second direction. The flat surface 47 is arranged between the first reflecting protrusion 45 and the second reflecting protrusion 46 that are adjacent to each other in the first direction. The second reflecting protrusions 46 arranged along the first direction are formed such that dimensions in the first direction (lengths) increase as a distance from the LEDs 17 in the first direction increases.

As illustrated in FIG. 10, each second reflecting protrusion 46 includes the extended light reentering surface 46a and the second auxiliary reflecting surface 46b. The extended light reentering surface 46a continues to the light reentering surface 41a2 of the unit reflecting portion 41a. The second auxiliary reflecting surface 46b is arranged on a side opposite to the LED 17 side with respect to the extended light reentering surface 46a. The extended light reentering surface 46a is arranged on the LED 17 side, that is, on the unit reflecting portion 41a side with respect to the tip (peak) of the second reflecting protrusion 46 with respect to the first direction. The extended light reentering surface 46a includes a sloped surface that declines as a distance from the LEDs 17 increases (toward the opposite end surface 19d) in the first direction so as to gradually departing from the light exiting surface 19a. An end of the extended light reentering surface 46a opposite from the tip continues to the light reentering surface 41a2. An angle $\theta s2$ of slope of the extended light reentering surface 46a relative to the light exiting surface or the opposite plate surface 19c is preferably in a range from 70° to 90°. In FIGS. 10 and 11, the angle $\theta s2$ is about 80°. The angle $\theta s2$ of the extended light reentering surface 46a is equal to the angle $\theta s2$ of the light reentering surface 41a2. The extended light reentering surface 46a and the light reentering surface 41a2 form a continuous sloped surface without unevenness at a boundary therebetween. The second auxiliary reflecting surface 46b is arranged on a side opposite from the LED 17 side, that is, a side opposite from the unit reflecting portion 41a in the first direction with respect to the tip (peak) of the second reflecting protrusion 46. The second auxiliary reflecting surface 46b is a sloped surface that inclines as a distance from the LEDs 17 increases with respect to the first direction so as to gradually approach the light exiting surface 19a. An angle $\theta s4$ of slope of the second auxiliary reflecting surface 46b is preferably in a range from 30° to 50°. In FIGS. 10 and 11, the angle $\theta s4$ is about 40°. Namely, the angle $\theta s4$ of the second auxiliary reflecting surface 46b is smaller than the angle $\theta s2$ of the extended light reentering surface 46a or the light reentering surface 41a2 but larger than the angle $\theta s1$ of the main reflecting surface 41a1. The angles $\theta s2$ of the extended light reentering surface 46a and the angles $\theta s4$ of the second auxiliary reflecting surface 46b of the second reflecting protrusions 46 arranged along the first direction are constant, respectively. A forming surface of a mold used for producing the light guide plate 19 by injection molding is formed by cutting. During the formation of the forming surface, the same tool can be used to form portions of the forming surface for forming the second reflecting protrusions 46. Therefore, a cost for preparing the mold can be reduced.

According to the second reflecting protrusions 46 described above, the following function and effects can be achieved. At least some of the rays of light emitted by the LEDs 17 enter the main reflecting surfaces 41a1 of the unit reflecting portions 41a or the extended main reflecting surfaces 45a with incidences smaller than the critical angles and pass through the main reflecting surfaces 41a1 or the extended main reflecting surfaces 45a while transmitting through the light guide plate 19 toward the opposite plate surface 19c. Those rays of light passing through the main reflecting surfaces 41a1 or the extended main reflecting surfaces 45a may be refracted during the transmission. After the rays of light enter at least one of the light reentering surfaces 41a2 of the unit reflecting portions 41a and the extended light reentering surfaces 46a of the second reflecting protrusions 46, the rays of light may be totally reflected by the second auxiliary reflecting surfaces 46b of the second reflecting protrusions 46. As a result, the rays of light are angled according to the angle $\theta s4$ of the second auxiliary reflecting surfaces 46b (addition of vector components to light, which will be described next) and directed toward the light exiting surface 19a. The vector components that point to the LED 17 side with respect to the first direction are added to the reflected light by the second auxiliary reflecting surfaces 46b. The reflected light including such vector components is enter the light exiting surface 19a with an incidence equal to or smaller than the critical angle and exits from the light exiting surface 19a. The light exiting from the light exiting surface 19a includes less vector components that point to the side opposite from the LED 17 side with respect to the first direction and more vector components that point to the LED 17 side with respect to the first direction. The exiting light is less likely to include the vector components that point to the side opposite from the LED 17 side with respect to the first direction and thus the exiting light is less likely to have uneven brightness with respect to the first direction.

Figure 12:
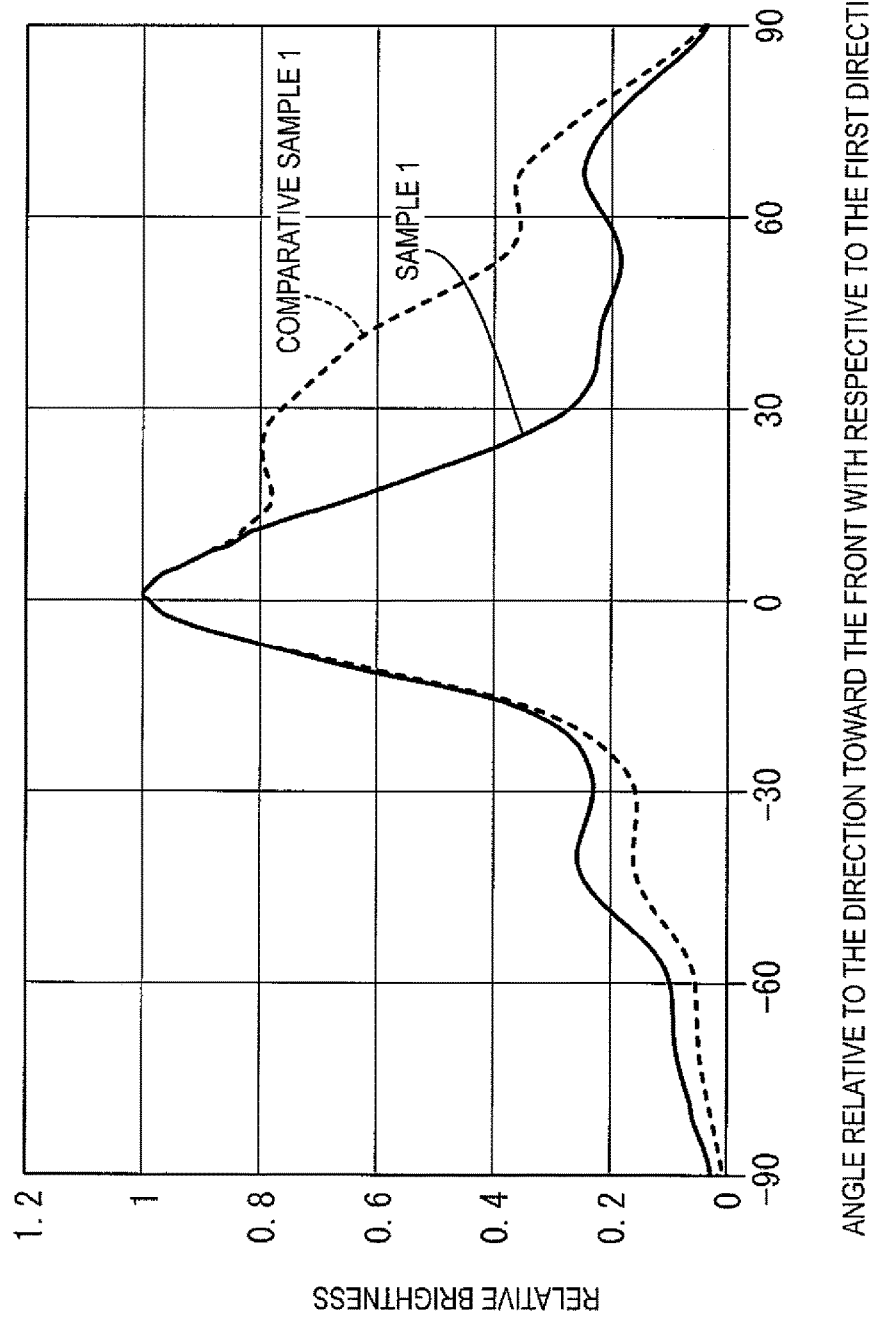
FIG. 12 is a graph illustrating angle-brightness distributions of exiting light with respect to the first direction, the exiting light being obtained by passing exiting light from each of light guide plates in each of comparative sample 1 and sample 1 through a prism sheet in comparative experiment 1.

Next, comparative experiment 1 was conducted to find how brightness distribution of light exiting through the light exiting surface and through the prism sheet 42 with respect to the first direction is different between the light guide plate 19 and another light guide plate. The light guide plate 19 includes the first reflecting protrusions 45 and the second reflecting protrusions 46 on the opposite plate surface 19c side. The other light guide plate does not include the first reflecting protrusions 45 and the second reflecting protrusions 46. In comparative experiment 1, comparative sample 1 and sample 1 were used. Comparative sample 1 includes a light emission reflecting portion and an opposite plate surface-side prism portion on an opposite plate surface and light exiting surface-side prism on a light exiting surface. Embodiment 1 is the light guide plate 19 that includes the light emission reflecting portion 41, the opposite surface-side prism portion 44, the first reflecting protrusions 45, and the second reflecting protrusions 46 on the opposite plate surface 19c and the light exiting surface-side prism portion 43 on the light exiting surface 19a. The light guide plate 19 of sample 1 has the same configuration as the configuration described above. The other light guide plate of comparative sample 1 has a configuration similar to the configuration describe above but excluding the first reflecting protrusions 45 and the second reflecting protrusions 46. In comparative experiment 1, the brightness distribution of the exiting light through the light guide plate and the prism sheet 42 of each of comparative sample 1 and sample 1 was measured and results are illustrated in FIG. 12. In comparative experiment 1, rays of light emitted by the LEDs in comparative sample 1 and sample 1 entered the respective light guide plates through the respective light entering surfaces and exited the light guide plates through the respective light exiting surfaces. The brightness distributions of the exiting light from the prism sheets 42 laid on the light guide plates on the light exiting side with respect to the first direction were measured. The prism sheets 42 used in comparative experiment 1 are the same as the prism sheet 42 described above. FIG. 12 illustrates the brightness distribution of light exiting from the light guide plate and the prism sheet 42 regarding comparative sample 1 and sample 1. In FIG. 12, a vertical axis indicates relative brightness (no unit) of light exiting from the prism sheet 42 and a horizontal axis indicates an angle (in degree [°]) relative to the direction toward the front with respect to the first direction. Negative angles on the horizontal axis in FIG. 12 indicate that the light traveling more to the LED 17 side (the light entering surface 19b) relative to the front, that is, including more vector components that point to the LED 17 side. Positive angles indicate that the light traveling more to the side opposite from the LED 17 side relative to the front, that is, including more vector components that point to the side opposite from the LED 17 side. The larger the absolute value of the angle on the horizontal axis in FIG. 12, the larger the number of the vector components that point to the LED 17 side or to the side opposite from the LED 17 side. The relative brightness on the vertical axis in FIG. 12 are expressed in relative levels to the brightness level of the light guide plate 19 regarding sample 1 relative to the direction toward the front (at an angle of 0°), which is defined as a reference (1.0). In FIG. 12, a solid line indicates sample 1 and a broken line indicates comparative sample 1.

The results of comparative experiment 1 will be described. From FIG. 12, it is clear that the light exiting from the light guide plate and the prism sheet 42 of comparative sample 1 includes components having positive angle values with respect to the first angle relative to the direction toward the front more than components having negative angle values. Namely, the exiting light has uneven brightness distribution. This may be because the light exiting from the light guide plate according to comparative sample 1 includes a large number of the vector components that point to the side opposite from the LED 17 side relative to the first direction. With the light guide plate according to comparative sample 1, when the light exiting from the prism sheet 42 is viewed from a direction angled toward the side opposite from the LED 17 side in the first direction relative to the direction toward the front, the light may seem to be dark. Namely, a difference between brightness and darkness or uneven brightness is more likely to occur. In contrast, regarding the light exiting from the light guide plate 19 and the prism sheet 42 of sample 1, components having positive angle values with respect to the first direction relative to the direction toward the front significantly decreases and components having negative angle values increases in comparison to comparative sample 1 and a sub peak has disappeared. The components having negative angle values increases. Namely, a difference between positive and negative values or uneven brightness distribution is compensated. This may be because the light exiting from the light guide plate 19 according to sample 1 includes less vector components that point to the side opposite from the LED 17 side with respect to the first direction and more vector components that point to the side opposite from the LED 17 side with respect to the first direction and more vector components that point to the LED 17 side with respect to the first direction. With the light guide plate 19 according to sample 1, a difference between brightness and darkness when the light exiting from the prism sheet 42 is viewed from the direction angled toward the side opposite from the LED 17 side with respect to the first direction relative to the direction toward the front and when viewed from the direction angled toward the LED 17 side with respect to the first direction relative to the direction toward the front. Namely, the uneven brightness with respect to the first direction is compensated.

A relationship between the light emission reflecting portions 41 and the opposite plate surface-side prism portions 44 on the opposite plate surface 19c of the light guide plate 19 will be described in detail. As illustrated in FIGS. 8 and 9, the unit reflecting portions 41a of the light emission reflecting portions 41 are formed by cutting portions of the opposite plate-side unit prisms 44a of the opposite plate surface-side prism portions 44 on ridge 44a2 sides. The unit reflecting portions 41a that are cutouts are not formed in portions of the opposite plate surface-side unit prisms 44a on bottom sides that are opposite from the ridge 44a2 sides. Namely, the portions on the bottom side are non-forming portion in which the unit reflecting portions 41a are not formed. The heights (dimensions measuring in the third direction) of the unit reflecting portions 41a are smaller than the heights of the opposite plate surface-side unit prisms 44a. According to the configuration, as illustrated in FIG. 7, although the unit reflecting portions 41a extend along the second direction, the unit reflecting portions 41a are not continuously formed for an entire length of the light guide plate 19, that is, formed with several breaks. The unit reflecting portions 41a include divided unit reflecting portions 41aS arranged at intervals with respect to the second direction. Furthermore, the unit reflecting portions 41a are formed with holes in sides which extend along the second direction by cutting portions of the ridge 44a2 of the opposite plate surface-side unit prisms 44a. The number of the divided unit reflecting portions 41aS of the unit reflecting portions 41a is equal to the number of the opposite plate surface-side unit prisms 44a of the opposite plate surface-side prism portions 44. Furthermore, the middle of each unit reflecting portion 41a with respect to the second direction is at about the same position as the ridge 44a2 of the corresponding opposite plate surface-side unit prism 44a with respect to the second direction. The unit reflecting portions 41a arranged along the first direction have heights (depths) which gradually increase as a distance from the light entering surface 19b (LEDs 17) with respect to the first direction increases (see FIG. 2). The unit reflecting portions 41a have widths (forming areas with respect to the second direction) which gradually increase as a distance from the light entering surface 19b increases. As illustrated in FIG. 8, the widths of the unit reflecting portions 41a arranged on the light entering surface 19b side with respect to the first direction become smaller and surface areas thereof become smaller. The width of the unit reflecting portions 41a on the opposite end surface 19d side with respect to the first direction become larger and surface areas thereof become larger. The uneven brightness is compensated with respect to the first direction.

An amount of reflected light of each unit reflecting portion 41a described above tends to be proportional to the surface area thereof. To achieve a necessary amount of reflected light, the surface area needs to correspond to the necessary amount. The same is true for the light emission reflecting portions 41. To achieve a necessary amount of light reflected by the light emission reflecting portions 41, an overall surface area of the light emission reflecting portions 41 (a total area of the unit reflecting portions 41a calculated by adding surface areas of the unit reflecting portions 41a) needs to correspond to the necessary amount. If a unit reflecting portion is in a form that extends for an entire length of the light guide plate 19 in the second direction, dimensions of unit reflecting portions in the third direction cannot be increased more than a specific dimension to achieve the above surface area of the unit reflecting portions. According to the configuration in which the unit reflecting portions 41a include the divided unit reflecting portions 41aS that are arranged at intervals with respect to the second direction, dimensions of the unit reflecting portions 41a in the third direction can be increased to set the surface area of the unit reflecting portions 41a to the above surface area. During formation of the light emission reflecting portions 41 in the opposite plate surface 19c of the light guide plate 19 by molding, the divided unit reflecting portions 41aS of the unit reflecting portions 41a can be formed in designed shapes in the opposite plate surface 19c. Therefore, the optical performances of the light emission reflecting portions 41 can be properly exerted. If the unit reflecting portion is formed to extend for the entire length of the light guide plate 19, the total area calculated by adding the surface areas of the unit reflecting portions can be adjusted by reducing the number of the unit reflecting portions arranged with respect to the first direction. However, intervals of the unit reflecting portion arranged with respect to the first direction increase. Therefore, uneven brightness may occur. With the unit reflecting portions 41a that include the divided unit reflecting portions 41aS arranged at intervals with respect to the second direction, it is not necessary to change the number and the intervals of the unit reflecting portions 41a arranged with respect to the first direction. Therefore, uneven brightness is less likely to occur in light exiting from the backlight unit 12. Furthermore, the unit reflecting portions 41a are formed to have the holes that extend along the second direction by cutting the portions of the opposite plate surface-side unit prisms 44a on the ridge 44a2 side. Therefore, the light collecting performances of the opposite plate surface-side prism portions 44 can be properly exerted. Specifically, if the unit reflecting portions have side surfaces along the first direction without the holes that extend along the second direction, light may be refracted or reflected by the side surfaces along the first direction. Therefore, the light collecting performances of the opposite plate surface-side prism portions may be degraded. Because the unit reflecting portions 41a have the holes that extend along the second direction formed by cutting the portions of the opposite plate surface-side unit prisms 44a, the light collecting performances of the opposite plate surface-side prism portions 44 can be properly exerted and thus the brightness of the light exiting from the backlight unit 12 can be further increased.

Similar to the divided unit reflecting portions 41aS, lines of which are arranged at intervals in the second direction as described above, lines of the first reflecting protrusions 45 and the second reflecting protrusions 46 are arranged at intervals in the second direction as illustrated in FIGS. 7 to 9. The arrangement of the first reflecting protrusions 45 and the second reflecting protrusions 46, lines of which are arranged in the second direction, corresponds to the arrangement of the divided unit reflecting portions 41aS with respect to the second direction. According to the arrangement, rays of light reflected by the first reflecting protrusions 45 and the first auxiliary reflecting surfaces 45b are efficiently fed to the main reflecting surfaces 41a1 and the extended main reflecting surfaces 45a. The rays of light transmitted through the main reflecting surfaces 41a1 and the extended main reflecting surfaces 45a of the divided unit reflecting portions 41aS enter through at least one of the extended light reentering surfaces 46a and the light reentering surfaces 41a2 and thus the rays of light are efficiently reflected by the second auxiliary reflecting surfaces 46b. With the first reflecting protrusions 45 and the second reflecting protrusions 46, uneven brightness in light exiting through the light exiting surface 19a is properly compensated. Furthermore, the first reflecting protrusions 45 and the second reflecting protrusions 46 are less likely to affect the light collecting performances of the opposite plate surface-side prism portions 44. As illustrated in FIG. 9, the first reflecting protrusions 45 and the second reflecting protrusions 46 are formed such that outlines thereof viewed from the front with respect to the first direction are along outlines of the opposite plate surface-side unit prisms 44a viewed from the front with respect to the first direction. According to the configuration, when a mold for molding is shaped by cutting, the cutting can be easily performed. Furthermore, in the production of the light guide plate 19, cutting is easily performed on the light guide plate 19 that is formed by molding. This improves the productivity.

As illustrated in FIG. 10, the dimensions of the first reflecting protrusions 45 and the second reflecting protrusions 46 from the opposite plate surface 19c gradually increase as a distance from the light entering surface 19b (LEDs 17) with respect to the first direction increases. As illustrated in FIG. 7, the widths of the first reflecting protrusions 45 and the second reflecting protrusions 46

(forming areas with respect to the second direction) gradually increase as the distance from the light entering surface 10b in the first direction increases. As illustrated in FIGS. 7 and 8, the first reflecting protrusions 45 and the second reflecting protrusions 46 arranged on the light entering surface 19b side with respect to the first direction have smaller widths and smaller surface areas. The first reflecting protrusions 45 and the second reflecting protrusions 46 arranged on the opposite end surface 19d side with respect to the first direction have larger width and larger surface areas. Amounts of light reflected by the first reflecting protrusions 45 and the second reflecting protrusions 46 tend to be proportional to the surface areas. To achieve a necessary amount of reflected light, the surface areas need to be set according to the necessary amount. If the first reflecting protrusions and the second reflecting protrusions are formed so as to extend for the entire length of the light guide plate 19 with respect to the second direction, dimensions of the first reflecting protrusions and the second reflecting protrusions with respect to the third direction cannot be increased more than specific dimensions to set the surface areas of the first reflecting protrusions and the second reflecting protrusions. Because the first reflecting protrusions 45 and the second reflecting protrusions 46 are arranged at intervals with respect to the second direction, the dimensions of the first reflecting protrusions 45 and the second reflecting protrusions 46 can be increased to set the surface areas of the first reflecting protrusions 45 and the second reflecting protrusions 46 to the above described dimensions. During the formation of the first reflecting protrusions 45 and the second reflecting protrusions 46 integrally with the opposite plate surface 19c of the light guide plate 19 produced by molding, the first reflecting protrusions 45 and the second reflecting protrusions 46 can be easily formed in designed shapes on the opposite plate surface 19c. Therefore, the optical performances of the first reflecting protrusions 45 and the second reflecting protrusions 46 can be properly exerted.

Next, comparative experiment 2 was conducted to find how shape reproducibility of unit reflecting portions of light emission reflecting portions is different between the light guide plate 19 of sample 1 in comparative experiment and another light guide plate according to whether the opposite plate surface-side prism portions 44 are present or configurations of the unit reflecting portions. The other light guide plate of comparative sample 2 includes the unit reflecting portions that continuously extend along the second direction without the first reflecting protrusions 45 and the second reflecting protrusions 46. The light guide plate of comparative sample does not include not only the first reflecting protrusions 45 and the second reflecting protrusions 46 but also the opposite plate surface-side prism portions 44. Therefore, the unit reflecting portions of the light guide plate of comparative sample 2 are formed to continuously extend (without gaps) for the entire length of the light guide plate with respect to the second direction and the number of with respect to the first direction is equal to the number of the unit reflecting portions 41a of the light guide plate 19 of sample 1. A configuration of the light guide plate of comparative sample 2 other than the configuration different from that of the light guide plate 19 of sample 1 described above is the same as the light guide plate 19. In comparative experiment 2, heights of unit reflecting portions of the light emission reflecting portions of the light guide plate of comparative sample 1 and the light guide plate 19 of sample 1 corresponding to points with respect to the first direction were measured. The results are illustrated in FIG. 13. Positions of each light guide plate created by dividing the light guide plate into six sections with respect to the first direction were defined as a first point, a second point, a third point, a fourth point, and a fifth point. Levels of shape reproducibility of the unit reflecting portions 41a were determined at the points. The results are illustrated in FIG. 14. In FIG. 13, the vertical axis indicates the heights of the unit reflecting portions (in μm) and the horizontal axis indicates the points on the light guide plates with respect to the first direction. The point at the left end of the horizontal axis with respect to the first direction in FIG. 13 correspond to a point regarding the light entering surface of each light guide plate and the point at the right end of the horizontal axis correspond to a point regarding the opposite end surface of each light guide plate. FIG. 14 illustrates the heights of the unit reflecting portions at the first point through the fifth point and determined results regarding the shape reproducibility of the unit reflecting portions. The shape reproducibility of the unit reflecting portions was determined based on how much difference is present between light distribution of light exiting from the light guide plate obtained through optical simulation (a theoretical value) and light distribution of light exiting from the actual light guide plate formed by molding (a measurement). If the difference was out of a tolerance, it was determined that "the shape reproducibility was poor." If the difference is within the tolerance, it was determined "the shape reproducibility was good."

The results of comparative experiment 2 will be described. From FIG. 13, it is clear that the heights of the unit reflecting portions of the light guide plate 19 of sample 1 and the light guide plate of comparative sample 2 gradually increase as a distance from the light entering surface toward the opposite end surface increases (to become farther from the LEDs 17). Furthermore, from FIG. 13, it is clear that the heights of the unit reflecting portions 41a of the light guide plate 19 of sample 1 are larger than the heights of the unit reflecting portions of the light guide plate of comparative sample 2. This is because the unit reflecting portions of the light guide plate of comparative sample 2 are formed to continuously extend for the entire length of the light guide plate with respect to the second direction but the unit reflecting portions 41 of the light guide plate 19 of sample 1 are formed from the divided unit reflecting portions 41aS arranged at intervals with respect to the second direction. The reason will be described in detail. The unit reflecting portions of the light guide plate of comparative sample 2 continuously extend for the entire length of the light guide plate with respect to the second direction. Therefore, the heights of the unit reflecting portions cannot be significantly increased to set the surface areas of the unit reflecting portions to the above-described areas. In contrast, the unit reflecting portions 41a of the light guide plate of sample 1 are formed from the divided unit reflecting portions 41aS arranged at intervals with respect to the second direction. Therefore, the heights of the unit reflecting portions 41a can be increased more than comparative sample 2 to set the surface areas of the unit reflecting portions 41a to the above-described areas. For the reason, the unit reflecting portions 41a of the light guide plate 19 of sample 1 are formed with the heights larger than the heights of the unit reflecting portions of the light guide plate of comparative sample 2.

From FIG. 14, it is clear that the shape reproducibility of the unit reflecting portions is good if the heights of the unit reflecting portions exceed about 3.2 μm. The shape reproducibility of the unit reflecting portions of the light guide plate of comparative sample 2 is poor at the first to the fourth points. The shape reproducibility is good at the fifth point. In contrast, the shape reproducibility of the unit reflecting portions 41a of the light guide plate 19 of sample 1 is good at the second point to the fifth point. The shape reproducibility is fairly good at the first point. This is because most of the unit reflecting portions of the light guide plate 19 of sample 1 have the heights larger than 3.2 µm, which is a reference in determination of the shape reproducibility of the unit reflecting portions whether the shape reproducibility is good or poor. Most of the unit reflecting portions of the light guide plate of comparative sample 2 have the heights smaller than the reference (3.2 µm). In sample 1, the opposite plate surface-side prism portions 44 are formed on the opposite plate surface 19c of the light guide plate 19 in addition to the light emission reflecting portions 41 and the unit reflecting portions 41a of the light emission reflecting portions 41 are formed from the divided unit reflecting portions 41aS. Therefore, the heights of the unit reflecting portions 41a can be set sufficiently large. In the production of the light guide plate 19 by molding, the dividing unit reflecting portions 41aS of the unit reflecting portions 41a can be easily formed in the designed shapes on the opposite plate surface 19c. According to the configuration, the optical performances of the light emission reflecting portions 41 can be properly exerted. To increase the heights of the unit reflecting portions of the light guide plate of comparative sample 2, the number of the unit reflecting portions arranged with respect to the first direction may be reduced to set the total area calculated by adding the surface areas of the unit reflecting portions constant. If the number is reduced, the intervals of the unit reflecting portions arranged with respect to the first direction increase. This may produce uneven brightness of light exiting from the light guide plate. With the unit reflecting portions 41 formed from the divided unit reflecting portions 41aS arranged at intervals with respect to the second direction as in the light guide plate 19 of sample 1, it is not necessary to alter the number and the intervals of the unit reflecting portions 41a arranged with respect to the first direction. Therefore, uneven brightness of the light exiting from the light guide plate 19 is less likely to occur. Experiments on the first reflecting protrusions 45 and the second reflecting protrusions 46 may have the same results as the second comparative experiment at high possibilities.

As described above, the backlight unit (lighting device) 12 of this embodiment includes the LEDs (light source) 17, the light guide plate 19, the prism sheet (light exiting-side anisotropic light collecting portion) 42, the light exiting surface-side prism portions 43, the light emission reflecting portions 41, the opposite plate surface-side prism portions (opposite plate surface-side anisotropic light collecting portion) 44, the first reflecting protrusions 45, and the second reflecting protrusions 46. The light guide plate 19 includes a pair of the end surfaces having the rectangular plate shape opposite to each other among the peripheral end surfaces. One of the end surfaces is the light entering surface 19b through which the light emitted by the LEDs 17 enters. One of the plate surfaces is the light exiting surface 19a through which the light exits. The other plate surface is the opposite plate surface 19c of the light guide plate 19. The prism sheet 42 includes the light exiting-side unit prisms (light exiting-side unit collecting portions) 42a. The light exiting-side unit prisms 42a are arranged on the light exiting side with respect to the light guide plate 19. The light exiting-side unit prisms 42a extend along the first direction along the side end surfaces 19e that are opposite to each other and do not include the light entering surface 19b. The light exiting-side unit prisms 42a are arranged along the second direction along the pair of the end surfaces 19b and 19d including the light entering surface 19b among the peripheral end surfaces of the light guide plate 19. The light exiting surface-side prism portions 43 are arranged on the light exiting surface 19a side of the light guide plate 19. The light exiting surface-side prism portions 43 include the light exiting surface-side unit prisms (light exiting surface-side unit light collecting portions) 43a that extend along the first direction. The light exiting surface-side prisms 43a are arranged along the second direction. The light emission reflecting portions 41 are arranged on the opposite plate surface 19c side of the light guide plate 19. The light emission reflecting portions 41 include the unit reflecting portions 41a arranged at intervals along the first direction. The unit reflecting portions 41a are formed by recessing the opposite plate surface 19c to extend along the second direction. The unit reflecting portions 41a include the main reflecting surfaces 41a1 arranged on the LED 17 side with respect to the first direction and the light reentering surfaces 41a2 arranged on the side opposite to the LED 17 side. The opposite plate surface-side prism portions 44 is arranged on the opposite plate surface 19c side of the light guide plate 19. The opposite plate surface-side prism portions 44 include the opposite plate surface-side unit prisms 44a that extend along the first direction and arranged along the second direction. The first reflecting protrusions 45 are arranged on the opposite plate surface 19c side of the light guide plate 19. The first reflecting protrusions 45 are formed to protrude from the opposite plate surface 19c on the LED 17 side relative to the unit reflecting portions 41a with respect to the first direction. The first reflecting protrusions 45 include the extended main reflecting surfaces 45a and the first auxiliary reflecting surfaces 45b. The extended main reflecting surfaces 45a continue to the main reflecting surfaces 41a1. The first auxiliary reflecting surfaces 45b are arranged on the LED 17 side relative to the extended main reflecting surfaces 45a with respect to the first direction. The first auxiliary reflecting surfaces 45b are configured to reflect the rays of light traveling toward the opposite plate surface 19c toward the main reflecting surfaces 41a1 and the extended main reflecting surfaces 45a. The second reflecting protrusions 46 are arranged on the side opposite to the first reflecting protrusion 45 side relative to the unit reflecting portions 41a with respect to the first direction on the opposite plate surface 19c of the light guide plate 19. The second reflecting protrusions 46 are formed to protrude from the opposite plate surface 19c. The second reflecting protrusions 46 include the extended light reentering surfaces 46a and the second auxiliary reflecting surfaces 46b. The extended light reentering surfaces 46a continue to the light reentering surfaces 41a2. The second auxiliary reflecting surfaces 46b are arranged on the side opposite from the first reflecting protrusion 45 side relative to the extended light reentering surfaces 46a with respect to the first direction. The second auxiliary reflecting surfaces 46b are configured to reflect the rays of light entering through at least one of the light reentering surfaces 41a2 and the extended light reentering surfaces 46a toward the light exiting surface 19a.

According to the configuration, the light emitted by the LEDs 17 enter the light guide plate 19 through the light entering surface 19b and traveling through the light guide plate 19. While traveling through the light guide plate 19, the light is reflected by the light emission reflecting portions 41 on the opposite plate surface 19c side of the light guide plate 19. The light emission reflecting portions 41 include the unit reflecting portions 41a that extend along the second direction and are arranged at intervals along the first direction.

Therefore, the light traveling through the light guide plate 19 along the first direction is reflected by the main reflecting surfaces 41*a* of the unit reflecting portions 41*a* and thus the light is angled toward the light exiting surface 19*a*. According to the configuration, the light exits through the light exiting surface 19*a*.

The light that has traveled through the light guide plate 19 and reached the opposite plate surface 19*c* is angled toward the light exiting surface 19*a* by the unit reflecting portions 41*a* after the light collecting effects with respect to the second direction, which corresponds to the arrangement direction thereof, are selectively added by the opposite plate surface-side unit prisms 44*a* of the opposite plate surface-side prism portions 44. The light collecting effects with respect to the second direction, which corresponds to the arrangement direction of the light exiting surface-side unit prisms 43*a*, are selectively added to the light that has reached the light exiting surface 19*a* of the light guide plate 19 by the light exiting surface-side unit prisms 43*a* of the light exiting surface-side prism portions 43. Furthermore, the light collecting effects with respect to the second direction, which corresponds to the arrangement direction of the light exiting-side unit prisms 42*a*, are selectively added to the light exiting through the light exiting surface 19*a* by the light exiting-side unit prisms 42*a* of the prism sheet 42. The anisotropic light collecting effects are added to the light exiting through the light exiting surface 19*a* and traveling toward the light exiting-side unit prisms 42*a* in two steps by the opposite plate surface-side prism portions 44 and the light exiting surface-side prism portions 43 in advance. Therefore, the light includes more components that exit without retroreflected by the light exiting-side unit prisms 42*a*. According to the configuration, the light use efficiency sufficiently improves and thus the brightness of the light exiting from the backlight unit 12 increases. Furthermore, the opposite plate surface-side prism portions 44 are arranged on the opposite plate surface 19*c* side of the light guide plate 19. In comparison to a configuration in which an anisotropic light collecting portion is additionally provided on a light exiting side of a light guide plate, the number of parts can be reduced and the thickness of the backlight unit 12 can be reduced.

The rays of light traveling through the light guide plate 19 are reflected by the main reflecting surfaces 41*a*1 of the unit reflecting portions 41*a* of the light emission reflecting portions 41 toward the light exiting surface 19*a*. The angles of the rays tend to be inconstant and the light exiting through the light exiting surface 19*a* tends to have a larger number of vector components that point to the side opposite from the LED 17 side with respect to the first direction. This is more likely to cause uneven brightness. With the first reflecting protrusions 45 that protrude from the opposite plate surface 19*c* of the light guide plate 19 on the LED 17 side relative to the unit reflecting portions 41*a* with respect to the first direction, the rays of light traveling to the opposite plate surface 19*c* through the light guide plate 19 are reflected by the first auxiliary reflecting surfaces 45*b* arranged on the LED 17 side relative to the extended main reflecting surfaces 45*a* of the first reflecting protrusions 45 with respect to the first direction. The reflected rays of light travel toward the main reflecting surface 41*a*1 and the extended main reflecting surfaces 45*a*. The vector components that point to the LED 17 side with respect to the first direction are added to the light. The light exiting through the light exiting surface 19*a* after reflected by at least one of the main reflecting surfaces 41*a*1 and the extended main reflecting surfaces 45*a* is less likely to include an excessive number of vector components that point to the side opposite from the LED 17 side. Therefore, occurrence of the uneven brightness is reduced.

Some rays of light traveling toward the main reflecting surfaces 41*a*1 through the light guide plate 19 enter the main reflecting surfaces 41*a*1 or the extended main reflecting surfaces 45*a* with incidences smaller than the critical angle and pass through the main reflecting surfaces 41*a*1 or the extended main reflecting surfaces 45*a*. Some rays of light passing through the main reflecting surfaces 41*a*1 or the extended main reflecting surfaces 45*a* enter the light reentering surfaces 41*a*2 of the unit reflecting portions 41*a*. If the rays of light passing through the main reflecting surfaces 41*a*1 or the extended main reflecting surfaces 45*a* pass through the unit reflecting portions 41*a*, reenter through the opposite plate surface 19*c*, and exit from the light exiting surface 19*a*, the exiting light tends to include a larger number of vector components that point to the side opposite from the LED 17 side with respect to the first direction. This may cause uneven brightness. With the second reflecting protrusions 46 that protrude from the opposite plate surface 19*c* on the side opposite from the LED 17 side relative to the unit reflecting portions 41*a* with respect to the first direction, some rays of light passing through the main reflecting surfaces 41*a*1 or the extended main reflecting surfaces 45*a* are reflected by the second auxiliary reflecting surfaces 46*b* after entering at least one of the extended light reentering surfaces 46*a* and the light reentering surfaces 41*a*2 of the second reflecting protrusions 46. The reflected rays of light travel toward the light exiting surface 19*a*. The vector components that point to the LED 17 side with respect to the first direction are added to the light. The light exiting through the light exiting surface 19*a* is less likely to include an excessive number of vector components that point to the side opposite from the LED 17 side with respect to the first direction. Therefore, an occurrence of uneven brightness is reduced.

The unit reflecting portions 41*a* of the light emission reflecting portion 41 include the divided unit reflecting portions 41*a*S arranged at intervals with respect to the second direction. The amount of reflected light tends to be proportional to the surface areas of the unit reflecting portions 41*a*. To achieve the necessary amount of reflected light, the surface areas need to be set to correspond to the necessary amount of reflected light. If a unit reflecting portion is formed to extend for the entire length of the light guide plate 19 with respect to the second direction, a dimension of the unit reflecting portion measuring in a direction normal to the plate surface of the light guide plate 19 cannot be increased more than a specific dimension to achieve the above areas. The unit reflecting portions 41*a* are formed from the divided unit reflecting portions 41*a*S arranged at intervals with respect to the second direction. According to the configuration, dimensions of the unit reflecting portions 41*a* measuring in a direction normal to the plate surface of the light guide plate 19 can be increased to set the surface areas of the unit reflecting portions 41*a* to the above areas. During the formation of the light emission reflecting portion 41 integrally with the opposite plate surface 19*c* of the light guide plate 19 produced by molding, the divided unit reflecting portions 41*a*S of the unit reflecting portions 41*a* can be easily formed in the designed shape. Therefore, the optical performances of the light emission reflecting portion 41 can be properly exerted.

If the unit reflecting portion is formed to extend for the entire length of the light guide plate 19 with respect to the second direction, the total area calculated by adding the surface areas of the unit reflecting portions can be adjusted by reducing the number of the unit reflecting portions arranged with respect to the first direction. However, intervals in the arrangement of the unit reflecting portion arranged with respect to the first direction increase. Therefore, uneven brightness may occur. With the unit reflecting portions 41a that include the divided unit reflecting portions 41aS arranged at intervals with respect to the second direction, it is not necessary to change the number and the intervals of the unit reflecting portions 41a arranged with respect to the first direction. Therefore, uneven brightness is less likely to occur in light exiting from the backlight unit 12.

Furthermore, the unit reflecting portions 41a of the light emission reflecting portions 41 are formed to have the holes that extend along the second direction by cutting the portions of the opposite plate surface-side unit prisms 44a on the ridge 44a2 side. If the unit reflecting portions have side surfaces along the first direction without the holes that extend along the second direction, light may be refracted or reflected by the side surfaces along the first direction. Therefore, the light collecting performances of the opposite plate surface-side prism portions 44 may be degraded. Because the light emission reflecting portion 41 is formed such that the unit reflecting portions 41a have the holes that extend along the second direction formed by cutting the portions of the opposite plate surface-side unit prisms 44a, the light collecting performances of the opposite plate surface-side prism portions 44 can be properly exerted and thus the brightness of the light exiting from the backlight unit 12 can be further increased.

Line of the first reflecting protrusions 45 and the second reflecting protrusions 46 are arranged at intervals in the second direction and the arrangement thereof with respect to the second direction corresponds to the arrangement of the divided unit reflecting portions 41aS. According to the arrangement, rays of light reflected by the first reflecting protrusions 45 and the first auxiliary reflecting surfaces 45b are efficiently fed to the main reflecting surfaces 41a1 and the extended main reflecting surfaces 45a. The rays of light transmitted through the main reflecting surfaces 41a1 and the extended main reflecting surfaces 45a of the divided unit reflecting portions 41aS enter through at least one of the extended light reentering surfaces 46a and the light reentering surfaces 41a2 and thus the rays of light are efficiently reflected by the second auxiliary reflecting surfaces 46b. With the first reflecting protrusions 45 and the second reflecting protrusions 46, uneven brightness in light exiting through the light exiting surface 19a is properly compensated. Furthermore, the first reflecting protrusions 45 and the second reflecting protrusions 46 are less likely to affect the light collecting performances of the opposite plate surface-side prism portions 44.

The first reflecting protrusions 45 and the second reflecting protrusions 46 are formed such that outlines thereof viewed from the front with respect to the first direction are along outlines of the opposite plate surface-side unit prisms 44a viewed from the front with respect to the first direction. According to the configuration, when a mold for molding is shaped by cutting, the cutting can be easily performed. Furthermore, in the production of the light guide plate 19, cutting is easily performed on the light guide plate 19 that is formed by molding. This improves the productivity.

The second reflecting protrusions 46 are formed such that the peaks of the second reflecting protrusions 46 are farther from the opposite plate surface 19c in comparison to the first reflecting protrusions 45. According to the configuration, the rays of light passing through the main reflecting surfaces 41a1 or the extended main reflecting surfaces 45a can be efficiently passed through the extended light reentering surfaces 46a of the second reflecting protrusions 46 and reflected by the second auxiliary reflecting surfaces 46b. With the first reflecting protrusions 45 and the second reflecting protrusions 46, the uneven brightness that may occur in the light exiting through the light exiting surface 19a can be properly reduced.

The unit reflecting portions 41a of the light emission reflecting portion 41 have the dimensions measuring in the direction normal to the plate surface of the light guide plate 19. The dimensions increase as the distance from the LEDs 17 in the first direction increases. The first reflecting protrusions 45 and the second reflecting protrusions 46 are arranged at intervals with respect to the first direction. The arrangements of the first reflecting protrusions 45 and the second reflecting protrusions 46 with respect to the first direction correspond to the arrangement of the unit reflecting portions 41a. The dimensions of the first reflecting protrusions 45 and the second reflecting protrusions 46 projecting from the opposite plate surface 19c increase as the distance from the LEDs 17 increases. According to the configuration, the rays of light traveling toward the opposite plate surface 19c through the light guide plate 19 are reflected by the first auxiliary reflecting surfaces 45b of the first reflecting protrusions 45. As a result, the rays of light are properly fed to the main reflecting surfaces 41a1 and the extended main reflecting surfaces 45a of the unit reflecting portions 41 arranged along the first direction. The rays of light passing through the main reflecting surfaces 41a1 or the extended main reflecting surfaces 45a of the unit reflecting portions 41 arranged along the first direction properly enter the second reflecting protrusions 46 arranged along the first direction through at least one of the extended light reentering surfaces 46a and the light reentering surfaces 41a. The rays of light are reflected by the second auxiliary reflecting surfaces 46b. With the first reflecting protrusions 45 and the second reflecting protrusions 46 arranged along the first direction, the uneven brightness that may occur in the light exiting through the light exiting surface 19a is properly reduced and the brightness improves.

Furthermore, the reflecting sheet (a reflecting member) 40 is provided. The reflecting sheet 40 includes the reflecting surface 40 that is opposed to the opposite plate surface 19c of the light guide plate 19. The reflecting sheet 40 is configured to reflect light from the opposite plate surface 19c by the reflecting surface 40a. According to the configuration, light that leaks from the opposite plate surface 19c of the light guide plate 19 is reflected by the reflecting surface 40a of the reflecting sheet 40 and the reflected light efficiently reenters the opposite plate surface 19c. If a gap is present between the opposite plate surface 19c of the light guide plate 19 and the reflecting sheet 40, the rays of light passing through the main reflecting surfaces 41a1 and the extended main reflecting surfaces 45a are directed to efficiently enter the extended light reentering surfaces 46a of the second reflecting protrusions 46 that protrude from the opposite plate surface 19c toward the reflecting sheet 40. The rays of light entering the extended light reentering surfaces 46a are reflected by the second auxiliary reflecting surfaces 46b and directed toward the light exiting surface 19a. Therefore, the uneven brightness is properly reduced.

The liquid crystal display device (display device) 10 according to this embodiment includes the backlight unit 12 described above and the liquid crystal panel (display panel) 11. The liquid crystal panel 11 is configured to display images using light from the backlight unit 12. According to the liquid crystal display device 10 having such a configuration, the light exiting from the backlight unit 12 toward the front has high brightness and is less likely to have uneven brightness. Therefore, high display quality can be provided.

The display panel is the liquid crystal panel 11 that includes a pair of the substrates 11a and 11b and the liquid crystals sealed between the substrates 11a and 11b. Such a display device, that is, the liquid crystal display device 10 can be used in various applications including displays for smartphones and tablet-type personal computers.

Second Embodiment

A second embodiment of the present invention will be described with reference to FIGS. 15 and 16. The second embodiment includes flat portions 48 on a light exiting surface 119a of a light guide plate 119 in addition to light exiting surface-side prism portions 143. Configurations, functions, and effects similar to those of the first embodiment will not be described.

As illustrated in FIGS. 15 and 16, the flat portions 48 having a flat shape along the first direction (the X-axis direction) and the second direction (the Y-axis direction) are formed on the light exiting surface 119a of the light guide plate 119 in addition to the light exiting surface-side prism portions 143. Specifically, on the light exiting surface 119a of the light guide plate 119, the light exiting surface-side unit prisms 143a are arranged at predetermined intervals along the second direction and each flat portion 48 is arranged between the adjacent light exiting surface-side unit prisms 143a adjacent to each other in the second direction. Namely, the light exiting surface-side unit prisms 143a and the flat portions 48 are alternately arranged along the second direction. The width of the flat portions 48 (measuring in the second direction) is smaller than the width of the light exiting surface-side unit prisms 143a. The flat portions 48 extend for an entire length of the light guide plate 119 in the first direction. At ends of the flat portions 48 with respect to the second direction of the light guide plate 119, the light exiting surface-side unit prisms 143a are arranged, respectively. When the number of the light exiting surface-side unit prisms 143a is "n," the number of the flat portions 48 is "n−1." Namely, the number of the light exiting surface-side unit prisms 143a is larger than the number of the flat portions 48.

Next, functions of the flat portions 48 will be described. Rays of light from LEDs enter the light guide plate 119 and reach the light exiting surface 119a after traveling through the light guide plate 119. The rays of light that have reached the light exiting surface 119a include at least the rays of light that exit after anisotropic light collecting effects are added by the light exiting surface-side unit prisms 143a, the rays of light that are totally reflected by the light exiting surface-side unit prisms 143a and returned to the opposite plate surface 119c, and the rays of light that are totally reflected by the flat portions 48 and returned to the opposite plate surface 119c. The rays of light returned to the opposite plate surface 119c by the flat portions 48 spread in a wider area in comparison to the rays of light that are totally reflected by the light exiting surface-side unit prisms 143a and returned to the opposite plate surface 119c and travel through the light guide plate 119. Namely, the light traveling through the light guide plate 119 is properly diffused with respect to the second direction and exit while the anisotropic light collecting effects are added by the light exiting surface-side unit prisms 143a. Therefore, uneven brightness is less likely to occur in the exiting light.

As described above, according to this embodiment, each flat portions 48 that is flat along the first direction and the second direction is arranged between the adjacent light exiting surface-side unit prisms 143a that are adjacent to each other in the second direction. According to the configuration, some rays of light that have traveled through the light guide plate 119 and reached the light exiting surface 119a are totally reflected by the flat portions 48 and returned to the opposite plate surface 119c. The rays of light returned to the opposite plate surface 119c by the flat portions 48 spread in the wider area and travel through the light guide plate 119 in comparison to the rays of light that are totally reflected by the light exiting surface-side unit prisms 143a and returned to the opposite plate surface 119c. Therefore, the uneven brightness is less likely to occur in the light exiting from the backlight unit.

Third Embodiment

A third embodiment of the present invention will be described with reference to FIG. 17. The third embodiment includes light exiting surface-side lenticular lens portions 49 instead of the light exiting surface-side prism portions 43 in the first embodiment. Configurations, functions, and effects similar to those of the first embodiment will not be described.

As illustrated in FIG. 17, light exiting surface-side lenticular lens portions (light exiting surface-side anisotropic light collecting portions) 49 are formed on alight exiting surface 219a of a light guide plate 219. The light exiting surface-side lenticular lens portions 49 are configured to selectively add light collecting effects with respect to the second direction (the Y-axis direction) to exiting light. The light exiting surface-side lenticular lens portions 49 include cylindrical lenses (light exiting surface-side unit light collecting portions) 49a that extend in the first direction (the X-axis direction). The cylindrical lenses 49a are arranged along the second directions. The light exiting surface-side lenticular lens portions 49 are formed integrally with the light guide plate 219. To form the light exiting surface-side lenticular lens portions 49 integrally with the light guide plate 219, the light guide plate 219 may be produced by injection molding using a mold having a forming surface formed in a transcriptional shape for transferring shapes of the light exiting surface-side lenticular lens portions 49. Each cylindrical lens 49a has a half-columnar shape with an axis aligned with the first direction. A surface of each cylindrical lens 49a facing the front has a circular arc shape. Each cylindrical lens 49a has a semicircular cross section along an arrangement direction of the cylindrical lenses 49a (the second direction) perpendicular to the extending direction thereof (the first direction).

As illustrated in FIG. 17, if rays of light inside the cylindrical lens 49a enter an arched surface (an interface) with incidences smaller than a critical angle, the rays of light are refracted at an outer surface and exit. Namely, light collecting effects are selectively added with respect to the second direction. The second direction corresponds to the light collecting direction of the cylindrical lenses 49a. The rays of light that have passed focuses of the cylindrical lenses 49a are refracted at the arched outer surfaces exit in directions substantially parallel to the direction toward the front. According to the configuration, the rays of light exiting through the light exiting surface 219a and travel in the second direction can be selectively angled such that the rays of light travel toward the front. Such light collecting effects are achieved. If the rays of light inside the cylindrical lenses 49a enter the arched surface with incidences larger than the critical angle, the rays of light are totally reflected at the arched outer surfaces to travel along the first direction in the cylindrical lenses 49a. Namely, the light can be diffused in the first direction. According to the configuration, uneven brightness that may occur in the light exiting through the light exiting surface 219a can be reduced. When an angle θt of a tangent Ta at a base 49a1 of the arched surface of each cylindrical lens 49a relative to the second direction is referred to as an "angle of tangent," the angle θt is preferably in a range from 30° to 70°. In FIG. 17, the angle θt is about 70°.

As described above, according to this embodiment, the light exiting surface-side lenticular lenses (light exiting surface-side anisotropic light collecting portions) 49 includes the light exiting surface-side unit light collecting portions that are formed from the cylindrical lenses 49a having the arched surfaces. In comparison to a configuration in which light exiting surface-side unit light collecting portions are formed from prisms having triangular cross sections, uneven brightness is further less likely to occur in the light exiting from the backlight unit.

Fourth Embodiment

A fourth embodiment of the present invention will be described with reference to FIG. 18. The fourth embodiment includes light exiting surface-side lenticular lens portions 349 having a configuration similar to that of the third embodiment described above instead of the light exiting surface-side prism portions 143 of the second embodiment. Configurations, functions, and effects similar to those of the second and the third embodiments will not be described.

As illustrated in FIG. 18, on a light exiting surface 319a of the light guide plate 319 according to this embodiment, flat portions 348 and cylindrical lenses 349a of light exiting surface-side lenticular lens portions 349 are arranged in the second direction (the Y-axis direction). The flat portions 348 and the cylindrical lenses 349a are alternately arranged along the second direction. According to the configuration, uneven brightness reducing effects by the flat portions 348 and uneven brightness reducing effects by the cylindrical lenses 349a can be achieved. Therefore, uneven brightness is further less likely to occur in light exiting from the light guide plate 319.

Fifth Embodiment

A fifth embodiment of the present invention will be described with reference to FIG. 19. The fifth embodiment does not include the flat surfaces 47 of the first embodiment described earlier and includes first reflecting protrusions 445 formed in areas different from those of the first embodiment. Configurations, functions, and effects similar to those of the first embodiment will not be described.

Figure 19:
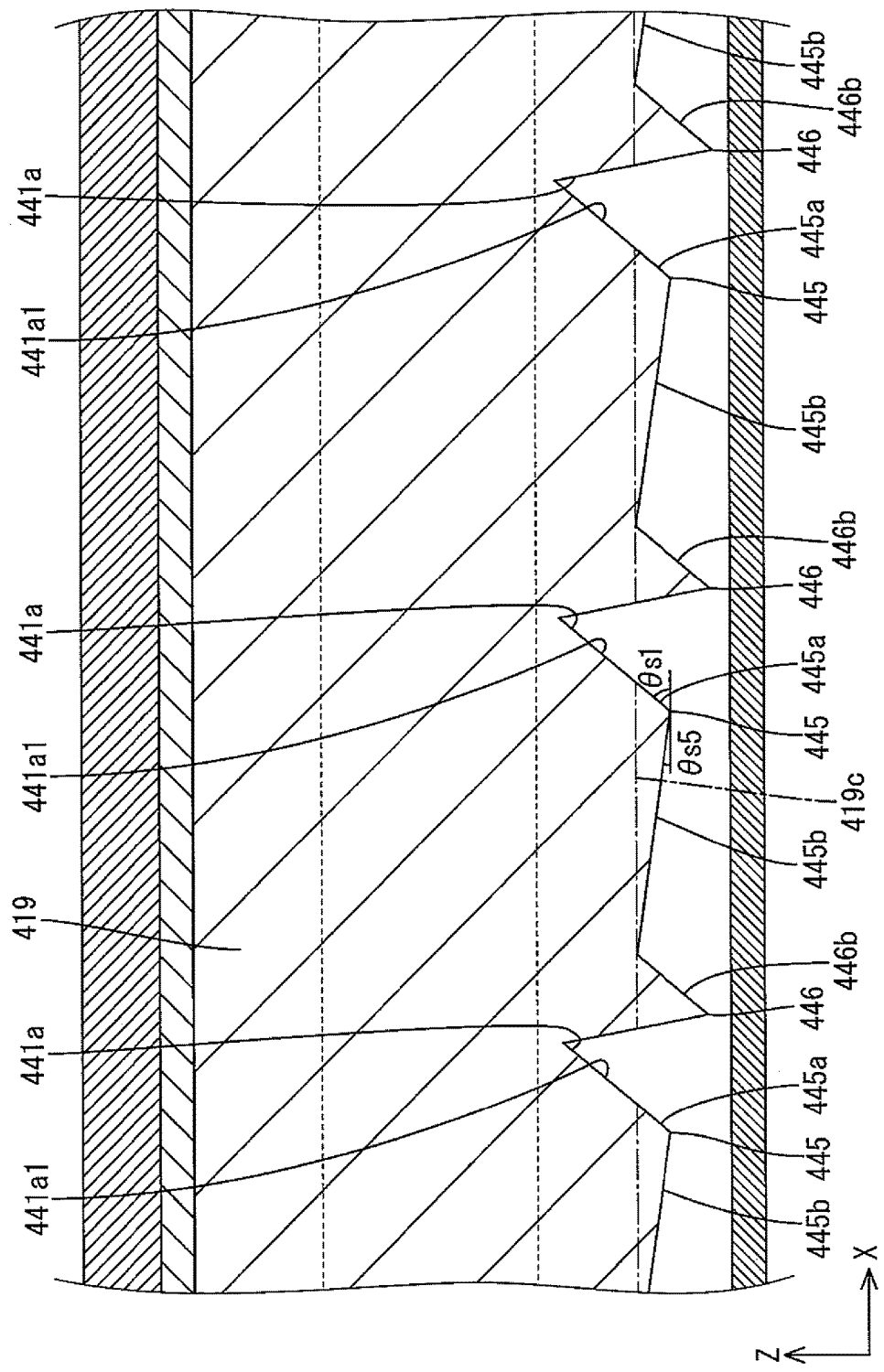
FIG. 19 is a cross-sectional view of a backlight unit along a long-side direction (the first direction, the X-axis direction) according to a fifth embodiment of the present invention.

As illustrated in FIG. 19, each of the first reflecting protrusions 445 according to this embodiment has a dimension measuring in the first direction is equal to a distance between two unit reflecting portions 441a that are adjacent to each other in the first direction. Namely, between two unit reflecting portions 441a that are adjacent to each other in the first direction, the first reflecting protrusion 445 is arranged for an entire length in the first direction. The first reflecting protrusion 445 includes an extended main reflecting surface 445a that is formed such that an angle θs1 of slope of the extended main reflecting surface 445a is equal to that of a main reflecting surface 441a1. The first reflecting protrusion 445 includes a first auxiliary reflecting surface 445b that is formed such that an angle θs5 of slope of the first auxiliary reflecting surface 445b is smaller than the first embodiment (an angle θs3 of slope of the first auxiliary reflecting surface 45b illustrated in FIG. 10). As described above, the slope of the first auxiliary reflecting surface 445b is gentler than the angle of the slope in the first embodiment but a distance along the surface in the first direction is larger than the first embodiment. Therefore, a larger number of rays of light traveling toward an opposite plate surface 419c through a light guide plate 419 are reflected by the first auxiliary reflecting surfaces 445b and directed to the main reflecting surfaces 441a1 or the extended main reflecting surfaces 445a. The areas in which the first auxiliary reflecting surfaces 445b with respect to the first direction are from peaks of the first reflecting protrusions 445 (front ends of the extended main reflecting surfaces 445a) to rear ends of second auxiliary reflecting surfaces 446b of second reflecting protrusions 446 arranged on an LED side (on the left in FIG. 19). In this embodiment, intervals of unit reflecting portions 441a arranged along the first direction gradually increase as a distance from the LEDs in the first direction increases. Similarly, dimensions of the first reflecting protrusions 445 arranged in the first direction measuring in the first direction gradually increase as a distance from the LEDs in the first direction increases. A rate of the increase is equal to a rate of increase in intervals of the unit reflecting portions 441a.

As described above, according to this embodiment, the first reflecting protrusions 445 are formed such that the dimensions in the first direction are equal to the intervals between the unit reflecting portions 441a that are adjacent to each other in the first direction. Namely, among the unit reflecting portions 441a that are adjacent to each other in the first direction, the first reflecting protrusions 445 are arranged for the entire length in the first direction, respectively. According to the configuration, the rays of light traveling toward the opposite plate surface 419c through the light guide plate 419 can be efficiently reflected by the first auxiliary reflecting surfaces 445b of the first reflecting protrusions 445 and directed to the main reflecting surfaces 441a1 and the extended main reflecting surfaces 445a.

Sixth Embodiment

A sixth embodiment of the present invention will be described with reference to FIG. 20. The sixth embodiment includes first reflecting protrusions 545 and second reflecting protrusions 546 having shapes different from those of the first embodiment. Configurations, functions, and effects similar to those of the first embodiment will not be described.

Figure 20:
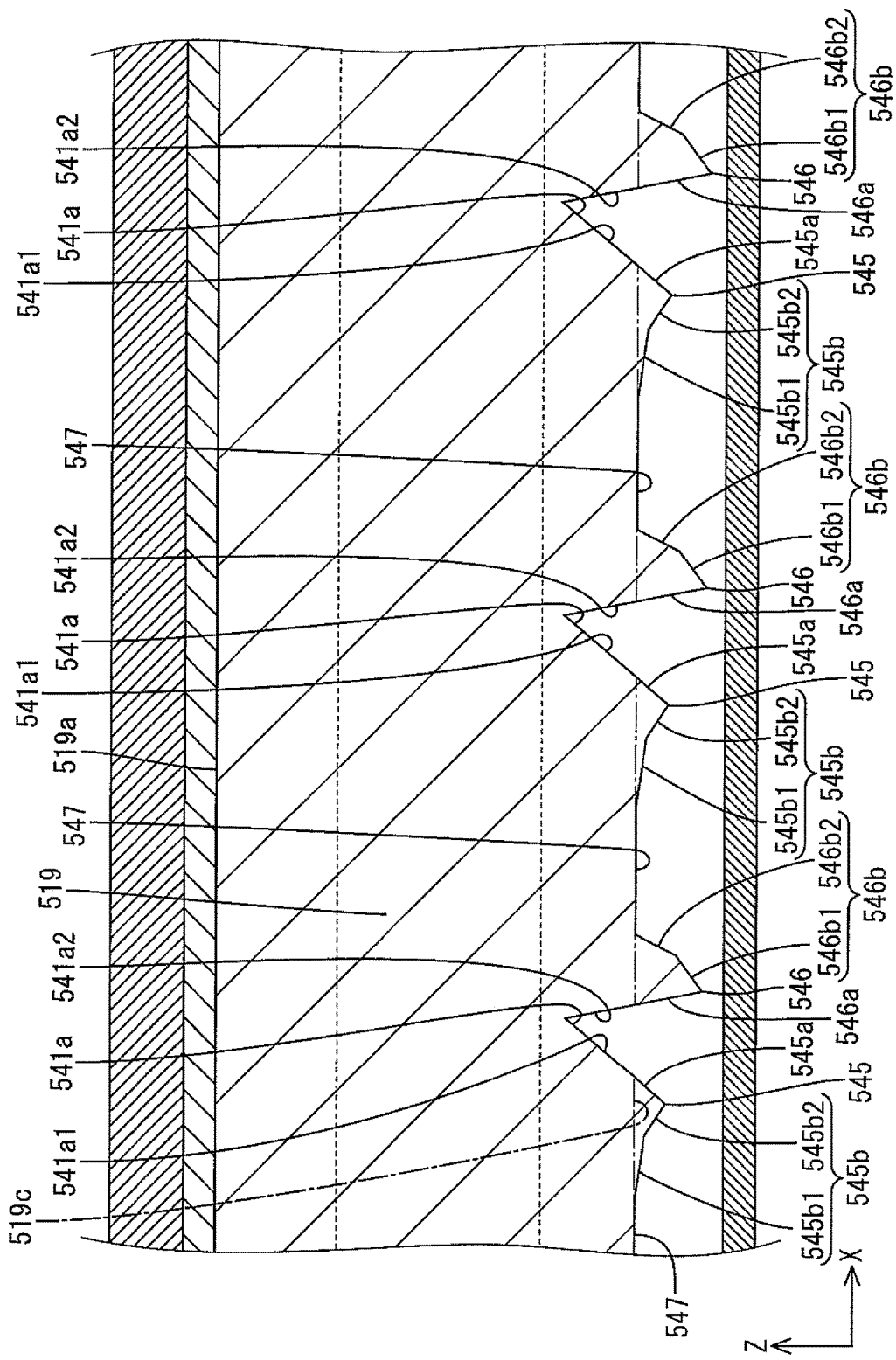
FIG. 20 is a cross-sectional view of a backlight unit along a long-side direction (the first direction, the X-axis direction) according to a sixth embodiment of the present invention.

As described in FIG. 20, the first reflecting protrusions 545 include first auxiliary reflecting surfaces 545b. Each first auxiliary reflecting surface 545b includes two sloped surfaces 545b1 and 545b2 having different angles of slope. The first auxiliary reflecting surface 545b includes a gently sloped first auxiliary reflecting surface 545b1 and a steeply sloped first auxiliary reflecting surface 545b2. The gently sloped first auxiliary reflecting surface 545b1 has a smaller angle of slope and thus a slope thereof is gentler. The steeply sloped first auxiliary reflecting surface 545b2 has a larger angle of slope and thus a slope thereof is steeper. The gently sloped first auxiliary reflecting surface 545b1 is arranged on the LED side relative to the steeply sloped first auxiliary reflecting surface 545b2 with respect to the first direction. A front end of the gently sloped first auxiliary reflecting surface 545b1 continues to a flat surface 547. The steeply sloped first auxiliary reflecting surface 545b2 is arranged on a side opposite from the LED side (an extended main reflecting surface 545b side) relative to the gently sloped first auxiliary reflecting surface 545b1 with respect to the first direction. A rear end of the steeply sloped first auxiliary reflecting surface 545b2 continues to an extended main reflecting surface 545a. Ray of light traveling toward an opposite plate surface 519c through a light guide plate 519 are reflected by the gently sloped first auxiliary reflecting surfaces 545b1 and the steeply sloped first auxiliary reflecting surface 545b2 of the first auxiliary reflecting surfaces 545b and directed to main reflecting surfaces 541a1 of unit reflecting portions 541a and extended main reflecting surfaces 545a. The reflected rays of light are angled differently by the first auxiliary reflecting surfaces 545b1 and the steeply sloped first auxiliary reflecting surface 545b2. Therefore, the rays of reflected light properly spread to travel in different directions and thus uneven brightness is less likely to occur in light exiting from the light guide plate 519 with respect to the first direction.

Each second reflecting protrusion 546 includes a second auxiliary reflecting surface 546b. The second auxiliary reflecting surface 546b includes two sloped surfaces 546b1 and 546b2 having different angles of slope. The second auxiliary reflecting surface 546b includes a gently sloped second auxiliary reflecting surface 546b1 and a steeply sloped second auxiliary reflecting surface 546b2. The gently sloped second auxiliary reflecting surface 546b1 has a smaller angle of slope and thus a slope thereof is gentler. The steeply sloped second auxiliary reflecting surface 546b2 has a larger angle of slope and thus a slope thereof is steeper. The gently sloped second auxiliary reflecting surface 546b1 is arranged on the LED side (an extended light reentering surface 546a side) relative to the steeply sloped second auxiliary reflecting surface 546b2 with respect to the first direction. A front end of the gently sloped second auxiliary reflecting surface 546b1 continues to an extended light reentering surface 546a. The steeply sloped second auxiliary reflecting surface 546b2 is arranged on a side opposite from the LED side relative to the gently sloped second auxiliary reflecting surface 546b1 with respect to the first direction. A rear end of the steeply sloped second auxiliary reflecting surface 546b2 continues to the flat surface 547. Ray of light entering through the light reentering surfaces 541a2 of the unit reflecting portions 541a and the extended light reentering surfaces 546a are reflected by the gently sloped second auxiliary reflecting surfaces 546b1 and the steeply sloped second auxiliary reflecting surface 546b2 of the second auxiliary reflecting surfaces 546b and directed to the light exiting surface 519a. The reflected rays of light are angled differently by the second auxiliary reflecting surfaces 546b1 and the steeply sloped second auxiliary reflecting surface 546b2. Therefore, the rays of reflected light properly spread to travel in different directions and thus uneven brightness is less likely to occur in light exiting from the light guide plate 519 with respect to the first direction.

According to this embodiment as described above, at least one of the first reflecting protrusions 545 and the second reflecting protrusions 546 includes at least one of the first auxiliary reflecting surfaces 545b and the second auxiliary reflecting surfaces 546b formed from the sloped surfaces 545b1, 545b2, 546b1, and 546b2, the angles of slope of which are different from one another. With at least one of the first auxiliary reflecting surfaces 545b and the second auxiliary reflecting surfaces 546b formed from the sloped surfaces 545b1, 545b2, 546b1, and 546b2, the rays of reflected light are more likely to spread to travel in different directions and thus an occurrence of uneven brightness is further properly reduced.

Seventh Embodiment

A seventh embodiment of the present invention will be described with reference to FIG. 21. The seventh embodiment includes first reflecting protrusions 645 and second reflecting protrusions 646 having shapes different from those of the first embodiment described earlier. Configurations, functions, and effects similar to those of the first embodiment will not be described.

Figure 21:
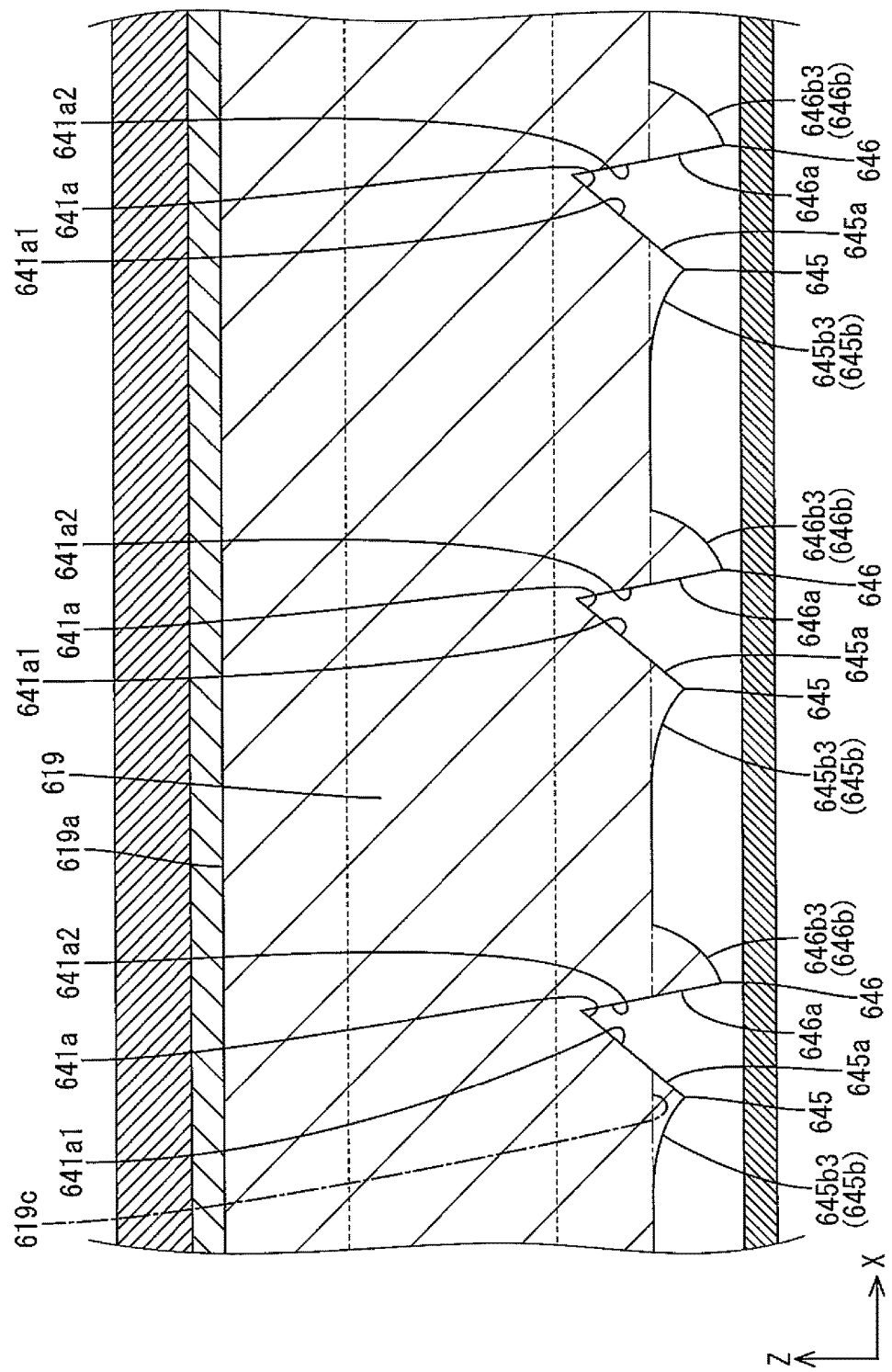
FIG. 21 is a cross-sectional view of a backlight unit along a long-side direction (the first direction, the X-axis direction) according to a seventh embodiment of the present invention.

As illustrated in FIG. 21, the first reflecting protrusions 645 according to this embodiment include first auxiliary reflecting surfaces 645b and curved surfaces 645b3. Each curved surface 645b3 has an arc shaped cross section along the first direction. A tangent of the curved surface 645b3 is angled relative to a light exiting surface 619a and an opposite plate surface 619c. Namely, each curved surface 645b3 is configured such that angles of slope of the curved surface 645b3 relative to the light exiting surface 619a and the opposite plate surface 619c continuously change. The curved surfaces 645b3 are formed by recessing the first reflecting protrusions 645 to inner sides. Rays of light traveling toward the opposite plate surface 619c through the light guide plate 619 are reflected by the curved surfaces 645b3 of the first auxiliary reflecting surfaces 645b and directed to main reflecting surfaces 641a1 of unit reflecting portions 641a and extended main reflecting surfaces 645a. The rays of reflected light are angled at different degrees according to positions on the curved surfaces 645b3. Therefore, the rays of reflected light properly spread to travel in different directions and thus uneven brightness is less likely to occur in light exiting from the light guide plate 619 with respect to the first direction.

The second reflecting protrusions 646 include second auxiliary reflecting surfaces 646b and curved surfaces 646b3. Each curved surface 646b3 has an arc shaped cross section along the first direction. A tangent of the curved surface 646b3 is angled relative to a light exiting surface 619a and an opposite plate surface 619c. Namely, each curved surface 646b3 is configured such that angles of slope of the curved surface 646b3 relative to the light exiting surface 619a and the opposite plate surface 619c continuously change. The curved surfaces 646b3 are formed by bulging the second reflecting protrusions 646. Rays of light entering through the light reentering surfaces 641a2 of unit reflecting portions 641a and extended light reentering surfaces 646a are reflected by the curved surfaces 646b3 of the second auxiliary reflecting surfaces 646b and directed toward the light exiting surface 619a. The rays of reflected light are angled at different degrees according to positions on the curved surfaces 646b3. Therefore, the rays of reflected light properly spread to travel in different directions and thus uneven brightness is further less likely to occur in the light exiting from the light guide plate 619 with respect to the first direction.

According to this embodiment, as described above, at least one of the first reflecting protrusions 645 and the second reflecting protrusions 646 includes at least one of the first auxiliary reflecting surfaces 645b and the second auxiliary reflecting surfaces 646b that are curved surfaces 645b3 and 646b3. With at least one of the first auxiliary reflecting surfaces 645b and the second auxiliary reflecting surfaces 646b that are the curved surfaces 645b3 and 646b3, the rays of reflected light are more likely to spread to travel in different directions and thus the occurrence of the uneven brightness is further reduced.

Eighth Embodiment

An eighth embodiment of the present invention will be described with reference to FIG. 22. The eighth embodiment includes first reflecting protrusions 745 and second reflecting protrusions 746 having shapes different from those of the first embodiment described earlier. Configurations, functions, and effects similar to those of the first embodiment will not be described.

Figure 22:
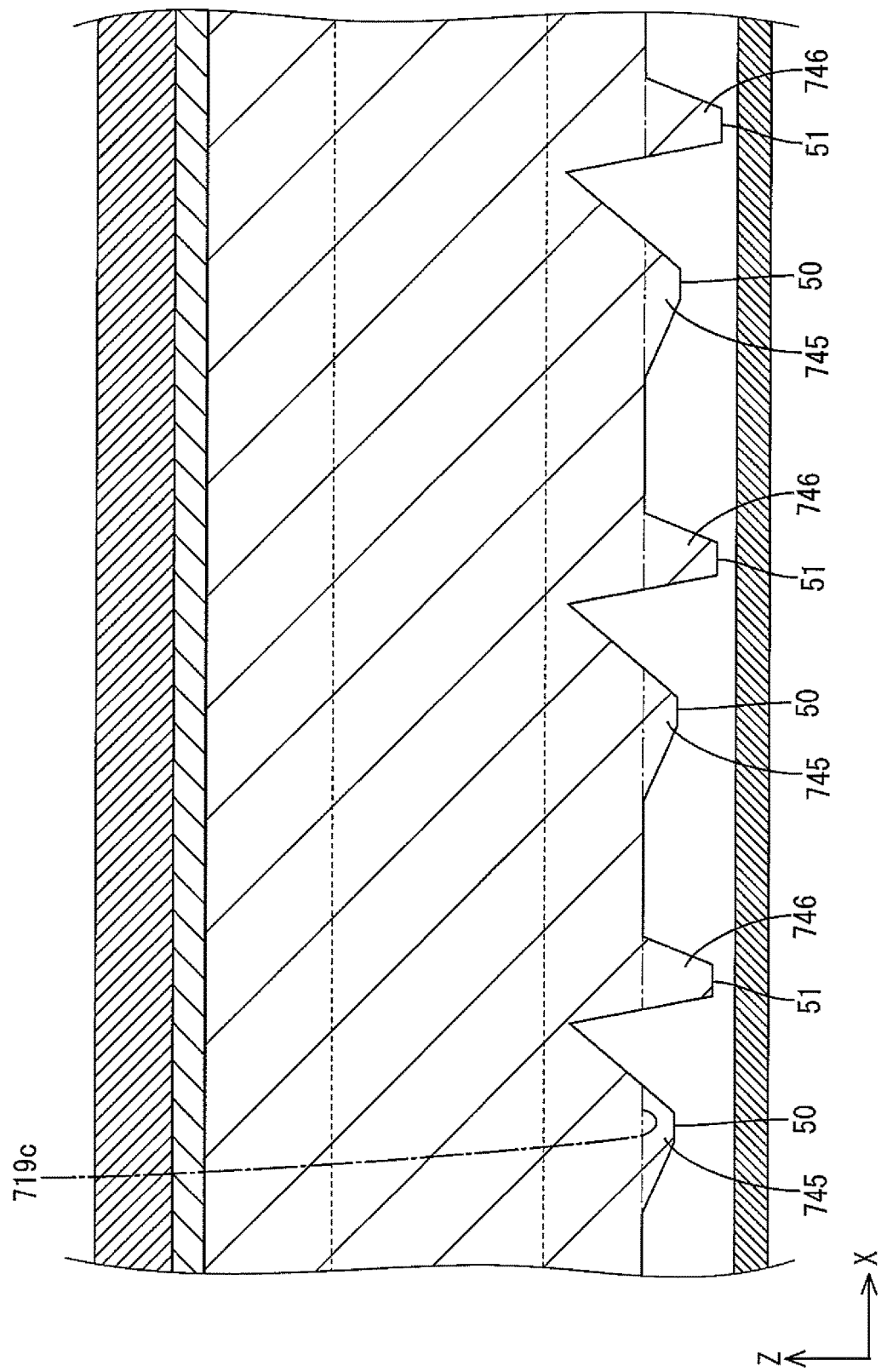
FIG. 22 is a cross-sectional view of a backlight unit along a long-side direction (the first direction, the X-axis direction) according to an eighth embodiment of the present invention.

As illustrated in FIG. 22, the first reflecting protrusions 745 according to this embodiment include flat surfaces 50 at distal ends. The flat surfaces 50 are formed by cutting distal end portions of the first reflecting protrusions 745 such that the flat surfaces 50 are flat along the first direction and the second direction. Because the first reflecting protrusions 745 do not include pointy distal ends but the flat surfaces 50, even if other components contact the distal ends, deformations such as collapses are less likely to occur. According to the configuration, optical performances of the first reflecting protrusions 745 are stably exerted.

The second reflecting protrusions 746 include flat surfaces 51 at distal ends. The flat surfaces 51 are formed by cutting distal end portions of the second reflecting protrusions 746 such that the flat surfaces 51 are flat along the first direction and the second direction. Because the second reflecting protrusions 746 do not include pointy distal ends but the flat surfaces 51, even if other components contact the distal ends, deformations such as collapses are less likely to occur. According to the configuration, optical performances of the second reflecting protrusions 746 are stably exerted. Furthermore, dimensions of the second reflecting protrusions 746 from an opposite plate surface 719c measuring in a direction in which the second reflecting protrusions 746 project are larger than those of the first reflecting protrusions 745. Therefore, other components are more likely to contact the second reflecting protrusions 746. With the flat surfaces 51, the deformations such as collapses at the distal ends due to the contact of other components are further effectively reduced.

According to this embodiment as described above, at least one of the first reflecting protrusions 745 and the second reflecting protrusions 746 includes the flat surfaces 50 and 51 at the distal ends at ends of projection from the opposite plate surface 719c. With the flat surfaces 50 and 51, the deformations such as collapses are less likely to occur at the distal ends of at least one of the first reflecting protrusions 745 and the second reflecting protrusions 746. Therefore, optical performances of at least one of the first reflecting protrusions 745 and the second reflecting protrusions 746 including the flat surfaces 50 and 51 are stably exerted.

Ninth Embodiment

A ninth embodiment of the present embodiment will be described with reference to FIG. 23. The ninth embodiment includes unit reflecting portions 841a and opposite plate surface-side unit prisms 844a having configurations different from those of the fourth embodiment. In accordance with such a modification, the ninth embodiment includes first reflecting protrusions 845 and second reflecting protrusions 846 having configurations different from those of the fourth embodiment. Configurations, functions, and effects similar to those of the second and the fourth embodiments will not be described.

Figure 23:
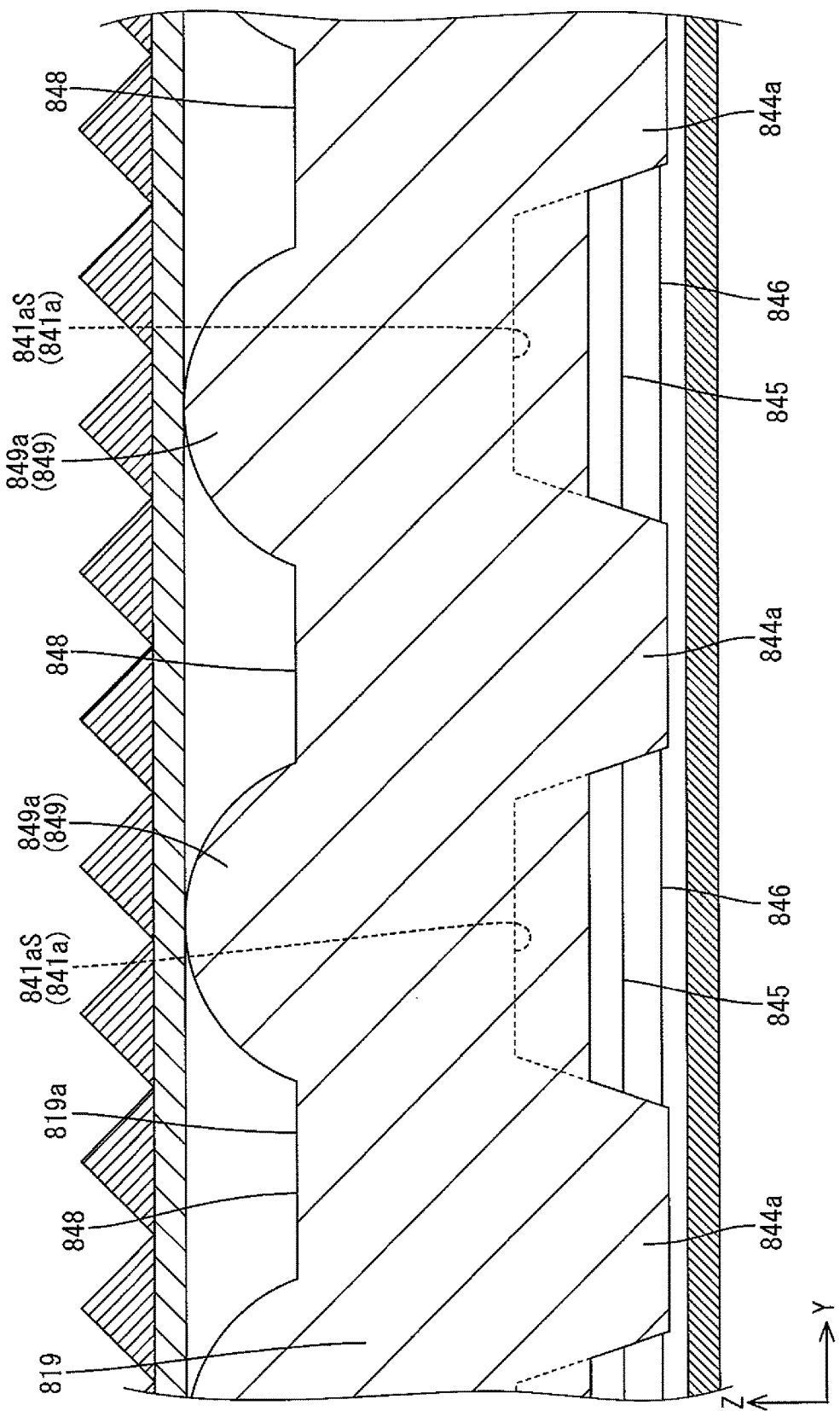
FIG. 23 is a cross-sectional view of a backlight unit along a short-side direction (the second direction, the Y-axis direction) according to a ninth embodiment of the present invention.

As illustrated in FIG. 23, each opposite plate surface-side unit prism 844a has a trapezoidal cross section along the second direction. The opposite plate surface-side unit prisms 844a are arranged at intervals in the second direction. The unit reflecting portions 841a include divided unit reflecting portions 841aS at intervals in the second direction similarly to the opposite plate surface-side unit prisms 844a. Positions of the divided unit reflecting portions 841aS are adjacent to the respective opposite plate surface-side unit prisms 844a in the second direction. Namely, the opposite plate surface-side unit prisms 844a and the divided unit reflecting portions 841aS are alternately arranged in the second direction. Each divided unit reflecting portion 841aS is arranged between two opposite plate surface-side unit prisms 844a that are adjacent to each other in the second direction, and each opposite plate surface-side unit prism 844a is arranged between two divided unit reflecting portions 841aS that are adjacent to each other in the second direction. Therefore, the divided unit reflecting portions 841aS are formed with holes on a rear side in the third direction without holes in sides which extend along the second direction. Each divided unit reflecting portion 841aS has a trapezoidal shape when viewed from the front in the first direction. A cross section of each divided unit reflecting portion 841aS in the second direction is similar to that of the first embodiment described earlier.

Lines of the first reflecting protrusions 845 and the second reflecting protrusions 846 are arranged at intervals in the second direction. Positions of the first reflecting protrusions 845 and the second reflecting protrusions 846 are aligned with positions of the divided unit reflecting portions 841aS described above. Namely, the first reflecting protrusions 845 and the second reflecting protrusions 846 are arranged adjacent to the opposite plate surface-side unit prisms 844a in the second direction. The first reflecting protrusions 845 and the second reflecting protrusions 846, and the opposite plate surface-side unit prisms 844a are alternately arranged in the second direction. Each first reflecting protrusion 845 and each second reflecting protrusion 846 are arranged between two opposite plate surface-side unit prisms 844a adjacent to each other in the second direction. Each opposite plate surface-side unit prism 844a is arranged between two first reflecting protrusions 845 adjacent to each other in the second direction and two second reflecting protrusions 846 adjacent to each other in the second direction. Each first reflecting protrusion 845 and each second reflecting protrusion 846 have trapezoidal cross sections when viewed from the front in the first direction. Distal ends of the first reflecting protrusions 845 and the second reflecting protrusions 846 are substantially straight along the second direction. According to the configuration, even if the distal ends of the first reflecting protrusions 845 and the second reflecting protrusions 846 contact other components, deformations such as collapses are less likely to occur at the distal ends. Therefore, optical performances of the first reflecting protrusions 845 and the second reflecting protrusions 846 are stably exerted. The cross sections of the first reflecting protrusions 845 and the second reflecting protrusions 846 with respect to the second direction are similar to those of the first embodiment described earlier.

Furthermore, on a light exiting surface 819a of a light guide plate 819, light exiting surface-side lenticular lens portions 849 and flat portions 848 are formed similarly to the fourth embodiment. The light exiting surface-side lenticular lens portions 849 including cylindrical lenses 849a arranged along the second direction. The flat portions 848 are arranged adjacent to the cylindrical lenses 849a in the second direction, respectively. The flat portions 848 and the cylindrical lenses 849a are alternately arranged along the second direction. Configurations, functions, and effects of the flat portions 848 and the cylindrical lenses 849a similar to those of the fourth embodiment will not be described.

Tenth Embodiment

A tenth embodiment of the present embodiment will be described with reference to FIG. 24. The tenth embodiment includes first reflecting protrusions 945 and second reflecting protrusions 946 having configurations different from those of the ninth embodiment described above. Configurations, functions, and effects similar to those of the ninth embodiment will not be described.

Figure 24:
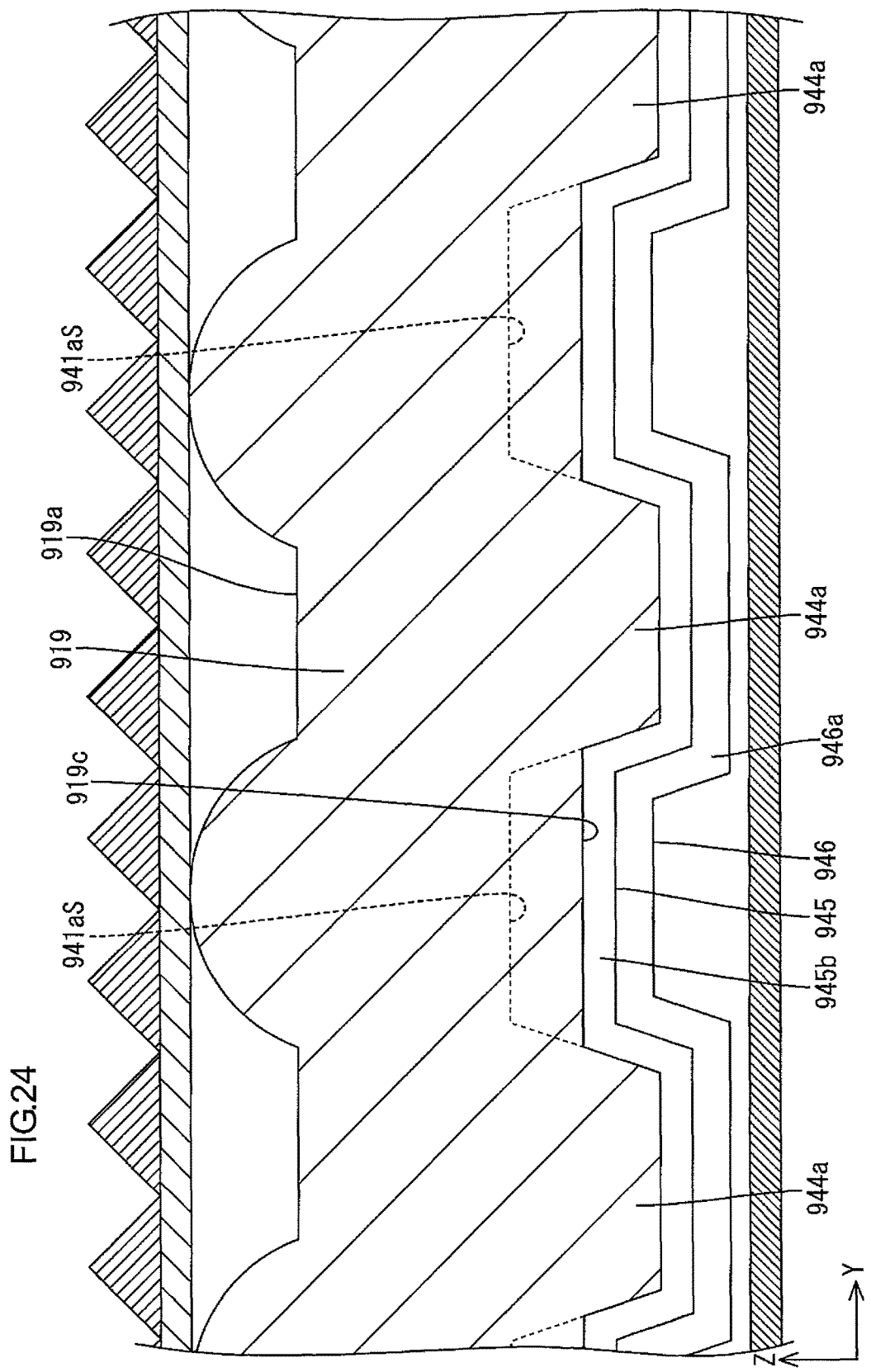
FIG. 24 is a cross-sectional view of a backlight unit along a short-side direction (the second direction, the Y-axis direction) according to a tenth embodiment of the present invention.

As illustrated in FIG. 24, the first reflecting protrusions 945 and the second reflecting protrusions 946 according to this embodiment continuously extend in the second direction and arranged across divided unit reflecting portions 941aS, respectively. The divided unit reflecting portions 941aS are arranged at intervals along the second direction. The first reflecting protrusions 945 and the second reflecting protrusions 946 continuously extend for an entire width of a light guide plate 919 in the second direction without any breaks. The first reflecting protrusions 945 and the second reflecting protrusions 946 are arranged over areas in which the divided unit reflecting portions 941aS are formed with respect to the second direction and areas in which opposite plate surface-side unit prisms 944a are formed with respect to the second direction. According to the configuration, surface areas of the first reflecting protrusions 945 and the second reflecting protrusions 946 are increased in comparison to those of the first embodiment or the ninth embodiment. Therefore, an amount of reflected light reflected by first auxiliary reflecting surfaces 945b of the first reflecting protrusions 945 increases and an amount of reflected light reflected by second auxiliary reflecting surfaces (not illustrated) of the second reflecting protrusions 946 increases. According to the configuration, optical performances of the first reflecting protrusions 945 and the second reflecting protrusions 946 are enhanced and uneven brightness is more effectively reduced. Furthermore, the first reflecting protrusions 945 and the second reflecting protrusions 946 have shapes viewed from the front in the first direction are similar to cross sections of portions of an opposite plate surface 919c of a light guide plate 919 in which the divided unit reflecting portions 941aS are not formed (cross sections illustrated in FIG. 24) viewed from the front in the first direction. Furthermore, the first reflecting protrusions 945 and the second reflecting protrusions 946 have dimensions measuring in the third direction (dimensions projecting from the opposite plate surface 919c) are constant for an entire length with respect to the second direction. According to the configuration, the surfaces areas of the first reflecting protrusions 945 and the second reflecting protrusions 946 are substantially constant regardless of positions with respect to the second direction. Therefore, optical performances of the first reflecting protrusions 945 and the second reflecting protrusions 946 are stably exerted. The configuration is further preferable for reducing uneven brightness.

In this embodiment, as described above, the first reflecting protrusions 945 and the second reflecting protrusions 946 continuously extend in the second direction, respectively, and are arranged over the divided unit reflecting portions 941aS. According to the configuration, more rays of light traveling toward the opposite plate surface 919c through the light guide plate 919 are reflected by the first auxiliary reflecting surfaces 945b of the first reflecting protrusions 945 and directed to main reflecting surfaces 941a1 of the divided unit reflecting portions 941aS and extended main reflecting surfaces. More rays of light passing through the main reflecting surfaces of the divided unit reflecting portions 931aS and the extended main reflecting surfaces efficiently enter at least one of extended light reentering surfaces 946a of the second reflecting protrusions 946 and light reentering surfaces and are reflected by the second auxiliary reflecting surfaces. According to the configuration, uneven brightness that may occur in light exiting through the light exiting surface 919a can be properly reduced by the first reflecting protrusions 945 and the second reflecting protrusions 946 and the brightness can be improved.

Eleventh Embodiment

An eleventh embodiment of the present invention will be described with reference to FIG. 25. The eleventh embodiment includes first reflecting protrusions 1045 and second reflecting protrusions 1046 having configurations different from those of the tenth embodiment described above. Configurations, functions, and effects similar to those of the eleventh embodiment will not be described.

Figure 25:
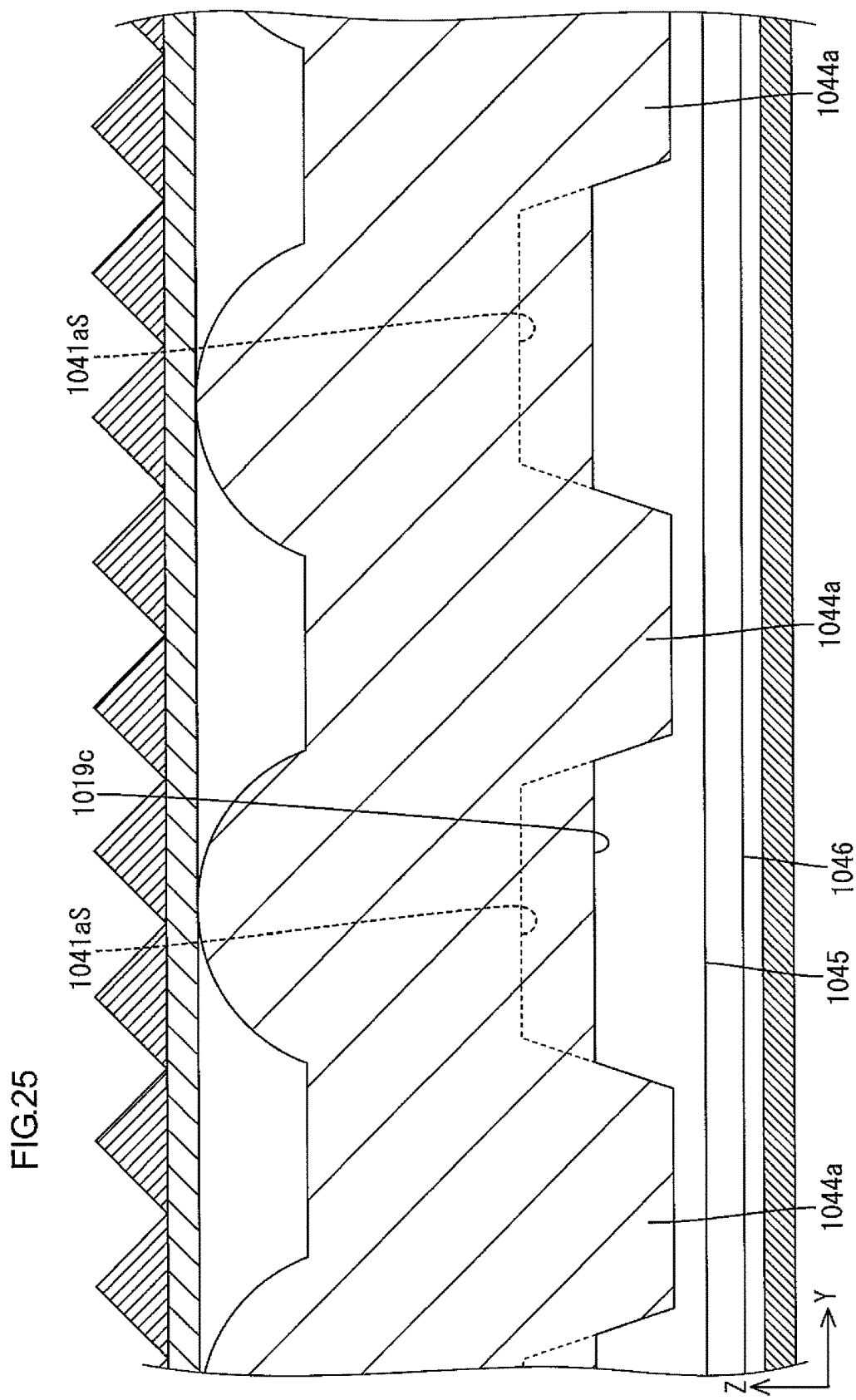
FIG. 25 is a cross-sectional view of a backlight unit along a short-side direction (the second direction, the Y-axis direction) according to an eleventh embodiment of the present invention.

As illustrated in FIG. 25, the first reflecting protrusions 1045 and the second reflecting protrusions 1046 include distal ends, positions of which with respect to the third direction are constant regardless of positions with respect to the second direction. Namely, dimensions of the first reflecting protrusions 1045 and the second reflecting protrusions 1046 measuring in the third direction (dimensions of projection from an opposite plate surface 1019c) vary according to the positions with respect to the second direction. In areas in which divided unit reflecting portions 1041aS are formed with respect to the second direction, the dimensions in the third direction are larger. In areas in which opposite plate surface-side unit prisms 1044a are formed with respect to the second direction, the dimensions in the third direction are smaller. A difference between the largest dimension and the smallest dimension in the third direction among the first reflecting protrusions 1045 and the second reflecting protrusions 1046 is about equal to a dimension of the opposite plate surface-side unit prisms 1044a projecting from the opposite plate surface 1019c. This configuration also increases surface areas of the first reflecting protrusions 1045 and the second reflecting protrusions 1046 in comparison to those of the first embodiment and the ninth embodiment. Therefore, optical performances of the first reflecting protrusions 1045 and the second reflecting protrusions 1046 are enhanced and thus uneven brightness can be further effectively reduced.

Twelfth Embodiment

Figure 27:
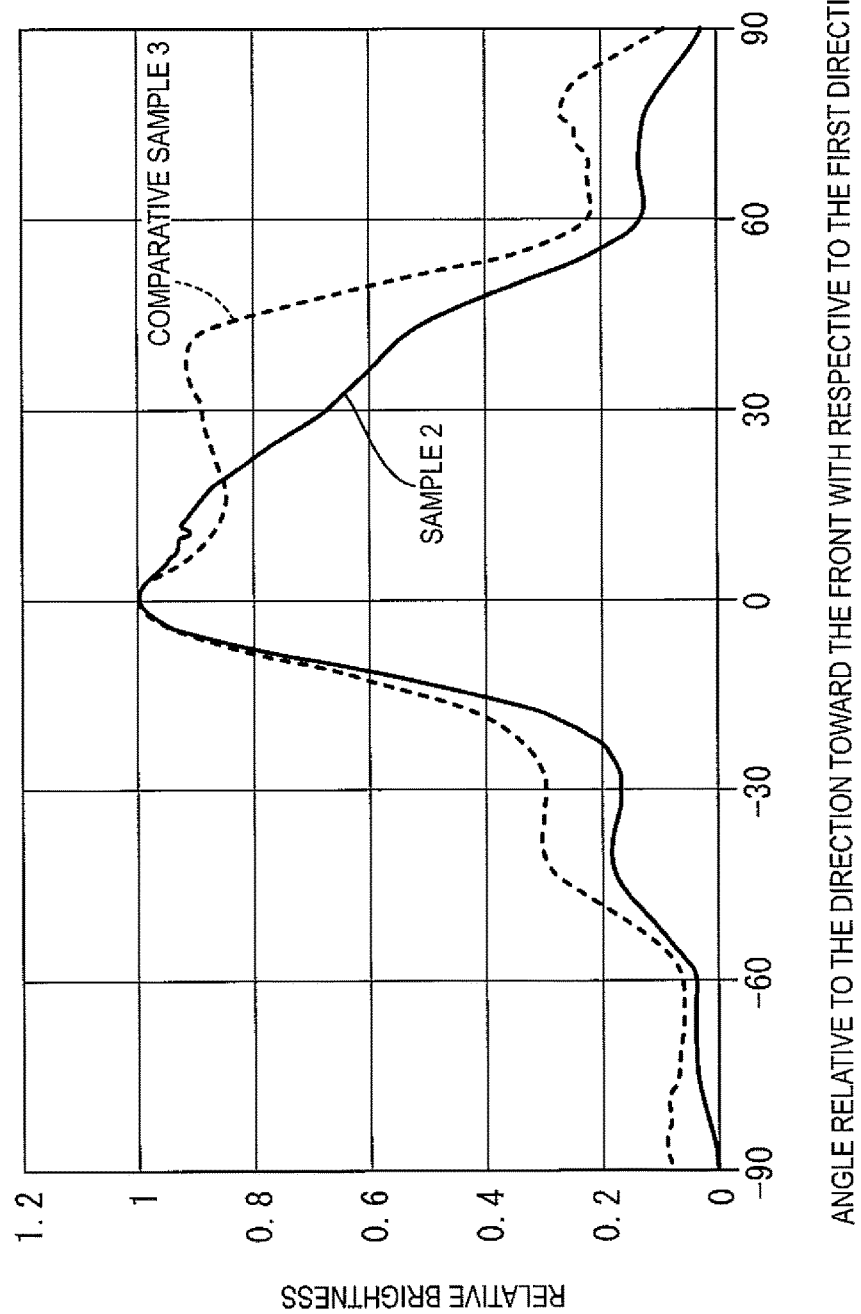
FIG. 27 is a graph illustrating angle-brightness distributions of exiting light with respect to the first direction, the exiting light being obtained by passing exiting light from a middle portion of each of light guide plates with respect to the first direction in each of comparative sample 3 and sample 2 through a prism sheet in comparative experiment 3.
Figure 28:
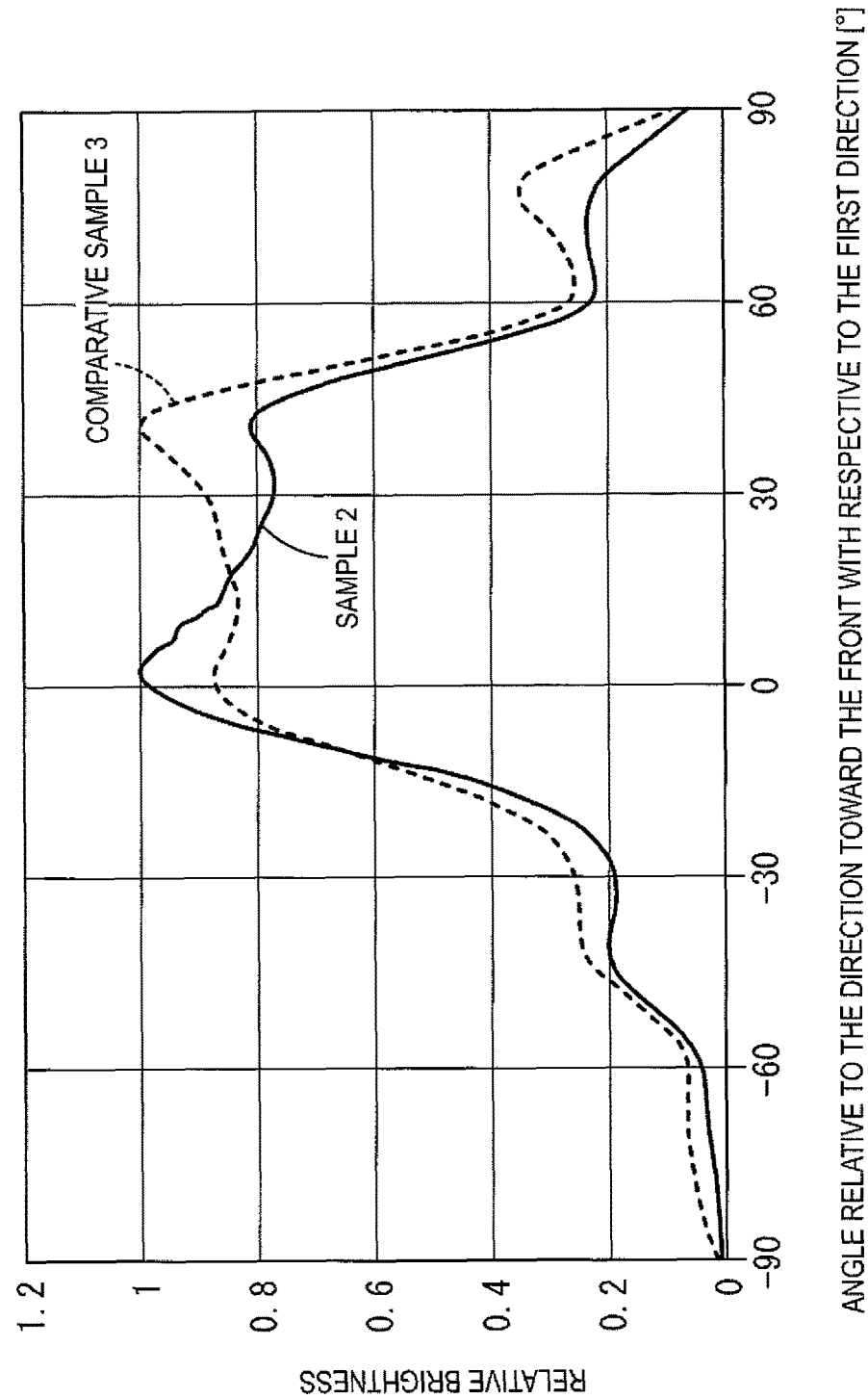
FIG. 28 is a graph illustrating angle-brightness distributions of exiting light with respect to the first direction, the exiting light being obtained by passing exiting light from a portion of each of light guide plates with respect to the first direction in each of comparative sample 3 and sample 2 through a prism sheet in comparative experiment 3.

A twelfth embodiment of the present invention will be described with reference to FIGS. 26 to 28. The twelfth embodiment includes unit reflecting portions 1141a, first reflecting protrusions 1145, and second reflecting protrusions 1146 having configurations different from those of the fifth embodiment. Configurations, functions, and effects similar to those of the fifth embodiment will not be described.

Figure 26:
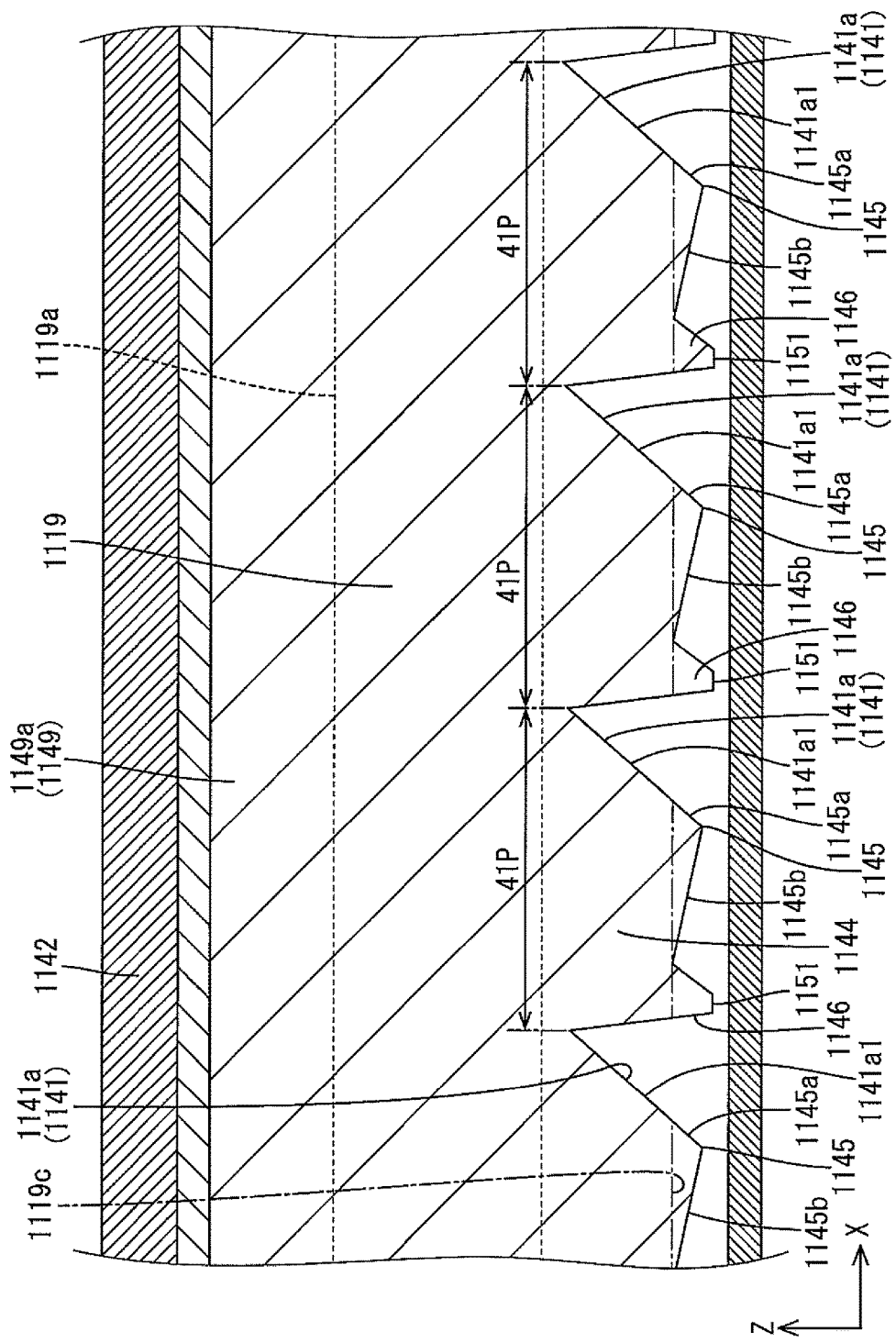
FIG. 26 is a cross-sectional view of a backlight unit along a long-side direction (the first direction, the X-axis direction) according to a twelfth embodiment of the present invention.

As illustrated in FIG. 26, the unit reflecting portions 1141a of light emission reflecting portion 1141 according to this embodiment are arranged ate intervals in the first direction and the intervals 41P in the first direction are substantially constant. The intervals 41P of the unit reflecting portions 1141a are defined so as not interfere with arrangement of pixels of the liquid crystal panel. According to the configuration, moire fringes, which are interference fringes, are less likely to be present in images displayed on the liquid crystal panel, that is, high display quality is provided. The unit reflecting portions 1141a arranged along the first direction have dimensions measuring in the first direction and the third direction that gradually increase as a distance from LEDs, which are not illustrated, in the first direction increases and gradually decreases as the distance decreases. Dimensions of main reflecting surfaces 1141a1 of the unit reflecting portions 1141a measuring in the first direction gradually increase as a distance from the LED increases and decreases as the distance decreases. On a side farther from the LEDs in the first direction, an amount of light inside a light guide plate 1119 tends to be smaller. According to the above configuration, more rays of light are reflected by the main reflecting surfaces 1141a1 of the unit reflecting portions 1141a and exit through a light exiting surface 1119a on the side farther from the LEDs. Therefore, an amount of exiting light is less likely to be deferent between the side closer to the LEDs in the first direction and the side farther from the LEDs in the first direction.

As illustrated in FIG. 26, the first reflecting protrusions 1145 are arranged for an entire length in the first direction such that each first reflecting protrusions 1145 is between two unit reflecting portions 1141a that are adjacent to each other in the first direction. The first reflecting protrusions 1145 arranged along the first direction have dimensions measuring in the first direction which gradually decrease as a distance from the LEDs increases and increase as the distance from the LEDs decreases. Areas of extended main reflecting surfaces 1145a and first auxiliary reflecting surfaces 1145b of the first reflecting protrusions 1145 arranged along the first direction along surfaces in the first direction decrease as the distance from the LEDs in the first direction increases and increase as the distance from the LEDs decreases. According to the configuration in which the first reflecting protrusions 1145 are arranged for the entire length in the first direction such that each first reflecting protrusions 1145 is between two unit reflecting portions 1141a that are adjacent to each other in the first direction, variations in dimensions of the first auxiliary reflecting surfaces 1145a in the first direction can be matched with variations in dimensions of the unit reflecting portions 1141a in the first direction. Therefore, uneven brightness that may be occur in light exiting through the light exiting surface 1119a can be properly reduced and brightness can be improved. According to the first reflecting protrusions 1145 including such first auxiliary reflecting surfaces 1145b, light inside the light guide plate 1119 are more likely to be reflected by the first auxiliary reflecting surfaces 1145b as the distance from the LEDs in the first direction decreases. The reflected light includes a larger number of vector components that point to the side opposite from the LED side in the first direction and thus directivity is properly reduced. According to the configuration, light exiting from the light guide plate 1119 through a portion of the light exiting surface 119a farther from the LEDs in the first direction and light exiting from the light guide plate 1119 through a portion of the light exiting surface 119a closer to the LEDs in the first direction are less likely to have a difference in directivity. Uneven brightness is further properly reduced.

At distal ends of the second reflecting protrusions 1146, flat surfaces 1151 similar to those of the eighth embodiment described earlier are formed. Configurations, functions, and effects of the flat surfaces 1151 are similar to those of the eighth embodiment and thus will not be described. On the light exiting surface 1119a of the light guide plate 1119 according to this embodiment, light exiting surface-side lenticular lens portions 1149 and flat portions (not illustrated) similar to the fourth embodiment are formed. The light exiting surface-side lenticular lens portions 1149 include cylindrical lenses 1149a arranged along the second direction. The flat portions are arranged adjacent to the cylindrical lenses 1149a, respectively, in the second direction. Configurations, functions, and effects of the flat portions and the cylindrical lenses 1149a are similar to those of the fourth embodiment and thus will not be described.

Next, comparative experiment 3 was conducted to find how brightness distribution of light exiting through the light exiting surface and through a prism sheet 1142 with respect to the first direction is different between the light guide plate 1119 and another light guide plate. On the light guide plate 1119, the light emission reflecting portion 1141 (unit reflecting portions 1141a), the first reflecting protrusions 1145, and the second reflecting protrusions 1146 are formed. First reflecting protrusions and second reflecting protrusions are not formed on the other light guide plate. In comparative experiment 3, the light guide plate with an opposite plate surface on which light emission reflecting portions and opposite plate surface-side prism portions are formed and with a light exiting surface on which light exiting surface-side lenticular lens portions are formed is referred to as comparative sample 3. The light guide plate 1119 with the opposite plate surface 1119c on which the light emission reflecting portion 1141, the opposite plate surface-side prism portions 1144, the first reflecting protrusions 1145, and the second reflecting protrusions 1146 are formed and with the light exiting surface 1119a on which the light exiting surface-side lenticular lens portion 1149 are formed is referred to as sample 2. The light guide plate 1119 of sample 2 has the same configuration as described earlier and the light guide plate of comparative sample 3 has the configuration excluding the first reflecting protrusions 1145 and the second reflecting protrusions 1146. In comparative experiment 3, brightness distributions regarding light exiting from the light guide plate of each of comparative sample 3 and sample 2 and passing through the prism sheet 1142 were measured. The results are illustrated in FIGS. 27 and 28. Specifically, in comparative experiment 3, light from the LEDs were fed to the light guide plate of each of comparative sample 3 and sample 2 through the light entering surface. The light exited from each light guide plate through the light exiting surface was passed through the prism sheet 1142 that was laid on the light guide plate on the light exiting side. The brightness distribution of the light exited from the prism sheet 1142 with respect to the first direction was measured. More specifically, a brightness distribution of light exiting from a middle of each light guide plate of comparative sample 3 and sample 2 with respect to the first direction, that is, from a portion farther from the LEDs was measured. Furthermore, a brightness distribution of light exiting from a portion closer to the LED with respect to the first direction, that is, from a portion close to the LEDs was measured. The result of the former case is illustrated in FIG. 27 and the result of the latter case is illustrated in FIG. 28. The prism sheet 1142 used in comparative experiment 4 is the same as the prism sheet in the first embodiment. In FIGS. 27 and 28, the vertical axis indicates relative brightness (no unit) of light exiting from the prism sheet 1142 and the horizontal axis indicates angles (in degrees [°]) regarding the first direction relative to the direction toward the front. In FIGS. 27 and 28, degrees indicated by the horizontal axis in negative values express degrees of light traveling toward the LED side (the light entering surface side) relative to the direction toward the front, that is, the light including a larger number of vector components that point to the LED side degrees in positive values express degrees of light traveling toward the side opposite from the LED side (toward the opposite end surface side) relative to the direction toward the front, that is, the light including a larger number of vector components that point to the side opposite from the LED side. As absolute values of degrees indicated by the horizontal axis in FIGS. 27 and 28 increase, the number of vector components that point to the LED side or the side opposite from the LED side increases. The relative brightness indicated by the vertical axis in FIGS. 27 and 28 is expressed by values relative to a reference (1.0) which is a brightness level in the direction toward the front (at 0°) when the light guide plate 1119 of sample 2 is used. In FIGS. 27 and 28, a solid-line curve indicates sample 2 and a broken-line curve indicates comparative sample 3.

The results of comparative experiment will be described. From FIGS. 27 and 28, it is clear that the light that exited from the light guide plate of comparative sample 3 and passed through the prism sheet 1142 includes a larger number of components, angles of which with respect to the first direction relative to the direction toward the front are positive than components, angles of which are negative. Namely, the brightness distribution is biased. This may be because the light that exited from the light guide plate of comparative sample 3 includes a larger number of vector components that point to the side opposite from the LED side with respect to the first direction. When the light guide plate of comparative sample 3 is used and light exiting from the prism sheet 1142 is viewed from the side opposite from the LED side with respect to the first direction relative to the front direction, the light may look bright but dark when viewed from the LED side. Namely, bright-dark difference, that is, uneven brightness is more likely to occur. Especially, when FIG. 27 that illustrates the brightness distribution regarding light exiting from the middle portion with respect to the first direction is compared with FIG. 28 that illustrates the brightness distribution regarding light exiting from the portion closer to the LEDs, it is clear that the uneven brightness in FIG. 28 is heavier. This may be because the light exiting from the portion of the light exiting surface of the light guide plate closer to the LEDs with respect to the first direction travel for a short distance inside the light guide plate until it exits and thus the directivity of the light is less likely to be reduced.

Light that exited from the light guide plate 1119 of sample 2 and passed through the prism sheet 1142 will be described. In comparison to the case in which the light guide plate of comparative sample 3 described above was used, as illustrated in FIGS. 27 and 28, components with angles in positive values relative to the direction toward the front with respect to the first direction significantly decreased and sub-peaks disappeared. Components with angles in negative values slightly decreased. As a result, the bias of the brightness distribution decreased. This may be because the light exiting from the light guide plate 1119 of sample 2 includes a smaller number of vector components that point to the side opposite from the LED side and a larger number of vector components that point to the LED side. Especially, the first reflecting protrusions 1145 are arranged for the entire length such that each first reflecting protrusion 1145 is between two unit reflecting portions 1141*a* that are adjacent to each other in the first direction and the first auxiliary reflecting surfaces 1145*b* of the first reflecting protrusions 1145 have dimensions measuring in the first direction (distances along the surfaces) which increase as the distance from the LEDs in the first direction decreases. Therefore, the light inside the light guide plate 1119 is more likely to be reflected by the first auxiliary reflecting surfaces 1145*b* as the distance from the LEDs in the first direction decreases. Furthermore, the reflected light includes a larger number of vector components that point to the side opposite from the LED side with respect to the first direction. The directivity of the light is reduced. According to the configuration, the light exiting from the middle portion of the light exiting surface 1119*a* of the light guide plate 1119 with respect to the first direction, that is, the portion farther from the LEDs and the light exiting from a near-LED portion with respect to the first direction, that is, the portion closer to the LEDs are less likely to be different in directivity and thus an occurrence of the uneven brightness is further properly reduced.

According to this embodiment as described above, the first auxiliary reflecting surfaces 1145*b* of the first reflecting protrusions 1145 have the dimensions in the first direction which increase as the distance from the LEDs (the light source) in the first direction decreases. The light exiting from the portion of the light exiting surface 1119*a* of the light guide plate 1119 farther from the LEDs with respect to the first direction travels for a longer distance in the light guide plate 1119 until it exits. The directivity of the light is reduced. However, the light exiting from the portion closer to the LEDs with respect to the first direction travels for a shorter distance in the light guide plate 1119 until it exits and thus the directivity of the light is less likely to be reduced. As described above, the first auxiliary reflecting surfaces 1145*b* of the first reflecting protrusions 1145 have the dimensions in the first direction which increase as the distance from the LEDs in the first direction decreases. The light inside the light guide plate 1119 is more likely to be reflected by the first auxiliary reflecting surfaces 1145*b* as the distance from the LEDs in the first direction decreases. Furthermore, the reflected light includes a larger number of vector components that point to the side opposite from the LEDs with respect to the first direction. The directivity is properly reduced. The light exiting from the portion of the light exiting surface 1119*a* of the light guide plate 1119 farther from the LEDs with respect to the first direction and the light exiting from the portion closer to the LEDs with respect to the first direction are less likely to be different in directivity. The occurrence of the uneven brightness is further properly reduced.

The unit reflecting portions 1141*a* of the light emission reflecting portion 1141 have the dimensions in the first direction which increase as the distance from the LEDs in the first direction increases. The intervals between the unit reflecting portions 1141*a* with respect to the first direction are constant. The first reflecting protrusions 1145 have the dimensions in the first direction equal to the intervals between the unit reflecting portions 1141*a* that are adjacent to each other in the first direction. In case that the backlight unit is used with the liquid crystal panel, the intervals between the unit reflecting portions 1141*a* with respect to the first direction may be defined so as not to interfere with the arrangement of the pixels in the panel. According to the configuration, the light exiting from the light guide plate 1119 through the light exiting surface 1119*a* is reflected by the main reflecting surfaces 1141*a*1 of the unit reflecting portions 1141*a*. Therefore, moire fringes, which are interference fringes, are less likely to occur in images displayed on the display panel. An amount of light inside the light guide plate 1119 tends to decrease as the distance from the LEDs in the first direction increases. As described above, the unit reflecting portions 1141*a* have the dimensions in the first direction which increase as the distance from the LEDs in the first direction increases. Even in the portion farther from the LEDs with respect to the first direction, a larger amount of light is reflected by the main reflecting surfaces 1141*a*1 of the unit reflecting portions 1141*a* and exits through the light exiting surface 1119*a*. Therefore, the amount of exiting light is less likely to be different between the portion closer to the LEDs with respect to the first direction and the portion farther from the LEDs with respect to the first direction. Furthermore, as described above, the intervals with respect to the first direction are constant and the first reflecting protrusions 1145 are arranged for the entire length with respect to the first direction between the unit reflecting portions 1141*a* that are adjacent to each other. The first auxiliary reflecting surfaces 1145*b* of the first reflecting protrusions 1145 have the dimensions in the first direction which increase as the distance from the LEDs decreases because the unit reflecting portions 1141*a* have the dimensions in the first direction decrease as the distance from the LEDs in the first direction decreases. With the first reflecting protrusions 1145 arranged for the entire length with respect to the first direction such that each first reflecting protrusions 1145 is between the unit reflecting portions 1141*a* that are adjacent to each other in the first direction, variations in dimension of the first auxiliary reflecting surfaces 1145*b* in the first direction can be easily matched with variations in dimension of the unit reflecting portions 1141*a* in the first direction. According to the configuration, the uneven brightness that may occur in the light exiting through the light exiting surface 1119*a* can be properly reduced and the brightness can be improved.

Thirteenth Embodiment

A thirteenth embodiment of the present invention will be described with reference to FIG. 29. The thirteenth embodiment includes first reflecting protrusions 1245 and second reflecting protrusions 1246 having shapes different from those of the first embodiment described earlier. Configurations, functions, and effects similar to those of the first embodiment will not be described.

Figure 29:
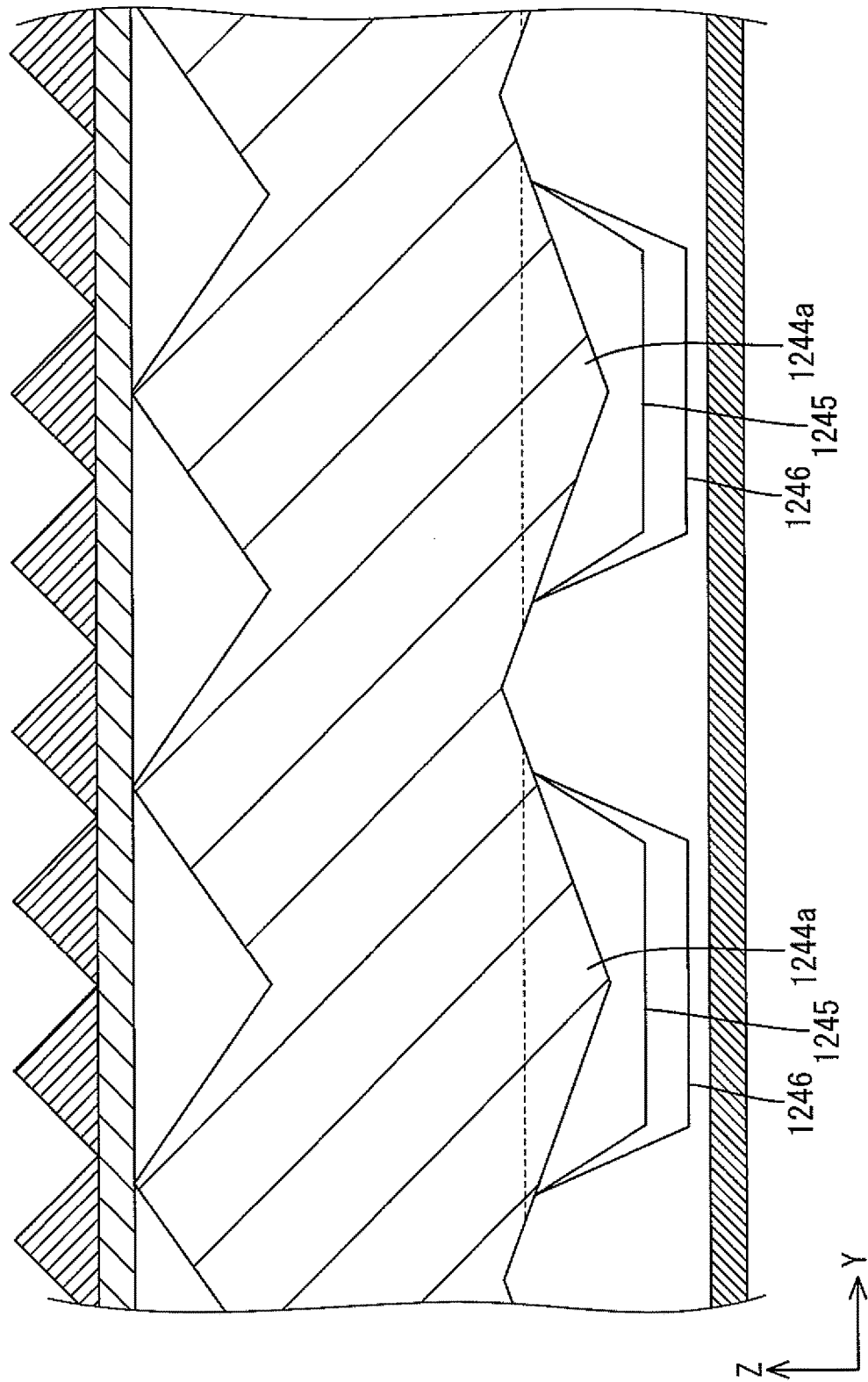
FIG. 29 is a cross-sectional view of a backlight unit along a short-side direction (the second direction, the Y-axis direction) according to a thirteenth embodiment of the present invention.

As illustrated in FIG. 29, the first reflecting protrusions 1245 and the second reflecting protrusions 1246 are formed in trapezoidal shapes when viewed from the front in the first direction. Namely, outlines of the first reflecting protrusions 1245 and the second reflecting protrusions 1246 viewed from the front in the first direction are different from outlines of opposite plate surface-side unit prisms 1244*a* viewed from the front in the first direction. According to the configuration, surface areas of the first reflecting protrusions 1245 and the second reflecting protrusions 1246 are larger than those of the first embodiment described earlier. Therefore, amounts of light reflected by the first reflecting protrusions 1245 and the second reflecting protrusions 1246 increase and thus exiting light includes a larger number of vector components that point to the LED side with respect to the first direction and uneven brightness can be further properly reduced.

Other Embodiments

The present invention is not limited to the embodiments, which have been described using the foregoing descriptions and the drawings. For example, embodiments described below are also included in the technical scope of the present invention.

Figure 30:
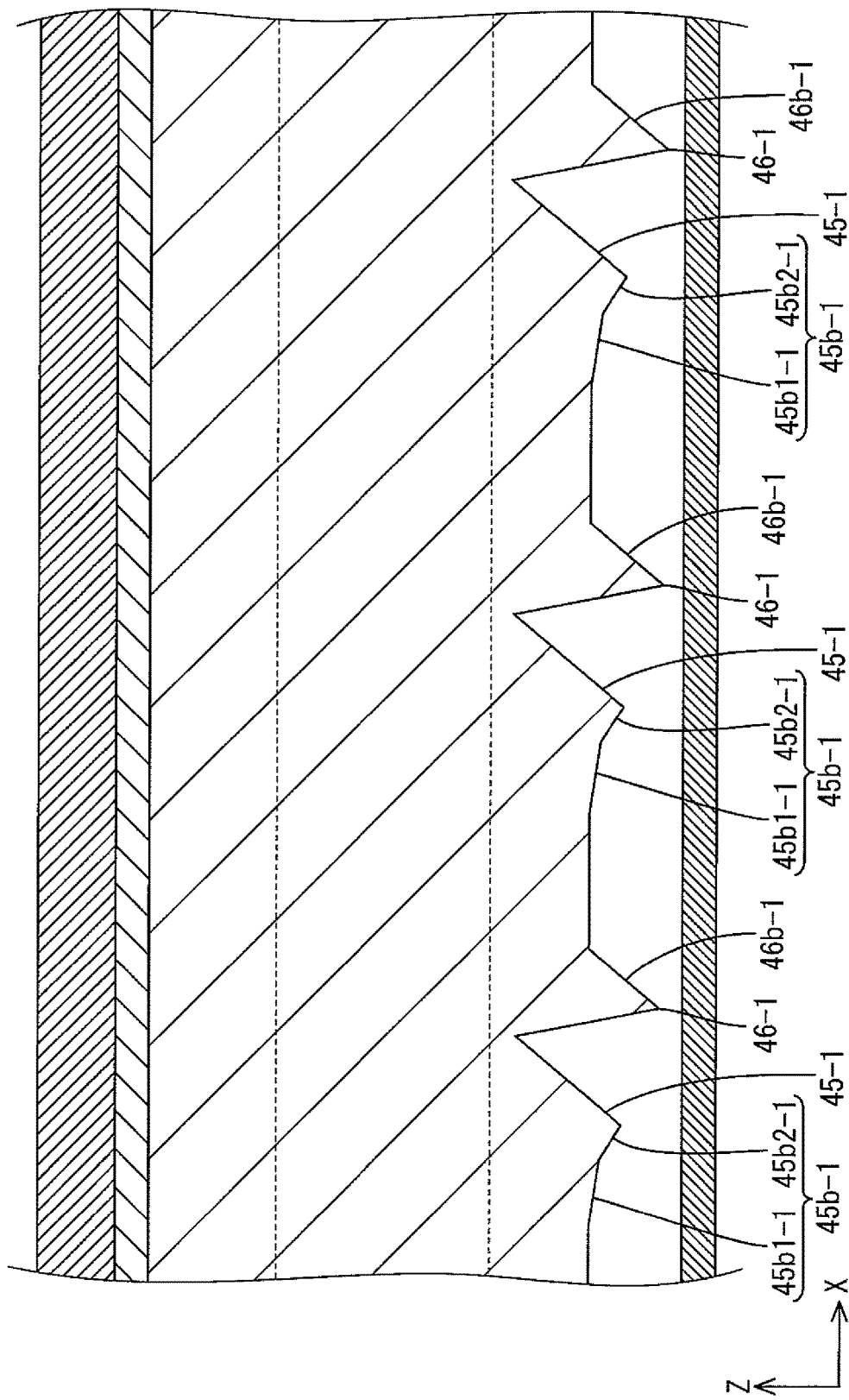
FIG. 30 is a cross-sectional view of a backlight unit along a long-side direction (the first direction, the X-axis direction) according to other embodiment (1) of the present invention.

(1) A first modification of the sixth embodiment described earlier is illustrated in FIG. 30. The first modification includes first reflecting protrusions 45-1 including first auxiliary reflecting surfaces 45*b*-1. Each first auxiliary reflecting surface 45*b*-1 includes a first auxiliary gently sloped reflecting surface 45*b*1-1 and a first auxiliary steeply sloped reflecting surface 45*b*2-1 having different angles of slopes. Each of second auxiliary reflecting surfaces 46*b*-1 of second reflecting protrusions 46-1 may include a single sloped surface.

Figure 31:
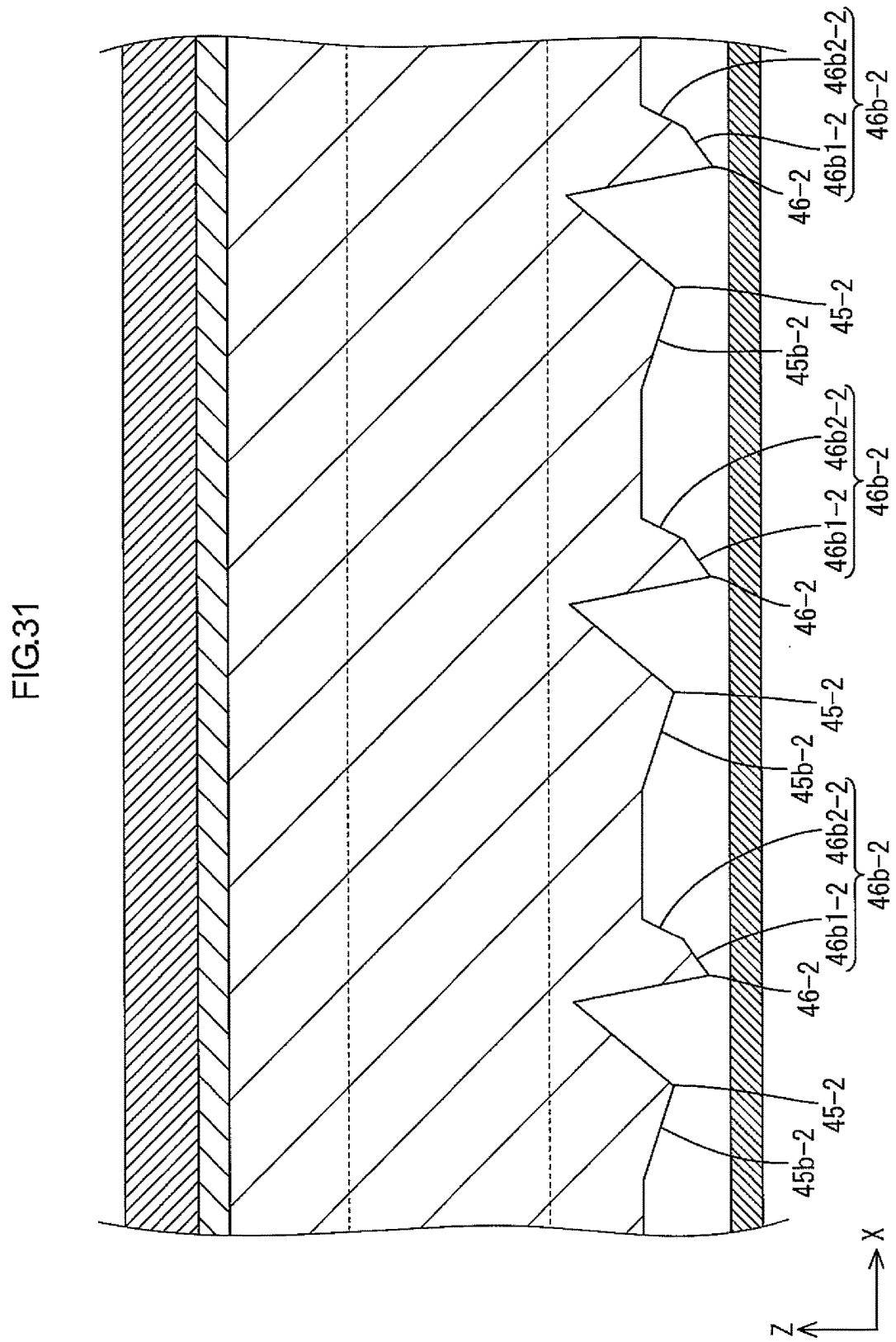
FIG. 31 is a cross-sectional view of a backlight unit along a long-side direction (the first direction, the X-axis direction) according to other embodiment (2) of the present invention.

(2) A second modification of the sixth embodiment described earlier is illustrated in FIG. 31. The second modification includes second reflecting protrusions 46-2 including second auxiliary reflecting surfaces 46*b*-2. Each second auxiliary reflecting surface 46*b*-2 includes a second auxiliary gently sloped reflecting surface 46*b*1-2 and a second auxiliary steeply sloped reflecting surface 46*b*2-2 having different angles of slopes. Each of first auxiliary reflecting surfaces 45*b*-2 of first reflecting protrusions 45-2 may include a single sloped surface.

Figure 32:
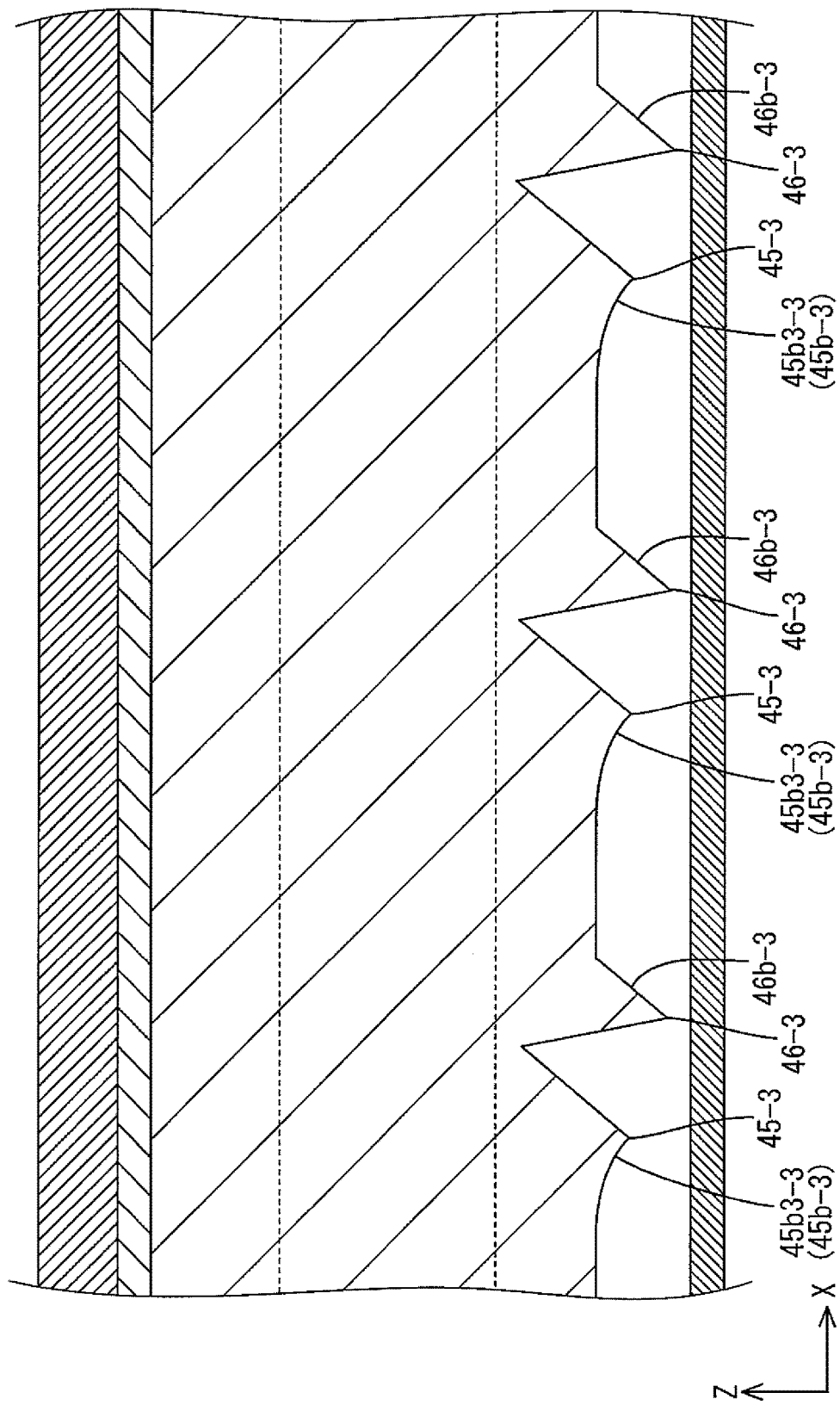
FIG. 32 is a cross-sectional view of a backlight unit along a long-side direction (the first direction, the X-axis direction) according to other embodiment (3) of the present invention.

(3) A first modification of the seventh embodiment described earlier is illustrated in FIG. 32. The first modification includes first reflecting protrusions 45-3 including first auxiliary reflecting surfaces 45*b*-3. Each first auxiliary reflecting surface 45*b*-3 includes a curved surface 45*b*3-3. Each of second auxiliary reflecting surfaces 46*b*-3 of second reflecting protrusions 46-3 may include a single sloped surface.

Figure 33:
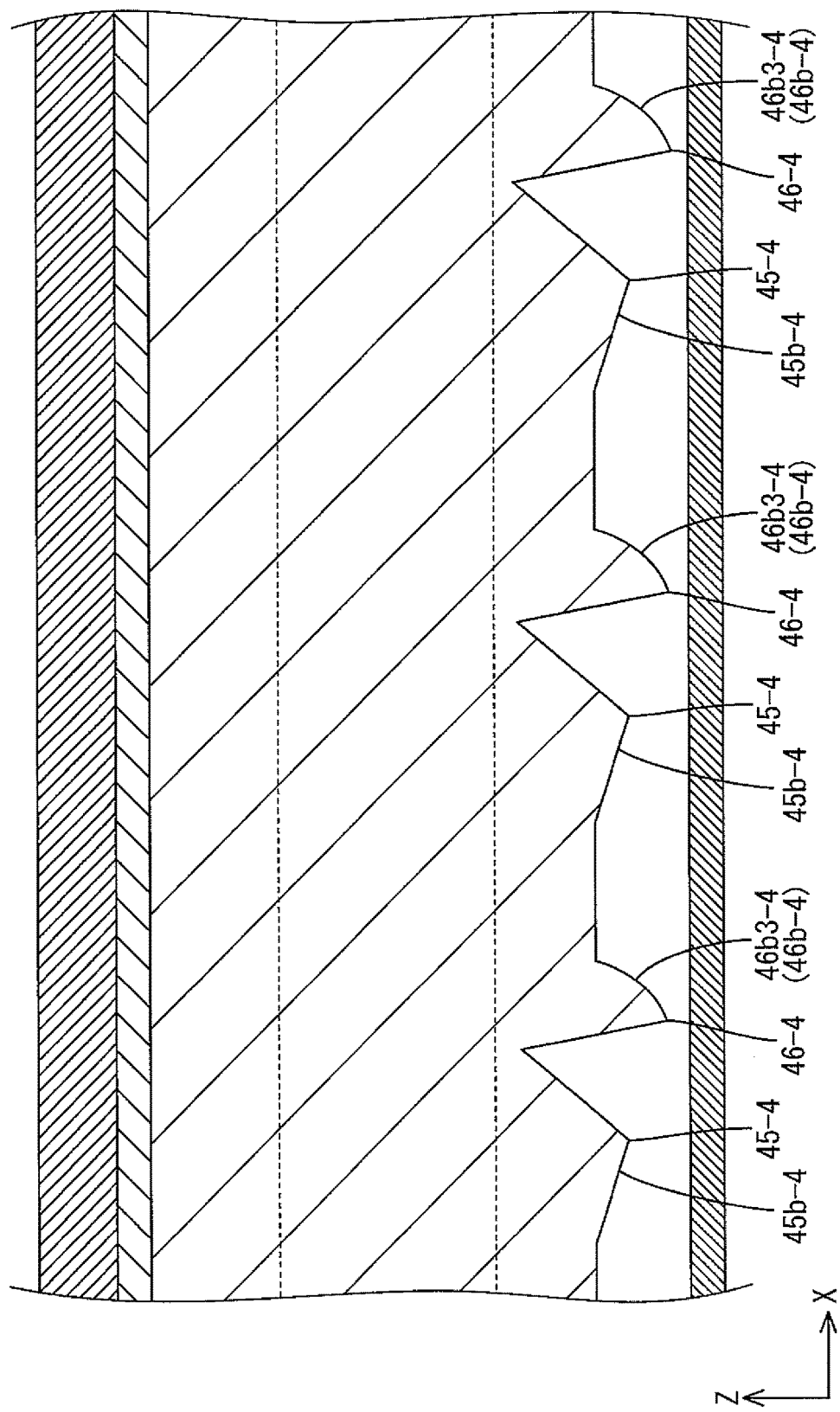
FIG. 33 is a cross-sectional view of a backlight unit along a long-side direction (the first direction, the X-axis direction) according to other embodiment (4) of the present invention.

(4) A second modification of the seventh embodiment described earlier is illustrated in FIG. 33. The second modification includes second reflecting protrusions 46-4 including second auxiliary reflecting surfaces 46*b*-4. Each second auxiliary reflecting surface 46*b*-4 includes a curved surface 46*b*3-4. Each of first auxiliary reflecting surfaces 45*b*-4 of second reflecting protrusions 45-4 may include a single sloped surface.

Figure 34:
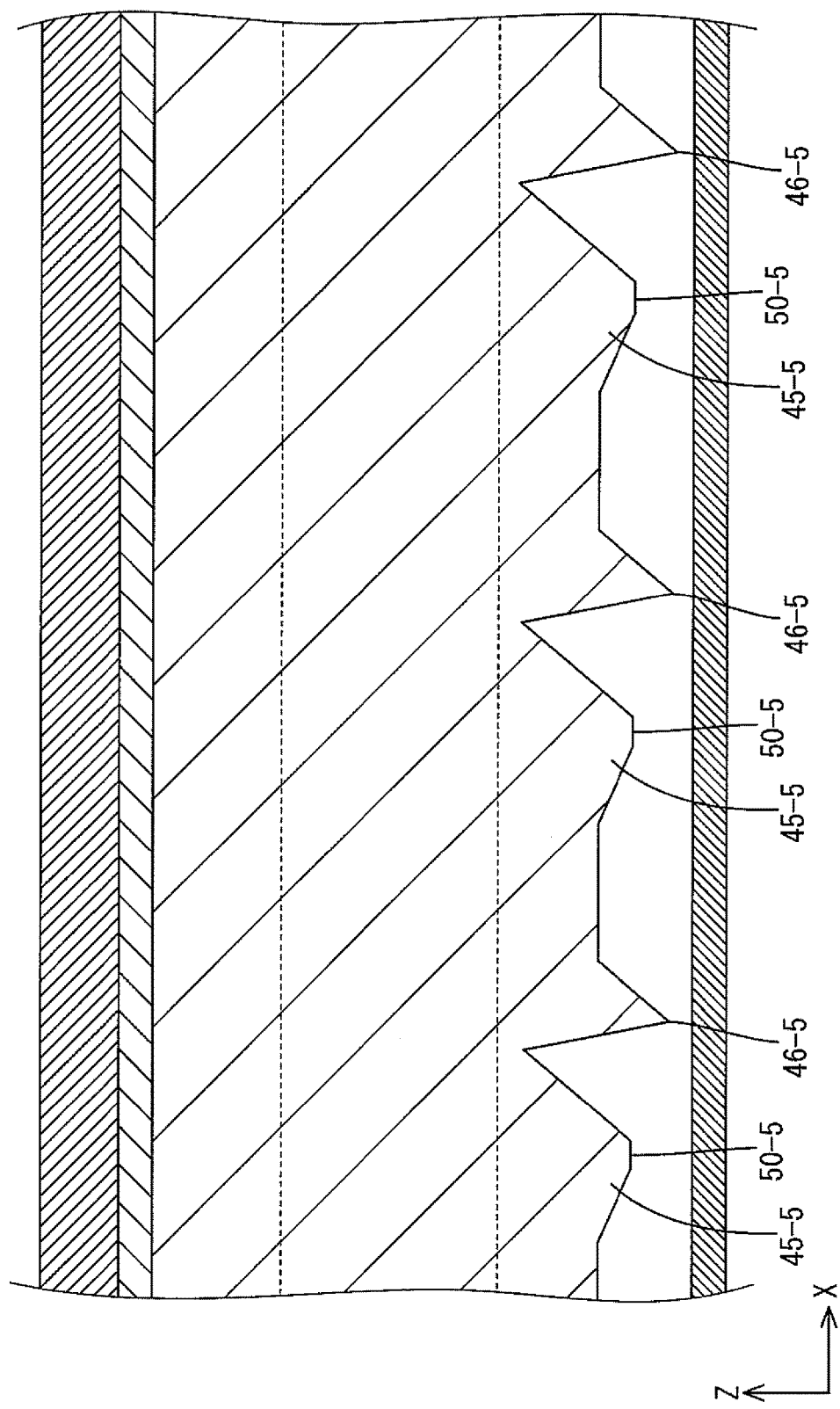
FIG. 34 is a cross-sectional view of a backlight unit along a long-side direction (the first direction, the X-axis direction) according to other embodiment (5) of the present invention.

(5) A first modification of the eighth embodiment described earlier is illustrated in FIG. 34. The first modification includes first reflecting protrusions 45-5 with flat surfaces 50-5 at distal ends. Flat surfaces may not be formed at distal ends of second reflecting protrusions 46-5.

Figure 35:
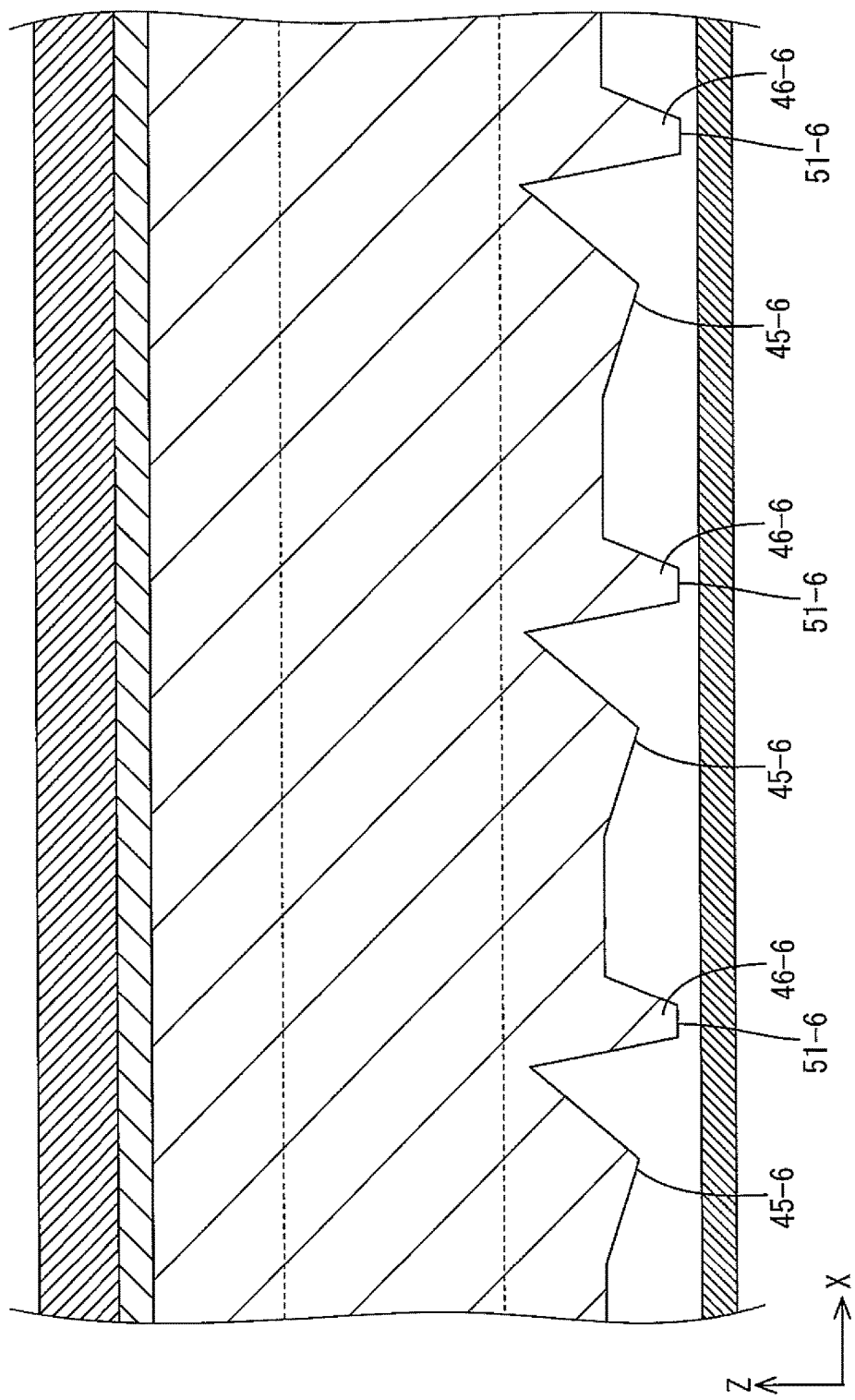
FIG. 35 is a cross-sectional view of a backlight unit along a long-side direction (the first direction, the X-axis direction) according to other embodiment (6) of the present invention.

(6) A second modification of the eighth embodiment described earlier is illustrated in FIG. 35. The second modification includes second reflecting protrusions 46-6 with flat surfaces 51-6 at distal ends. Flat surfaces may not be formed at distal ends of first reflecting protrusions 45-6.

(7) In each of the above embodiments, the angles of slopes of the extended main reflecting surfaces are equal to the angles of slopes of the main reflecting surfaces. However, the following configuration may be included in the scope of the present invention. The angles of slopes of the extended main reflecting surfaces may be different from the angles of slopes of the main reflecting surfaces. A bending point may be provided at a boundary between each extended main reflecting surface and the corresponding main reflecting surface.

(8) In each of the above embodiments, the angles of slopes of the extended light reentering surfaces are equal to the angles of slopes of the light reentering surfaces. However, the following configuration may be included in the scope of the present invention. The angles of slopes of the extended light reentering surfaces may be different from the angles of slopes of the light reentering surfaces. A bending point may be provided at a boundary between each extended light reentering surface and the corresponding light reentering surface.

(9) The angles of slopes of the main reflecting surfaces, the extended main reflecting surfaces, the light reentering surfaces, the extended light reentering surfaces, the first auxiliary reflecting surfaces, and the second auxiliary reflecting surfaces may be altered where necessary from those of the embodiments described earlier.

(10) In each of the embodiments described above, the dimensions of projection of the second reflecting protrusions are larger than the dimensions of projection of the first reflecting protrusions. However, the present invention can be applied to the following configurations. The dimensions of projection of the second reflecting protrusions may be equal to the dimensions of projection of the first reflecting protrusions. The dimensions of projection of the second reflecting protrusions may be smaller than the dimensions of projection of the first reflecting protrusions.

(11) In each of the embodiments described above, the number of the first reflecting protrusions and the number of the second reflecting protrusions arranged along the first direction are equal to the numbers of the unit reflecting portions arranged along the first direction. However, the number of the first reflecting protrusions and the number of the second reflecting protrusions arranged along the first direction may be smaller than the number of the unit reflecting portions arranged along the first direction. In this case, some of the unit reflecting portions arranged along the first direction may not include the first reflecting protrusions and the second reflecting protrusions.

(12) In each of the embodiments described above, the number of the first reflecting protrusions or the number of the second reflecting protrusions arranged along the second direction is equal to the number of the divided unit reflecting portions arranged along the second direction. However, the number of the first reflecting protrusions or the number of the second reflecting protrusions arranged along the second direction may be smaller than the number of the divided unit reflecting portions arranged along the second direction. In this case, some of the divided unit reflecting portion arranged along the second direction may not include the first reflecting protrusions and the second reflecting protrusions.

(13) In each of the embodiments described above, the number of the first reflecting protrusions and the number of the second reflecting protrusions arranged along the first direction are equal to each other. However, the number of the first reflecting protrusions arranged along the first direction may differ from the number of the second reflecting protrusions arranged along the first direction.

(14) In each of the embodiments described above, the number of the first reflecting protrusions and the number of the second reflecting protrusions arranged along the second direction are equal to each other. However, the number of the first reflecting protrusions arranged along the second direction may differ from the number of the second reflecting protrusions arranged along the second direction.

(15) In the sixth embodiment described earlier, the each of the first auxiliary reflecting surfaces and each of the second auxiliary reflecting surfaces include two sloped surfaces, respectively. However, the each of the first auxiliary reflecting surfaces and each of the second auxiliary reflecting surfaces may include three or more sloped surfaces, respectively. This configuration is applicable for the above (1) and (2), which are modifications of the sixth embodiment.

(16) In the seventh embodiment described earlier, the curved surfaces of the first auxiliary reflecting surfaces are formed by recessing portions of the first reflecting portions inward. However, curved surfaces of the first auxiliary reflecting surfaces formed by bulging portions of the first reflecting protrusions outward may be included in the scope of the present invention. This configuration is applicable for the above (3) and (4), which are the modifications of the seventh embodiment.

(17) In the seventh embodiment described earlier, the curved surfaces of the second auxiliary reflecting surfaces are formed by bulging the portions of the second reflecting protrusions outward. However, curved surfaces of the second auxiliary reflecting surfaces formed by recessing portions of the second reflecting protrusions inward may be included in the scope of the present invention. This configuration is applicable for the above (3) and (4), which are the modifications of the seventh embodiment.

(18) In the eighth embodiment described earlier, the flat surfaces are formed by cutting the distal end portions of the first auxiliary reflecting surfaces and the second auxiliary reflecting surfaces. However, effects for reducing deformation of the distal end portions can be achieved as long as the distal end portions of the first auxiliary reflecting surfaces and the second auxiliary reflecting surfaces are not sharp. Therefore, distal end surfaces of the first auxiliary reflecting surfaces and the second auxiliary reflecting surfaces can take shapes other than the flat surfaces. For instance, the distal end surfaces of the first auxiliary reflecting surfaces and the second auxiliary reflecting surfaces may be recessed arched surfaces or bulged arched surfaces. These configurations are applicable for the above (5) and (6), which are the modifications of the eighth embodiment.

(19) In each of the ninth to twelfth embodiments described earlier, on light exiting surface of the light guide plate, the flat portions are arranged between the respective adjacent cylindrical lenses. However, the flat portions can be omitted and the configuration on the light exiting surface side can be similar to that of the third embodiment described earlier (the configuration that does not include the flat portions between the respective adjacent cylindrical lenses). Modifications of the ninth to twelfth embodiments described earlier may have configurations on the light exiting surface side similar to that of the first embodiment (the configuration that does not include the flat portions between the adjacent light exiting surface-side unit prisms) or that of the second embodiment (the configuration that includes the flat portions between the respective adjacent light exiting surface-side prisms).

(20) In each of the ninth to the eleventh embodiments, the cross sections of the opposite plate surface-side unit prisms along the second direction are in the trapezoidal shapes. However, the cross sections of the opposite plate surface-side unit prisms along the second direction may be in triangular shapes similar to those of the first embodiment.

(21) In each of the above embodiments, the intervals of the unit reflecting portions of the light emission reflecting portions in the first direction increase as the distance from the LEDs increases or are constant. However, the scope of the present invention is applicable for unit reflecting portions arranged at intervals in the first direction which decrease as the distance from the LEDs increases.

(22) In each of the above embodiments, the dimensions of the unit reflecting portions of the light emission reflecting portions measuring in the third direction increase as the distance from the LEDs increases. However, the scope of the present invention is applicable for the unit reflecting portions having dimensions in the third direction which are constant.

(23) The shapes of cross sections of the unit reflecting portions of the light emission reflecting portions, the light exiting-side unit prisms of the prism sheet, the light exiting surface-side unit prisms of the light exiting surface-side prism portions, and the opposite plate surface-side unit prisms of the opposite plate surface-side prism portions in the above embodiments may be altered as appropriate. For instance, the light exiting-side unit prisms, the light exiting surface-side unit prisms, and the opposite plate surface-side unit prisms may be formed such that the cross sections thereof along the second direction have triangular shapes (scalene triangular shapes) each having sides in different dimensions and base angles different from one another. The unit reflecting portions may have trapezoidal cross sections along the first direction. The light exiting-side unit prisms may have trapezoidal cross sections along the second direction. The light exiting surface-side unit prisms along may have trapezoidal cross sections along the second direction.

(24) In each of the above embodiments, the opposite plate surface-side prism portions including the opposite plate surface-side unit prisms are formed on the opposite plate surface of the light guide plate. However, opposite plate surface-side lenticular lens portions (opposite plate surface-side anisotropic light collecting portions) including opposite plate surface-side cylindrical lenses (opposite plate surface-side unit light collecting portions) extending in the first direction and arranged along the second direction may be formed on the opposite plate surface of the light guide plate. Configurations of the opposite plate surface-side cylindrical lenses and the opposite plate surface-side lenticular lens portions may be substantial the same as those of the cylindrical lenses and the light exiting surface-side lenticular lens portions of the third embodiment.

(25) The vertex angles, the heights, the widths, the intervals in the second direction of the opposite plate surface-side unit prisms of the opposite plate surface-side prism portions may be altered as appropriate. The vertex angles, the heights, the widths, the intervals in the second direction of the light exiting surface-side unit prisms of the light exiting surface-side prism portions may be altered as appropriate. The vertex angles, the heights, the widths, the intervals in the second direction of the light exiting-side unit prisms of the prism sheet may be altered as appropriate.

(26) In each of the above embodiments, the light exiting-side unit prisms having the triangular cross sections are formed on the prism sheet. Instead of the light exiting-side unit prisms, cylindrical lenses having axes aligned with the first direction and semicircular columnar shapes may be formed on the prism sheet.

(27) In each of the above embodiments, the light exiting surface-side prism portions or the light exiting surface-side lenticular lens portions are integrally formed with the light exiting surface of the light guide plate. However, the light exiting surface-side prism portions or the light exiting surface-side lenticular lens portions may be provided as parts separated from the light guide plate. The light exiting surface-side prism portions or the light exiting surface-side lenticular lens portions provided as separate parts may be disposed on the light exiting surface of the light guide plate. In this case, it is preferable to use materials having refractive indexes equal to that of the material of the light guide plate for the light exiting surface-side prism portions or the light exiting surface-side lenticular lens portions provided as separate parts. Furthermore, it is preferable that the materials of the light exiting surface-side prism portions or the light exiting surface-side lenticular lens portions provided as separate parts are the same as the material of the light guide plate.

(28) In each of the second, the fourth, and the ninth to the twelfth embodiments described earlier, the flat portions and the light exiting surface-side unit prisms are alternatively arranged with respect to the second direction. However, multiple light exiting surface-side unit prisms may be arranged between two flat portions with respect to the second direction.

(29) The area ratios of the flat portions on the light exiting surfaces of the light guide plates in the second, the fourth, the ninth to the twelfth embodiments may be altered as appropriate.

(30) In each of the second, the fourth, the ninth to the twelfth embodiments, the flat portions are formed on the light exiting surface of the light guide plate. However, the flat portions may be formed on the opposite plate surface of the light guide plate. In this case, the flat portions may be arranged between the opposite plate surface-side unit prisms of the opposite plate surface-side prism portions arranged along the second direction.

(31) In each of the third, the fourth, and the ninth to the twelfth embodiments, the tangent of each cylindrical lens of each light exiting surface-side lenticular lens portion illustrated in the corresponding drawing is 70°. However, the tangents of the cylindrical lenses can be altered as appropriate.

(32) In each of the above embodiments, it is preferable to define the intervals of the light exiting surface-side unit prisms of the light exiting surface-side prism portions and the intervals of the light exiting-side unit prims of the prism sheet such that they do not interfere with the intervals of the pixels in the liquid crystal panel. Furthermore, it is preferable to define the intervals of the flat portions in each of the second, the fourth, and the ninth to the twelfth embodiment described earlier such that they do not interfere with the intervals of the pixels in the liquid crystal panel.

(33) In each of the above embodiments, the prism sheet is arranged such that the extending direction of the light exiting-side unit prisms is parallel to the first direction. However, the prism sheet may be arranged such that the extending direction of the light exiting-side unit prism is angled to the first directions at a predefined angle (for example, about 5°). According to the configuration, the arrangement of the light exiting-side unit prisms is less likely to interfere with the arrangement of the pixels in the liquid crystal panel. This configuration is preferable for reducing moire fringes.

(34) In each of the above embodiments, the optical sheet includes a single prism sheet. However, other types of optical sheets (e.g., diffusing sheets and reflecting-type polarizing sheets) may be added. Furthermore, the optical sheet may include multiple prism sheets.

(35) In each of the above embodiments, a single LED board is arranged along the light entering surface of the light guide plate. However, configurations that include two or more LED boards arranged along the light entering surfaces of light guide plates may be included in the scope of the present invention.

(36) In each of the above embodiments, one of the end surfaces on the short side of the light guide plate is configured as the light entering surface and the LED board is arranged opposite the light entering surface. However, a configuration including one of end surfaces on the long side of the light guide plate configured as a light entering surface and an LED boards arranged opposite the light entering surface may be included in the scope of the present invention. In this case, the extending directions of the light exiting-side unit prisms, the light exiting surface-side unit prisms, and the opposite plate surface-side unit prisms may be aligned with the short-side direction of the light guide plate and the width directions (the arrangement directions) of the light exiting-side unit prisms, the light exiting surface-side unit prisms, and the opposite plate surface-side unit prisms may be aligned with the long-side direction of the light guide plate.

(37) Other than the above (36), a configuration including a pair of end surfaces on the short sides of the light guide plate configured as light entering surfaces and a pair of the LED boards that are arranged opposite the light entering surfaces, respectively, may be included in the scope of the present invention. Furthermore, a configuration including a pair of end surfaces on the long sides of the light guide plate configured as light entering surfaces and a pair of the LED boards that are arranged opposite the light entering surfaces, respectively, may be included in the scope of the present invention.

(38) In each of the above embodiments, the light guide plate has a rectangular shape. However, the light guide plate may have a square shape. Furthermore, the shape of the light guide plate is not necessary to be a perfect rectangular, that is, outer edge portions may be cut out.

(39) In each of the above embodiments, the top surface light emitting-type LEDs are used. However, the scope of the present invention is applicable for side surface emitting-type LEDs including light emitting surfaces on sides that are adjacent to a mounting surface of an LED board.

(40) In each of the above embodiments, the projected-capacitive touch screen is provided as an example of the touch panel pattern on the touch panel. However, the scope of the present invention is applicable for configurations in which screen capacitive touch screen patterns, resistive membrane touch screen patterns, and inductive coupling touch screen patterns are used, respectively.

(41) The touch panel in each of the above embodiments may be replaced with a parallax barrier panel (a switching liquid crystal panel). The parallax barrier panel includes parallax barrier patterns for separating images displayed on the display surface of the liquid crystal panel with parallax so that a viewer sees three dimensional images. The parallax barrier panel may be used in combination with the touch panel.

(42) Touch panel patterns may be formed on the parallax barrier panel in the above (41) and the parallax barrier panel may be configured to share touch panel functions.

(43) In each of the above embodiments, the screen size of the liquid crystal panel in the liquid crystal display device is about 5 inches. However, the screen size of the liquid crystal panel may be altered as appropriate. Especially, the screen size larger than 5 inches may be preferable for electronic devices such as tablet computers. Other than smartphones and tablet computers, the scope of the present invention is applicable for electronic devices such as on-board information terminal devices (car navigation systems) and portable video game consoles regardless of the screen size of the liquid crystal panel.

(44) In each of the above embodiments, color portions of the color filters in the liquid crystal panel are in three colors of R, G, and B. However, four or more colors of color portions may be used.

(45) In each of the above embodiments, the LEDs are used as light sources. However, other types of light sources such as organic ELs may be used.

(46) In each of the above embodiments, the frame is made of metal. However, the frame may be made of synthetic resin.

(47) In each of the above embodiments, the chemically toughened glass is used for the cover panel. However, a toughened glass processed by an air-cooled toughening treatment (physical toughening treatment) may be used.

(48) In each of the above embodiments, the chemically toughened glass is used for the cover panel. However, the cover panel may be made of glass without toughened (non-toughened glass) or synthetic resin.

(49) In each of the above embodiments, the liquid crystal display device includes the cover panel. However, the cover panel may be omitted. Furthermore, the touch panel may be omitted.

(50) In each of the above embodiments, the TFTs are used for the switching components of the liquid crystal display device. However, the scope of the present invention is applicable for a liquid crystal display device including switching components other than the TFTs (e.g., thin film diodes (TFDs)). Furthermore, the scope of the present invention is applicable for a black-and-white liquid crystal display device other than the color liquid crystal display device.

EXPLANATION OF SYMBOLS

10: liquid crystal display device (display device), 11: liquid crystal panel (display panel), 11a, 11b: substrate, 12: backlight unit (lighting unit), 17: LED (light source), 19, 119, 219, 319, 419, 519, 619, 819, 919, 1119: light guide plate, 19a, 119a, 219a, 319a, 519a, 619a, 819a, 919a, 1119a: light exiting surface, 19b: light entering surface, 19c, 119c, 419c, 519c, 619c, 719c, 919c, 1019c, 1119c: opposite plate surface (plate surface), 19e: side surface (a pair of end surfaces excluding the light entering surface), 40: reflecting sheet (reflecting member), 40a: reflecting surface, 41, 1141: light emission reflecting portion, 41a, 441a, 541a, 641a, 841a, 1141a: unit reflecting portion, 41a1, 441a1, 541a1, 641a1, 1141a1: main reflecting surface, 41a2, 541a2, 641a2: light reentering surface, 41aS, 841aS, 941aS, 1041aS: divided unit reflecting portion, 42, 1142: prism sheet (light exiting-side anisotropic light collecting portion), 42a: light exiting-side unit prism (light exiting-side unit light collecting portion), 43, 143: light exiting surface-side prism portion (light exiting surface-side anisotropic light collecting portion), 43a, 143a: light exiting surface-side unit prism (light exiting surface-side unit light collecting portion), 44, 1144: opposite plate surface-side prism portion (opposite plate surface-side anisotropic light collecting portion), 44a, 844a, 944a, 1044a, 1244a: opposite plate surface-side unit prism (opposite plate surface-side unit light collecting portion), 44a2: ridge, 45, 45-1, 45-2, 45-3, 45-4, 45-5, 45-6, 445, 545, 645, 745, 845, 945, 1045, 1145, 1245: first reflecting protrusion, 45a, 445a, 545a, 645a, 1145a: extended main reflecting surface, 45b, 45b-1, 45b-2m 45b-3, 45b-4, 445b, 545b, 645b, 945b, 1145b: first auxiliary reflecting surface, 45b1-1, 545b1: first auxiliary gently sloped reflecting surface (sloped surface), 45b2-1, 545b2: first auxiliary steeply sloped reflecting surface (sloped surface), 45b3-3, 645b3: curved surface, 46, 46-1, 46-2, 46-3, 46-4, 46-5, 46-6, 446, 546, 646, 746, 846, 946, 1046, 1146, 1246: second reflecting protrusion, 46a, 546a, 646a, 946a: extended light reentering surface, 46b, 46b-1, 46b-2, 46b-3, 46b-4, 446b, 546b, 646b: second auxiliary reflecting surface, 46b1-2, 546b1: second auxiliary gently sloped reflecting surface (sloped surface), 46b2-2, 546b2: second auxiliary steeply sloped reflecting surface (sloped surface), 46b3-4, 646b3: curved surface, 47, 547: flat surface, 48, 348, 848: flat portion, 49, 349, 849, 1149: light exiting surface-side lenticular lens portion (light exiting surface-side anisotropic light collecting portion), 49a, 349a, 849a, 1149a: cylindrical lens (light exiting surface-side unit light collecting portion), 50, 50-5: flat surface, 51, 51-6, 1151: flat surface

The invention claimed is:

1. A lighting device comprising:
a light source;
a light guide plate having a rectangular shape, the light guide plate including at least one of opposite peripheral end surfaces configured as a light entering surface through which light from the light source enters, the light guide plate including one of plate surfaces configured as a light exiting surface through which the light exits;
an optical film including a light exiting-side anisotropic light collecting portion arranged on a light exiting side relative to the light guide plate, the light exiting-side anisotropic light collecting portion including light exiting-side unit light collecting portions extending along a first direction and arranged along a second direction, the first direction being along a first pair of end surfaces among peripheral end surfaces of the light guide plate, the peripheral end surfaces being opposite to each other and the first pair of end surfaces not including the light entering surface among peripheral end surfaces of the light guide plate, the second direction being along a second pair of the peripheral end surfaces among the peripheral end surfaces of the light guide plate, the second pair of the peripheral end surfaces including the light entering surface;
a light exiting surface-side anisotropic light collecting portion arranged on a light exiting surface-side of the light guide plate, the light exiting surface-side anisotropic light collecting portion including light exiting surface-side unit light collecting portions extending along the first direction and arranged along the second direction;
a light emission reflecting portion arranged on an opposite plate surface, the light emission reflecting portion including unit reflecting portions formed by recessing portions of the opposite plate surface to extend along the second direction, the unit reflecting portions including main reflecting surfaces on a light source side with respect to the first direction and light reentering surfaces on an opposite side of the light source side, the unit reflecting portions being arranged at intervals along the first direction;
an opposite plate surface-side anisotropic light collecting portion arranged on an opposite plate surface-side of the light guide plate, the opposite plate surface-side anisotropic light collecting portion including opposite plate surface-side unit light collecting portions extending along the first direction and being arranged along the second direction;
first reflecting protrusions arranged closer to the light source than the unit reflecting portions with respect to the first direction and protruding from the opposite plate surface, the first reflecting protrusions including extended main reflecting surfaces and first auxiliary reflecting surfaces, the extended main reflecting surfaces continuing to the main reflecting surfaces, respectively, the first auxiliary reflecting surfaces being arranged closer to the light source than the respective extended main reflecting surfaces with respect to the first direction and configured to reflect light traveling toward the opposite plate surface and to direct the light toward the main reflecting surfaces and the extended main reflecting surfaces; and
second reflecting protrusions arranged on a side opposite from a side on which the first reflecting protrusions are arranged relative to the unit reflecting portions with respect to the first direction on the opposite plate surface side of the light guide plate, the second reflecting protrusions including extended light reentering surfaces and second auxiliary reflecting surfaces, the extended light reentering surfaces continuing to the light reentering surfaces, respectively, the second auxiliary reflecting surfaces being arranged on a side opposite from a side on which the first reflecting protrusions are arranged relative to the extended light reentering surfaces with respect to the first direction and configured to reflect light entering through at least one of the light reentering surfaces and the extended light reentering surfaces and to direct the light toward the light exiting surface; wherein
the first auxiliary reflecting surfaces of the first reflecting protrusions have dimensions measuring in the first direction, the dimensions increasing as a distance from the light source in the first direction decreases.

2. The lighting device according to claim 1, wherein the unit reflecting portions of the light emission reflecting portion include divided unit reflecting portions arranged at intervals with respect to the second direction.

3. The lighting device according to claim 2, wherein the unit reflecting portions of the light emission reflecting portion have holes that extend along the second direction, the holes are formed by cutting out portions of ridges of the opposite plate surface-side unit light collecting portions of the opposite plate surface-side anisotropic light collecting portion.

4. The lighting device according to claim 3, wherein
lines of the first reflecting protrusions and the second reflecting protrusions are arranged at intervals in the second direction, and
arrangements of the first reflecting protrusions and the second reflecting protrusions with respect to the second direction correspond to an arrangement of the divided unit reflecting portions.

5. The lighting device according to claim 4, wherein the first reflecting protrusions and the second reflecting protrusions are formed such that outlines thereof viewed from a front with respect to the first direction are along outlines of the opposite plate surface-side unit light collecting portions viewed from the front with respect to the first direction.

6. The lighting device according to claim 2, wherein the first reflecting protrusions and the second reflecting protrusions continuously extend in the second direction and across the divided unit reflecting portions.

7. The lighting device according to claim 1, wherein
the light emission reflecting portion is formed such that dimensions of the unit reflecting portions measuring in the first direction increase as the distance from the light source in the first direction increases and the intervals of the unit reflecting portions in the first direction are constant, and
the first reflecting protrusions are formed such that a dimension measuring in the first direction is equal to an interval between the unit reflecting portions adjacent to each other in the first direction.

8. The lighting device according to claim 1, wherein the second reflecting protrusions are formed such that distal ends of the second reflecting protrusions are located farther from the opposite plate surface than distal ends of the first reflecting protrusions.

9. The lighting device according to claim 1, wherein
the light emission reflecting portions are formed such that dimensions of the unit reflecting portions measuring in a direction normal to a plate surface of the light guide plate increase as the distance from the light source in the first direction increases,
the first reflecting protrusions and the second reflecting protrusions are arranged at intervals along the first direction, respectively,
arrangements of the first reflecting protrusions and the second reflecting protrusions correspond to an arrangement of the unit reflecting portions, and
the first reflecting protrusions and the second reflecting protrusions are formed such that dimensions of a projection of the first reflecting protrusions and the second reflecting protrusions from the opposite plate surface increase as the distance from the light source increases.

10. The lighting device according to claim 1, wherein at least one of each first reflecting protrusion and each second reflecting protrusion includes a flat surface formed at an end of a projection from the opposite plate surface.

11. The lighting device according to claim 1, wherein the first reflecting protrusions are formed such that a dimension of each first reflecting protrusion measuring in the first direction is equal to an interval between corresponding two of the unit reflecting portions that are adjacent to each other in the first direction.

12. The lighting device according to claim 1, wherein at least one of a group of the first reflecting protrusions and a group of the second reflecting protrusions includes a group of the first auxiliary reflecting surfaces and a group of the second auxiliary reflecting surfaces, at least one of which include sloped surfaces having angles of slope different from one another.

13. The lighting device according to claim 1, wherein at least one of a group of the first reflecting protrusions and a group of the second reflecting protrusions includes a group of the first auxiliary reflecting surfaces and a group of the second auxiliary reflecting surfaces, at least one of which include curved surfaces.

14. A display device comprising:
the lighting device according to claim 1; and
a display panel for displaying images using light from the lighting device.

* * * * *